(12) United States Patent
Valentino et al.

(10) Patent No.: US 11,914,974 B2
(45) Date of Patent: Feb. 27, 2024

(54) SYSTEMS AND METHODS EMPLOYING UNIQUE DEVICE FOR GENERATING RANDOM SIGNALS AND METERING AND ADDRESSING, E.G., UNUSUAL DEVIATIONS IN SAID RANDOM SIGNALS

(71) Applicant: PSYLERON, INC., Princeton, NJ (US)

(72) Inventors: John Valentino, Menlo Park, CA (US); Herb Mertz, Princeton, NJ (US); Ian Cook, Carrboro, NC (US)

(73) Assignee: Psyleron, Inc., Princeton, NJ (US)

( * ) Notice: Subject to any disclaimer, the term of this patent is extended or adjusted under 35 U.S.C. 154(b) by 0 days.

(21) Appl. No.: 17/107,182

(22) Filed: Nov. 30, 2020

(65) Prior Publication Data

US 2021/0255834 A1    Aug. 19, 2021

Related U.S. Application Data

(63) Continuation of application No. 15/847,893, filed on Dec. 19, 2017, now Pat. No. 10,896,024, which is a continuation of application No. 14/802,538, filed on Jul. 17, 2015, now Pat. No. 9,858,041, which is a continuation of application No. 12/742,210, filed on May 10, 2010, now Pat. No. 9,152,381, which is a
(Continued)

(51) Int. Cl.
| | | |
|---|---|---|
| *G06F 7/58* | (2006.01) | |
| *G09B 7/00* | (2006.01) | |
| *G09B 19/00* | (2006.01) | |
| *G09B 23/00* | (2006.01) | |
| *H04L 67/01* | (2022.01) | |

(52) U.S. Cl.
CPC ............. *G06F 7/588* (2013.01); *G09B 7/00* (2013.01); *G09B 19/00* (2013.01); *G09B 23/00* (2013.01); *H04L 67/01* (2022.05)

(58) Field of Classification Search
CPC .................................................. G06F 7/58–588
USPC .................................................. 708/250–255
See application file for complete search history.

(56) References Cited

U.S. PATENT DOCUMENTS

| | | |
|---|---|---|
| 5,830,064 A | 11/1998 | Bradish et al. |
| 6,016,038 A | 1/2000 | Mueller et al. |
| 6,324,558 B1 | 11/2001 | Wilber |

(Continued)

OTHER PUBLICATIONS

PCT Form ISA/237, dated Feb. 12, 2009 in correspondence with International Patent Application No. PCT/US2008/012623. (Cited in parent U.S. Appl. No. 14/802,538.).

(Continued)

*Primary Examiner* — Matthew D Sandifer
(74) *Attorney, Agent, or Firm* — Studebaker Brackett, PC

(57) ABSTRACT

According to some embodiments, a system comprises a generator of a truly random signal is connected to an input and feedback device for the purpose of providing a user with real time feedback on the random signal. The user observes a representation of the signal in the process of an external physical event for the purpose of finding a correlation between the random output and what happens during the physical event. In some examples, the system is preferably designed such the system is shielded from all classically known forces such as gravity, physical pressure, motion, electromagnetic fields, humidity, etc. and/or, such classical forces are factored out of the process as much as possible. The system is thus designed to be selectively response to signals from living creatures, in particular, humans.

8 Claims, 34 Drawing Sheets

Related U.S. Application Data continuation-in-part of application No. PCT/US2008/012623, filed on Nov. 10, 2008.

(60) Provisional application No. 61/106,745, filed on Oct. 20, 2008, provisional application No. 61/037,439, filed on Mar. 18, 2008, provisional application No. 61/014,941, filed on Dec. 19, 2007, provisional application No. 61/012,434, filed on Dec. 9, 2007, provisional application No. 60/986,954, filed on Nov. 9, 2007.

(56) References Cited

U.S. PATENT DOCUMENTS

| | | |
|---|---|---|
| 6,369,727 B1 | 4/2002 | Vincze |
| 6,763,364 B1 | 7/2004 | Wilber |
| 7,096,242 B2 | 8/2006 | Wilber |
| 7,124,157 B2 | 10/2006 | Ikake |
| 7,287,056 B2 | 10/2007 | Oveland et al. |
| 7,752,247 B2 | 7/2010 | Wilber |
| 2004/0263094 A1 | 12/2004 | Lister |
| 2005/0136903 A1 | 6/2005 | Kashima et al. |
| 2005/0236998 A1 | 10/2005 | Mueller et al. |
| 2006/0020648 A1 | 1/2006 | Merati et al. |
| 2008/0227419 A1 | 9/2008 | Traub |
| 2009/0265112 A1 | 10/2009 | Wilber et al. |
| 2013/0010952 A1 | 1/2013 | Muise et al. |
| 2013/0036078 A9 | 2/2013 | Wilber |

OTHER PUBLICATIONS

Nelson et al. "FieldREG II: Consciousness Field Effects: Replications and Explorations", Journal of Scientific Exploration, 1998, vol. 12, No. 3, pp. 425-454. (Cited in parent application).

Nelson et al., "Field REG Anomalies in Group Situations", Journal of Scientific Exploration, vol. 10, No. 1, pp. 111-141, 1996 (Cited in parent application).

FIG. 1

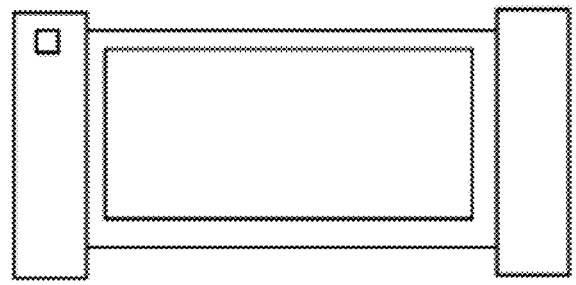
Figure 10
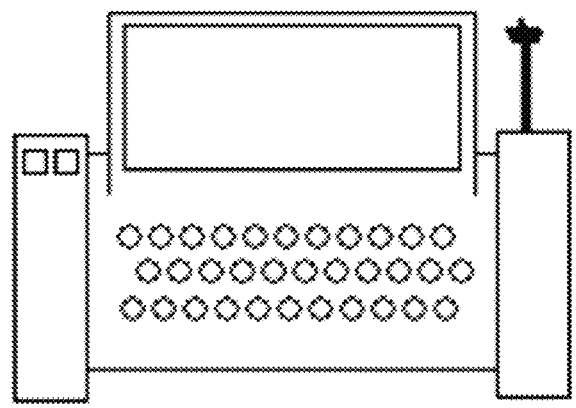
Figure 11
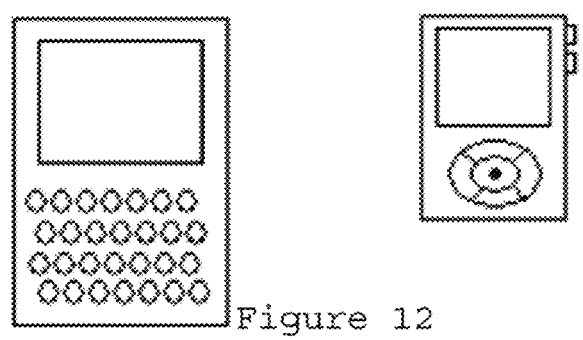
Figure 12
Figure 13
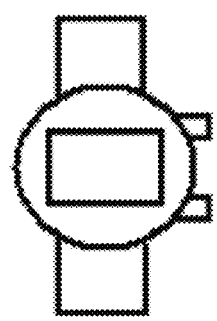
Figure 14
Figure 15

FIG. 19: Technical Diagrams
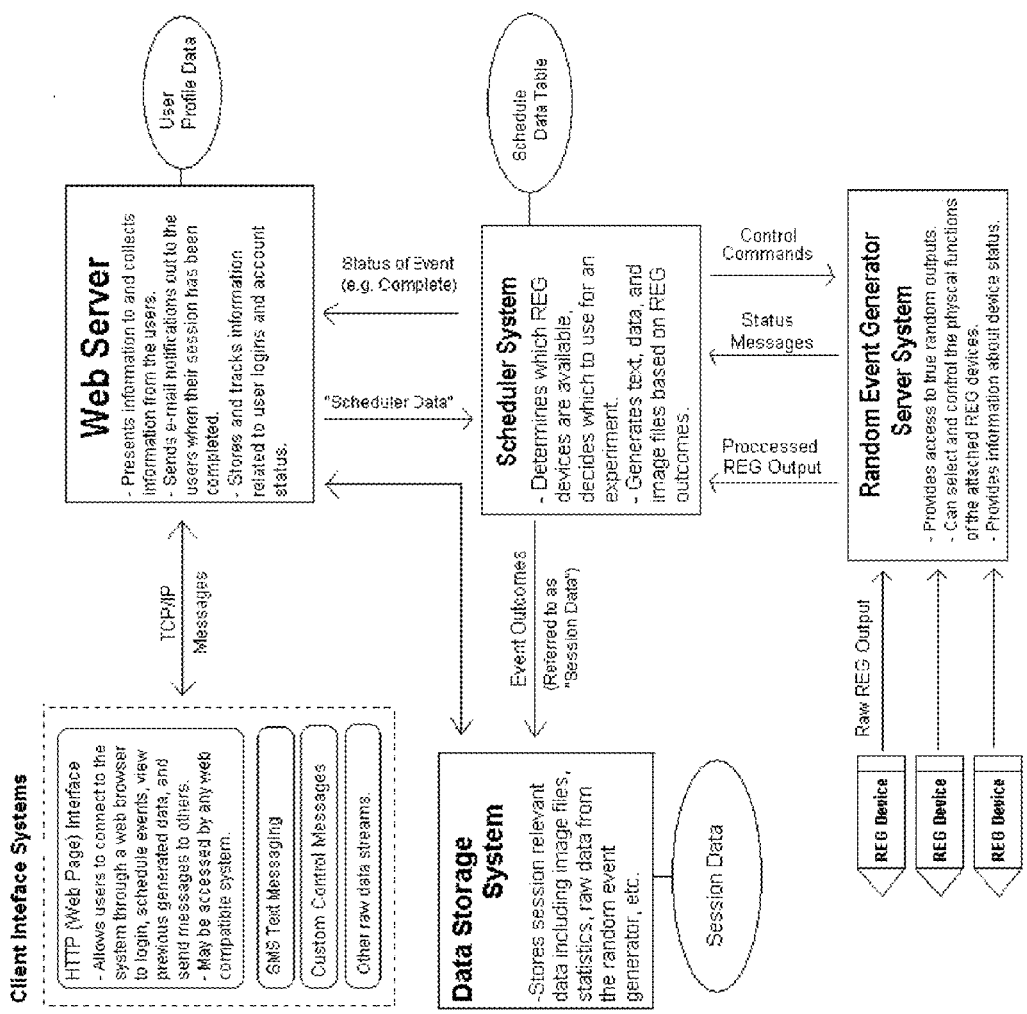

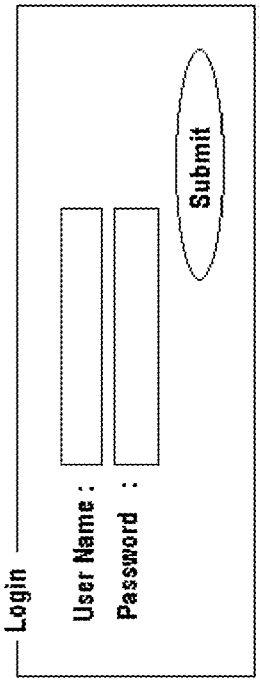
FIG. 20: Example Screen and Usage Process – User Interface. Login Screen.

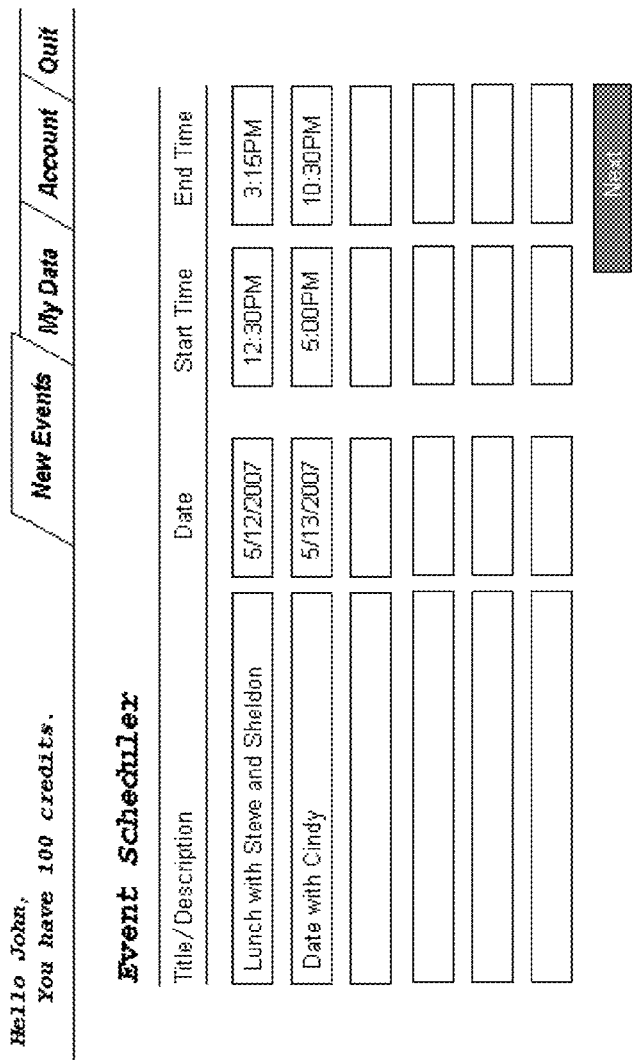
Figure 21: Event Scheduler

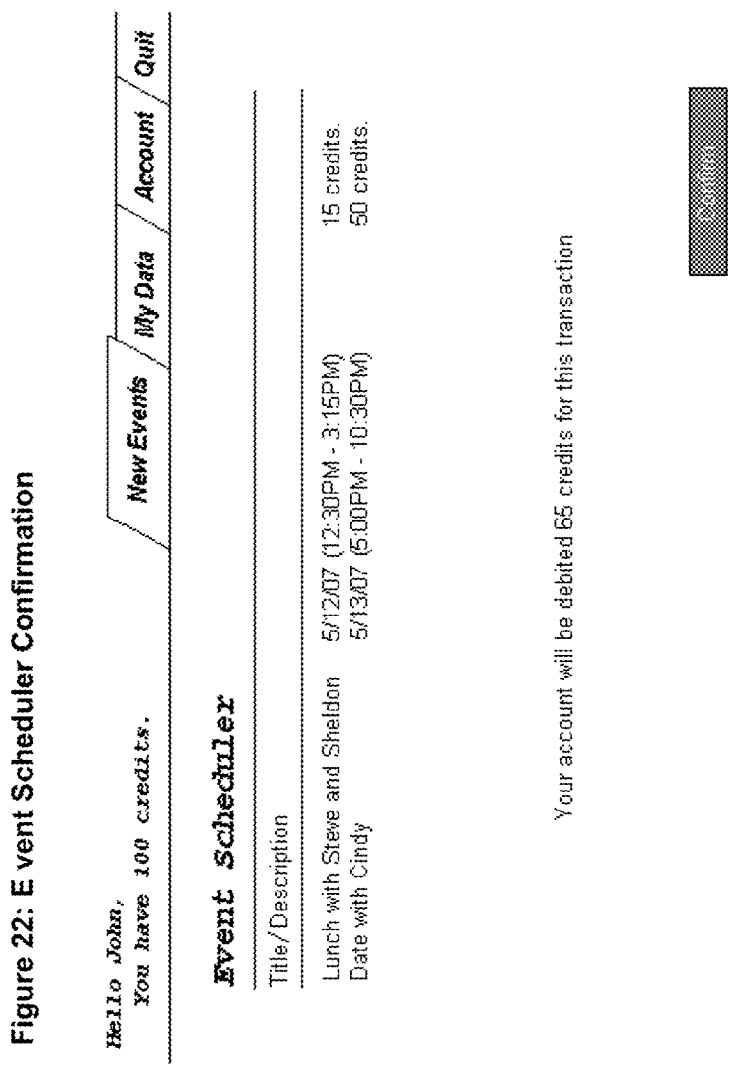
Figure 22: Event Scheduler Confirmation

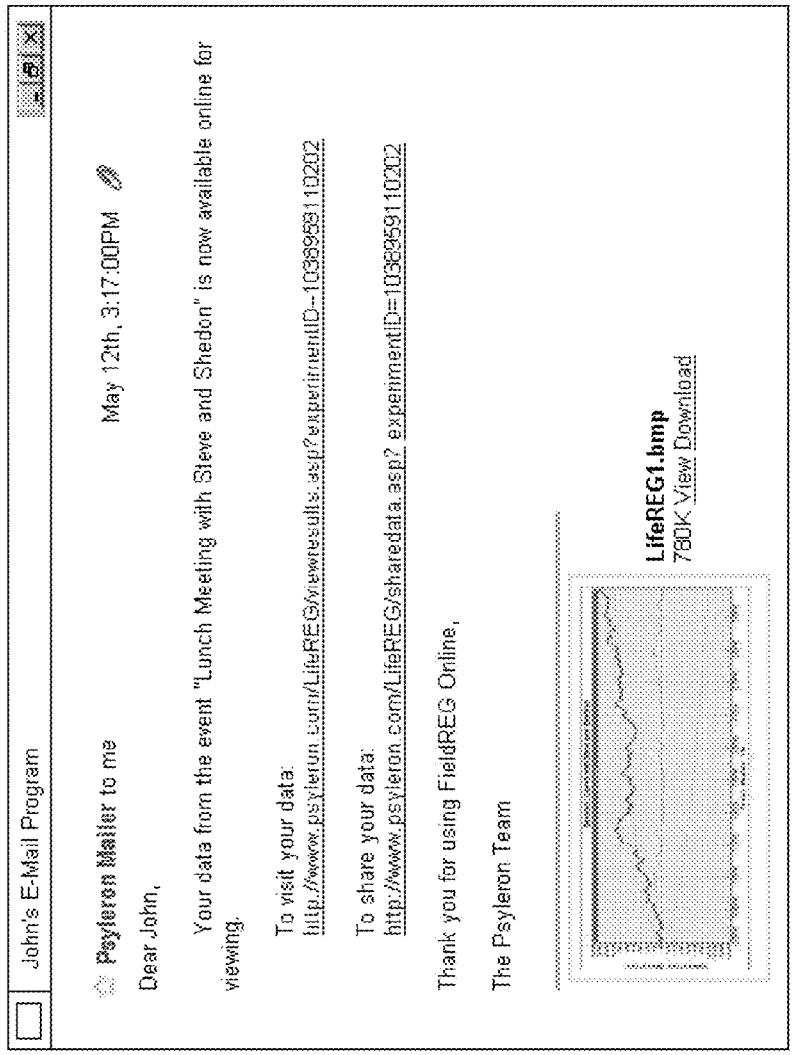
FIG. 23: Example E-Mail Received from the Auto-Mailer

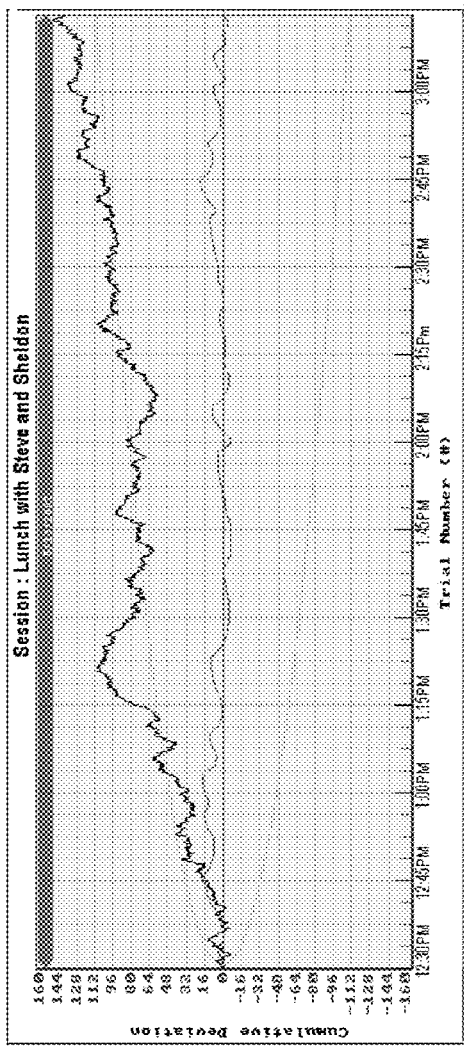
Figure 23(A): E-Mail Attachments
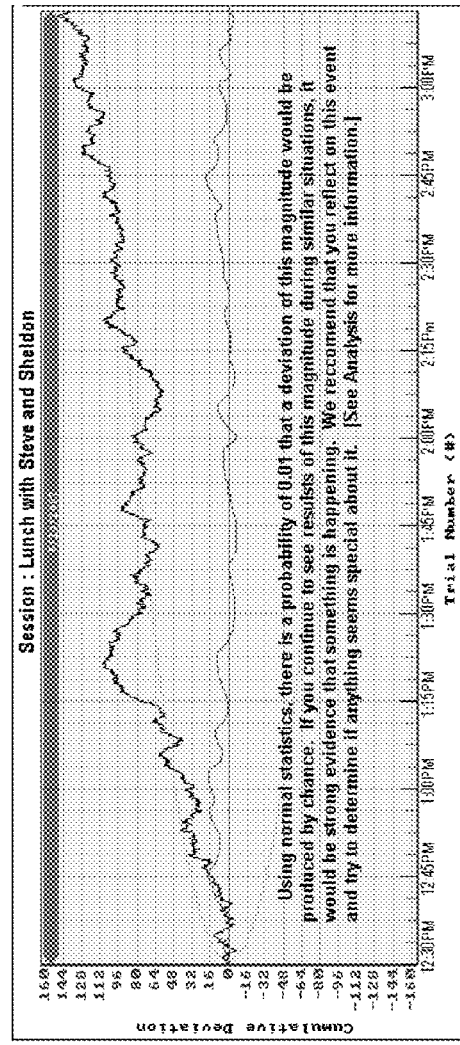
Figure 23(B): Attachment with Textual Data

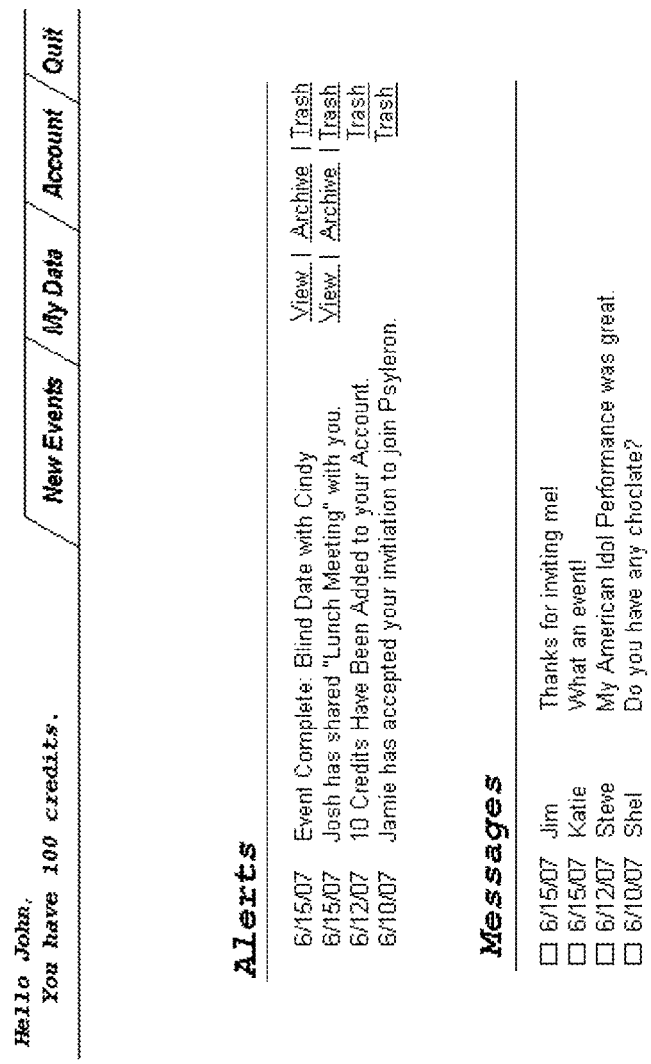

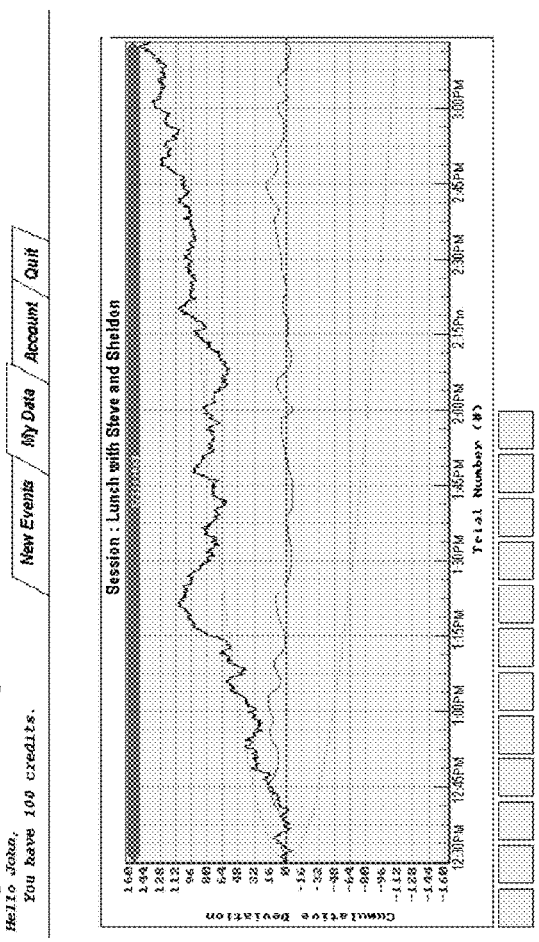
Figure 25: Viewing the Data Online
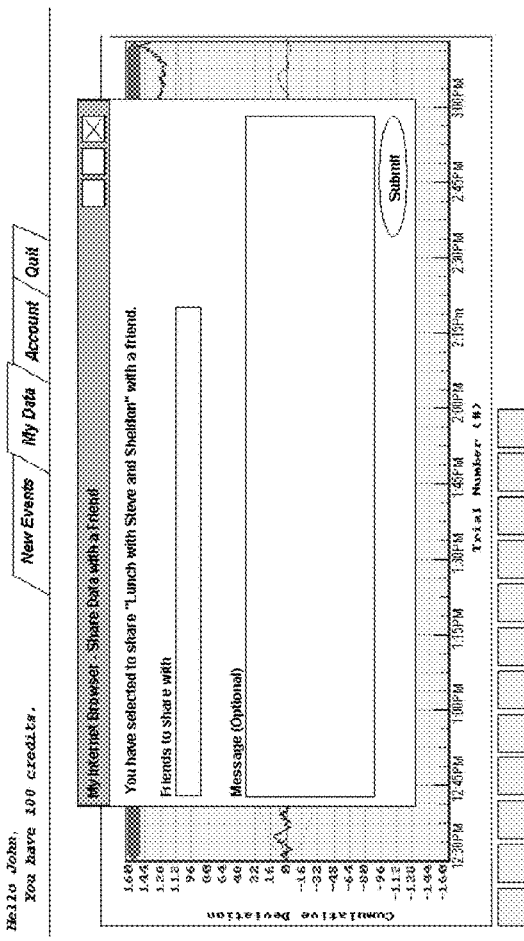
Figure 28: Sharing Data Figure 27: Additional Figures - Keywords
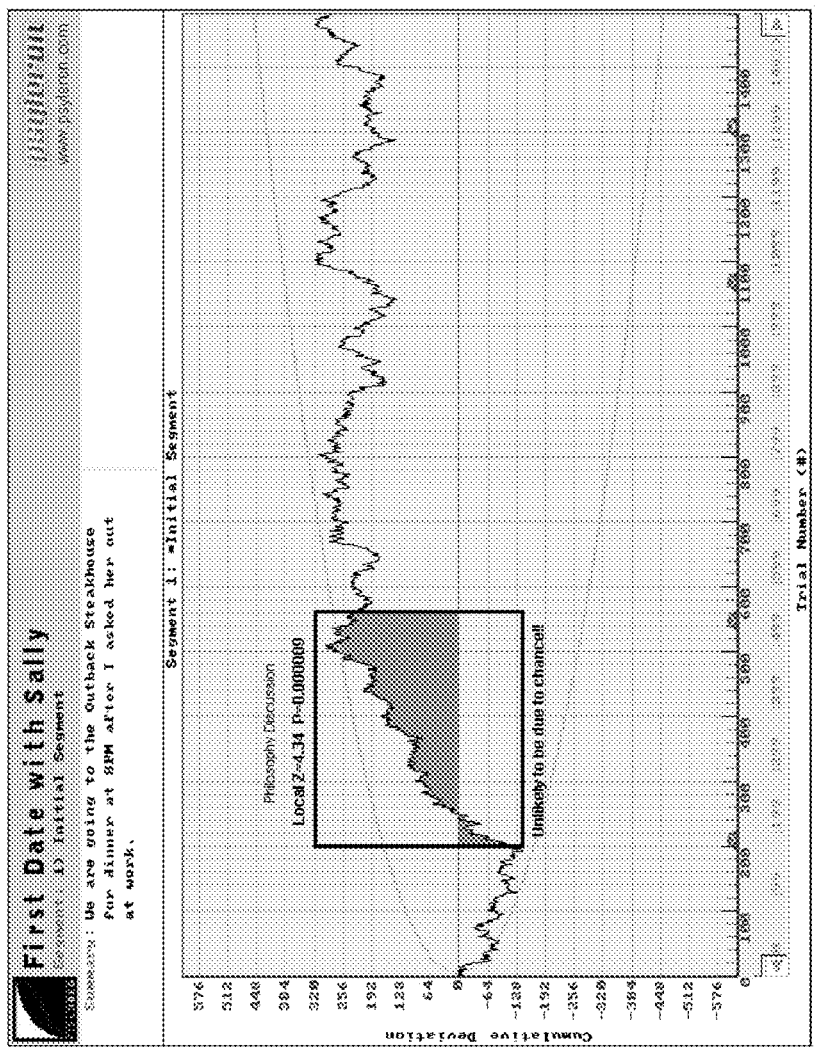

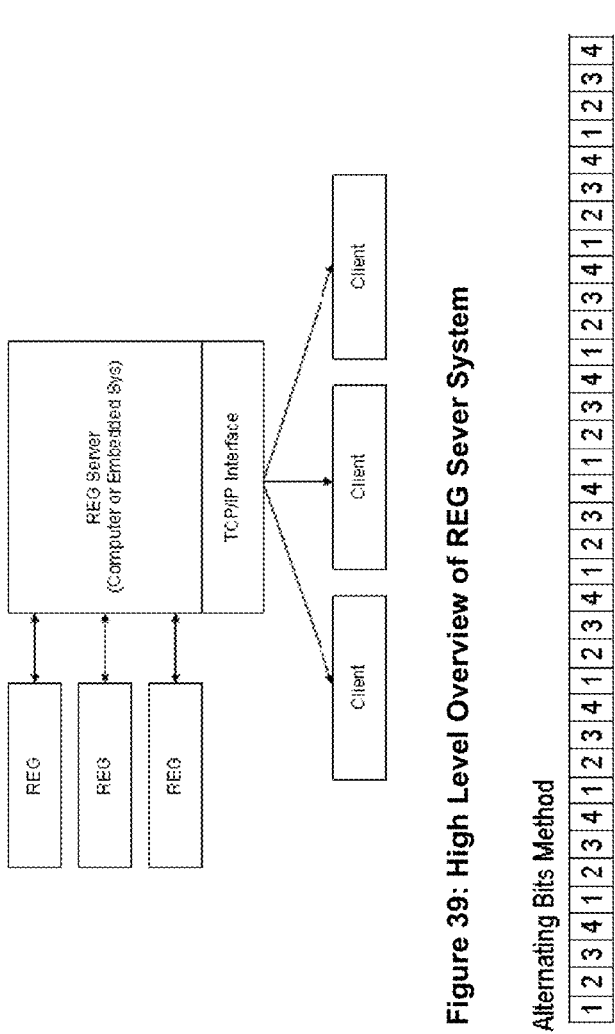
Figure 39: High Level Overview of REG Sever System
Figure 29: Splitting a BitStream into Virtual Streams

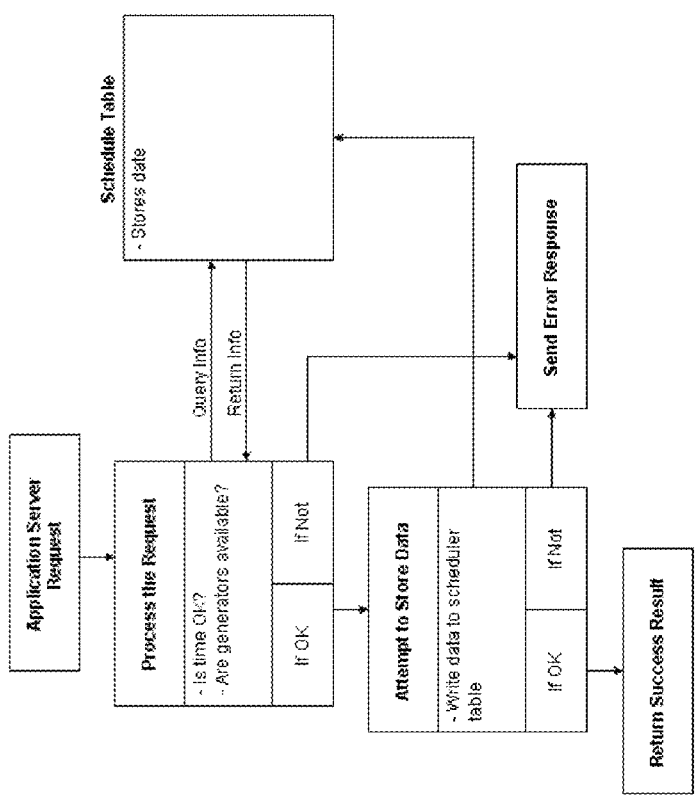
Figure 30: REG Scheduler -- Receiving a Schedule Request

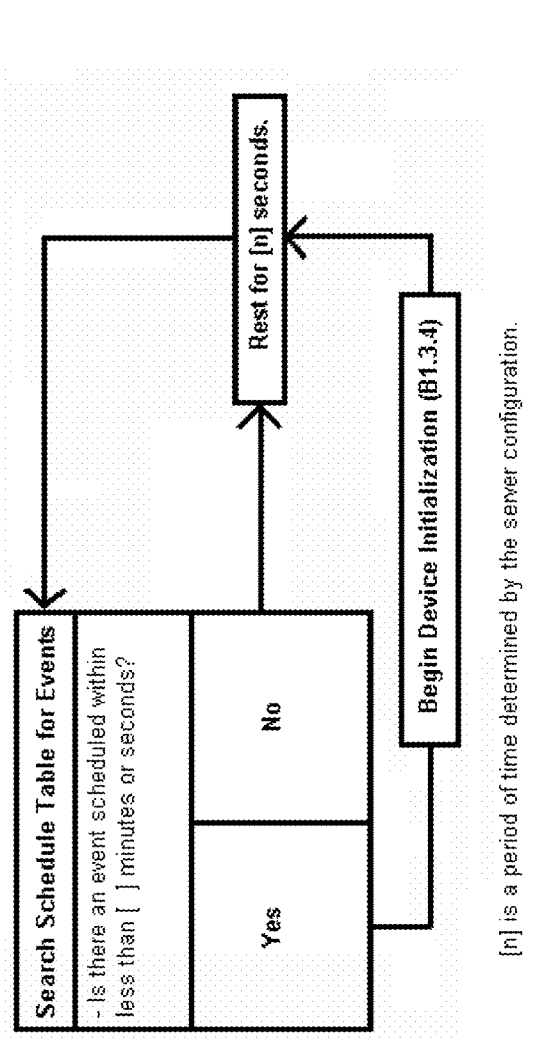
Figure 31: Monitoring the Schedule Table
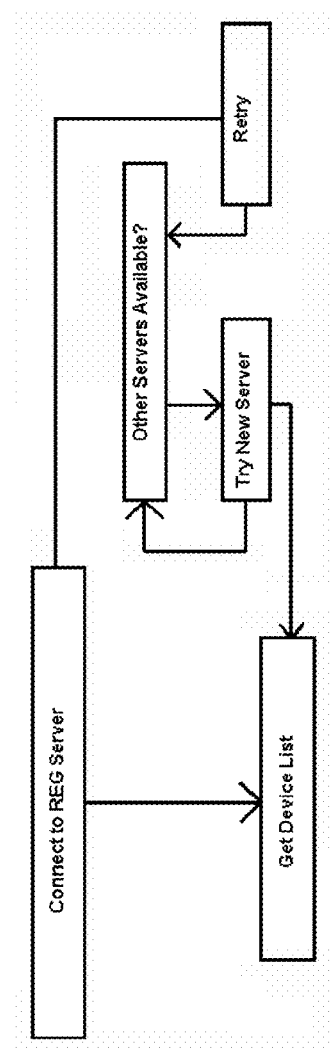
Figure 32: Boot Sequence

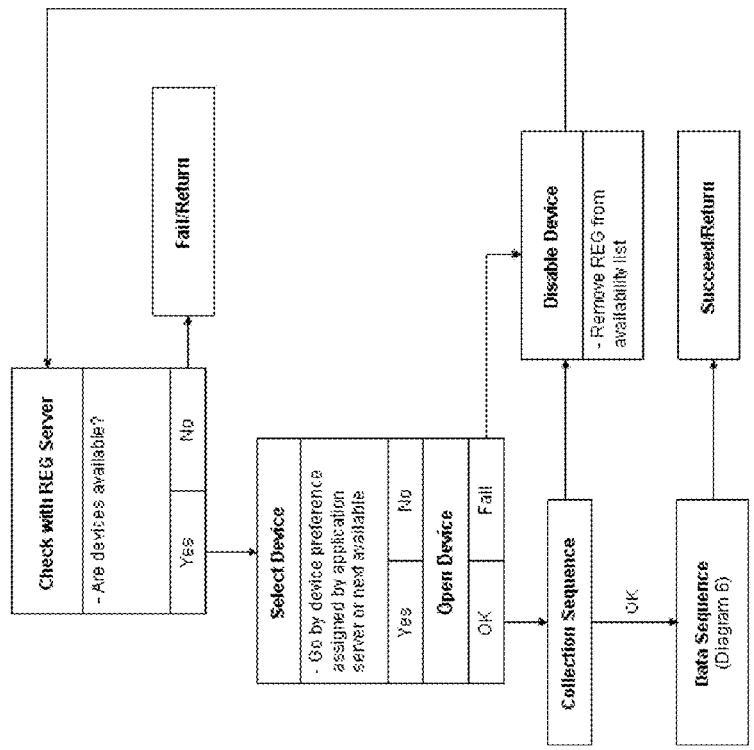
Figure 33: Initialization of a Single Device

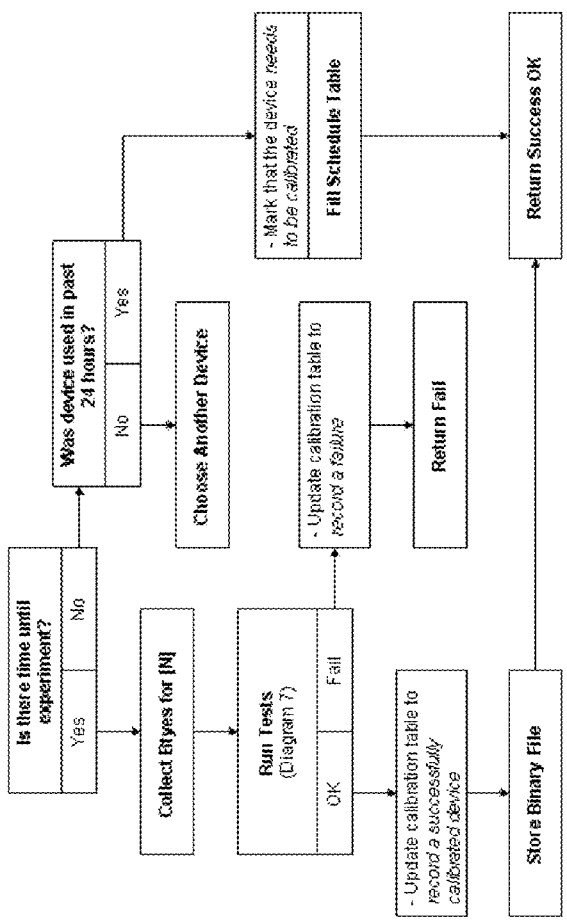
Figure 34: Calibration Collection Sequence

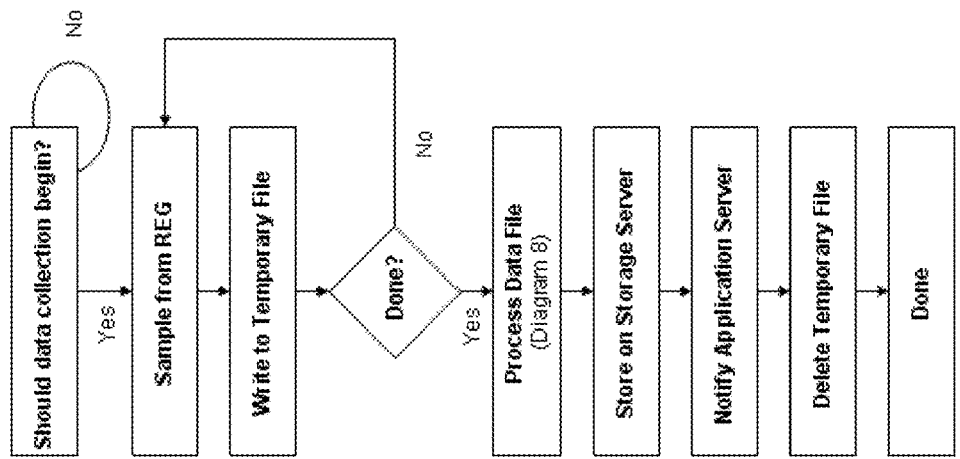
Figure 35: Data Collection Sequence

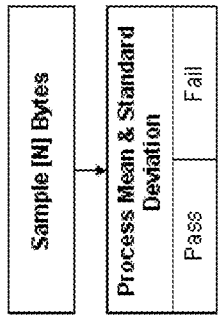
Figure 36 : Calibration Test Sequence
Pseudo Code (For an embodiment with P=0.5 independent binomial calibrations)
```
Mean
For N=0 to DataSize
{
    Sum = Sum + Data[N]
}
Avg = (Sum/DataSize)
Z = (Avg – Expected)/(sqrt(sigma)*sqrt(DataSize))
if(|Z| > 2.5)
    return Failure
else
    return Pass
```
Figure 37: Calibration Test Pseudo-Code

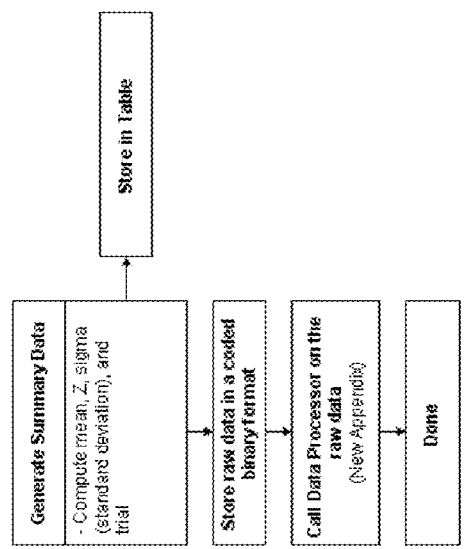
Figure 38: Processing the Data File

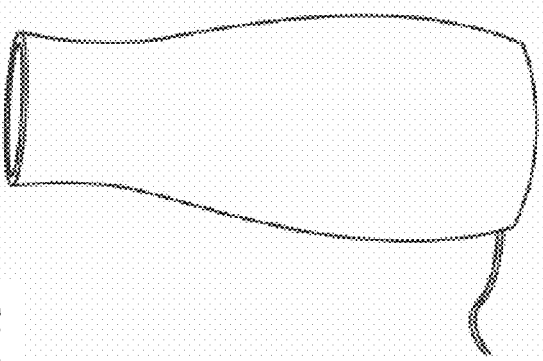
FIG. 40 - Example Housing for Invention
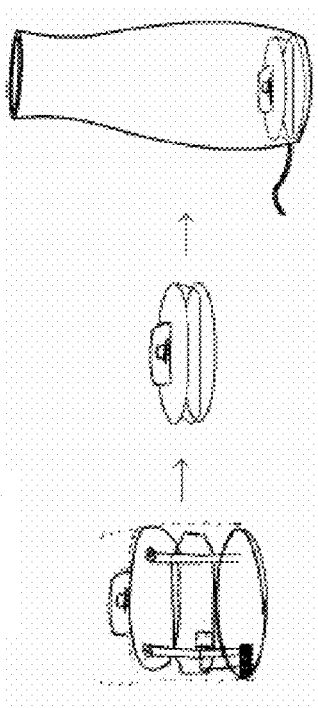
FIG. 41 - Components Combine to form Unit

SYSTEMS AND METHODS EMPLOYING UNIQUE DEVICE FOR GENERATING RANDOM SIGNALS AND METERING AND ADDRESSING, E.G., UNUSUAL DEVIATIONS IN SAID RANDOM SIGNALS

The present application is a continuation of U.S. application Ser. No. 15/847,893 filed Dec. 19, 2017, which is a continuation of U.S. application Ser. No. 14/802,538 filed Jul. 17, 2015, now U.S. Pat. No. 9,858,041, issued on Jan. 2, 2018, which is a continuation of U.S. application Ser. No. 12/742,210 filed May 10, 2010, now U.S. Pat. No. 9,152,381, issued on Oct. 6, 2015, which is a continuation in part of PCT application Number PCT/US2008/012623, filed on Nov. 10, 2008, which claims priority to each of the following prior provisional applications: (1) U.S. Provisional Application No. 60/986,954, filed on Nov. 9, 2007 (Valentino); (2) U.S. Provisional Application No. 61/012,434, filed on Dec. 9, 2007 (Valentino); (3) U.S. Provisional Application No. 61/014,941, filed on Dec. 19, 2007 (Valentino); (4) U.S. Provisional Application No. 61/037,439, filed on Mar. 18, 2008 (Valentino); and (5) U.S. Provisional Application No. 61/106,745, filed on Oct. 20, 2008 (Valentino). The entire disclosures of each of the above said U.S. non-provisional, PCT and U.S. provisional applications are all incorporated herein by reference.

BACKGROUND

1. Princeton University's PEAR Laboratory

The Princeton Engineering Anomalies Research (PEAR) Lab was founded in 1979 by Robert G. Jahn, Professor of Aerospace Engineering and Dean of the School of Engineering and Applied Science at Princeton University. An objective of the Lab was to study the ability of consciousness to influence physical processes. The lab was managed by Brenda Dunne, a developmental psychologist trained at the University of Chicago, and had a full-time staff of half a dozen scientists as well as numerous interns and visiting researchers. During its 28-year history, the lab worked to study and understand the anomalous impact that the mind seemed to have on physical devices, including electronic random event generators (REGs). Among other things, Princeton's PEAR laboratory discovered some basic principles as set forth in U.S. Pat. No. 5,830,064 related to theorized potential control an individual may have over his environment and how to effect such control.

For reference, said '064 patent describes its historical background as follows:

"Many types of experiments and devices utilize random-event generators or random-number generators. Such generators include true-random-number generators (that generate truly random numbers) and pseudo-random-number generators (those devices and computer programs that generate pseudo-random numbers, which are seemingly random numbers, but which in actuality are more or less deterministic). Pseudo-random number generators can include devices or programs that generate a complex sequence of numbers that are based on a "seed," and that, given one particular seed, will generate the same sequence of pseudo-random numbers. Between true- and pseudo-random-number generators are "biased-true-random-number generators," that generate a biased sequence of random numbers, wherein the bias is due to perhaps some environmental factor, such as electrical or magnetic fields, temperature, voltage, circuit drift, or some other factor or field.

In attempts to produce true-random-number generators, researchers have attempted to remove or minimize causes of bias in the random number sequences generated. Unbiased random numbers are useful in a number of experimental and applied sciences. In the past, such attempts have resulted in expensive and highly sophisticated electronic circuits, which have been large, non-portable, complex, and difficult to interface.

A number of years of experiments at the PEAR Lab using a highly sophisticated microelectronic random event generator have demonstrated correlation of certain mean shifts of the output function with the stated intentions of operators physically isolated from the apparatus, compounding to a high level of statistical significance. Although the mechanism by which probabilities are affected is still not understood, the phenomenon has been well documented and results published in respected and refereed scientific journals, as well as the book Margins of Reality, The Role of Consciousness in the Physical World, by Robert G. Jahn and Brenda J. Dunne, Harcourt Brace and Company, 1987. The invention to be described is concerned with the reduction to practice of the laboratory instrument, yielding practical devices which may be mass produced economically and operated in the field. Additionally, it defines various implementations of the technology and the applications to which they may be put.

Much effort has been devoted over history by inventors, scientists and even gamblers and sports figures to effect some degree of control over autonomous physical objects and systems above and beyond the use of muscular contraction and extension. For example, some golfers "ooch" their putts towards the cup even after the ball leaves the club face. Slot machine players look to winning strategies. The Air Force has invested millions in research to produce systems which enable fighter pilots to operate their cockpit displays and guns without removing their hands from the flight controls. Clearly a form of control over one's environment which emanates from the mind alone, unfettered by the need for physical contact, is something long sought, and has provided the theme for numerous science-fiction scenarios. It offers a challenge to the scientific mind, and has long been a subject of fascination to the public in general.

Game devices, such as self-powered toy vehicles or computer video games, often have user-input control devices, such as joystick controllers, keyboards, trackballs, or "mice" which translate manual movements of a human operator (e.g., hand or finger movements) into control signals for moving or controlling operation of the toy or game. Each of these user-input control devices requires some muscular movement by the user. Thus, a device that responded to human intention from a human without any direct connection, and could "read" the thoughts or intentions of the human in order to control some device, has been dreamt of, but never realized.

2. Psyleron, Inc.

Psyleron, Inc. was founded by individuals formerly working within and/or affiliated with the PEAR Lab and in close cooperation with founding members of the PEAR Lab, so as to further continue and expand beyond the original research initiated by the PEAR lab. Among other things, Psyleron's research is focused on better understanding how physical reality is affected by consciousness and/or other paranormal factors. Here, the terminology paranormal is used herein as a general term that describes unusual phenomena that lack a well-accepted scientific explanation. Here, paranormal should not be misinterpreted to encompass common misconceptions or assumptions, but rather to broadly encompass all extra-physical phenomena that may not currently be understood or that may only be partly understood within the scientific community. In this use of the term, many paranormal or extra-physical phenomena involve well understood results with limited understanding of the underlying cause, such as, e.g., the well known result that a person's positive attitude can affect their health in a positive way, while there are no currently uniformly accepted reasons therefor. Nevertheless, the fact that one's subjective mental state can affect their health is measurable and quantifiable vis-à-vis experiments which compare a control group not exhibiting the subjective behaviors in question with another group that expresses hope, motivation, enthusiasm or other "soft" factors relating to general well-being. From this, more accepted concept, there is a range of illustrative examples, ranging from the widely accepted to the very-limitedly accepted—by way of example, a large percentage of the population, worldwide, believe in some form of ability to engage in prayer to seek to impart some sort of change, and scientists writing established medical journals such as "Explore: The Journal of Science and Healing" have in some instances found results suggesting improvements due to prayer whose mechanisms are not yet explicable in classical scientific terms.

Here, Psyleron, Inc. has performed many studies in which certain paranormal or extra-physical results have been shown to occur. Recognizing, from a scientific perspective, that our scientific community does not have a well understood basis to explain such extra-physical results, Psyleron, Inc. can identify that such results relate, in short to, properties of consciousness (e.g. "mood," "feelings," "intention," "attitude,"), subjectivity (e.g. "beauty," "appreciation," "resonance,") and properties of interpersonal or environmental dynamics (e.g. "feeling connected," "being in the zone," "being on the same page") and that the scientific principles and concepts necessary to convey such processes may involve premises which are still being understood and are not yet a part of the well established nomenclature in any field. Furthermore, these explanations may involve premises ranging from those which may be generally accepted within the scientific community (e.g., that the phenomena in question emanate from yet unknown chemical, physical or biological origins), to those which may be less accepted in scientific principal yet which have a place in the common literature (e.g. resultant from a religious or spiritual process, due to God or some deity, resultant, resultant from one's own will-power, resultant from "Chi" (as in the Eastern Medical Sense), or from some other form of "energy" that is yet to be captured and well understood by conventional science), or a variety of yet other explanations. In short, the terminology extra-physical phenomena is used herein to identify unknown causal interrelationships outside of what is currently well known physical causes (e.g, Newtonian physics, heat transfer, gravity, magnetism, electricity or the like), but such could also involve yet not understood aspects or relationships related to such properties (e.g, such as how gravity is not understood and there exist many scientific theories relating to how the force of gravity creates its effects).

Another way to appreciate this is to note that extra-physical factors, in many instances appear to be related to human intention, mood, states of mind, and/or the like, but are not yet widely understood by science. These can also be understood to include anomalous phenomena, which has been defined as a phenomenon or class of phenomena which appear to be real on the basis of empirical data, study, and well-controlled good faith inquiries into the nature of the physical world, but which is not yet account for, fully explained, well understood, classified, or accepted in the current/mainstream body of scientific knowledge. An example of such phenomena would be the quantization of charge seen in data relating to the photo-electric effect, or the problem black body radiation not behaving according to the expectations and knowledge of classical physics in the early $20^{th}$ century. In both cases, empirical measurements of a phenomenon predated any known physical cause, but the existence of such empirical anomalies eventually to led the development of entire fields of science such as quantum mechanics and solid state physics, which ultimately led to thousands of future innovations.

While the original PEAR Lab and other's following in this general field have focused upon the degree by which one may be able to consciously control their external environment, the present inventors at Psyleron, Inc. have taken a different direction and have developed a variety of unique and highly usable and beneficial systems and methods based on this different direction. In particular, rather than focusing merely on the potential that one's consciousness may be able to control external matters and to strive for an extreme goal of creating control devices or the like, the present inventors have appreciated other applications and uses in relation to evaluation (e.g., metering, including, e.g., making a measurement from a device in order to come to a conclusion or idea about something in the environment) of nuances in random event generation anomalies and the like and the surrounding circumstances related thereto. Thus, rather than focusing solely on using the principle that one's mind may be able to control devices and to creates devices based on that principle, the present inventors have focused on, e.g., the principles that a) if there are in fact extra-physical or paranormal events (whether a users consciousness and/or some other event) that may impact our environment, then a user can gain valuable insight, appreciation and/or knowledge by observing such anomalies in random events and seeking to correlate them to an environmental occurrence.

To help the reader appreciate this notable distinction, FIG. 17 shows the prior focus upon having a user seek to control a device, such as, e.g., an REG device or another external device (i.e., resulting in focus on action in the direction of the arrow 1 shown in FIG. 17). In contrast, in many embodiments of the present inventors, the focus is not upon the users control of a device, but on having a device identify anomalies that may result from a variety of possible factors (such as, e.g., in the illustrative and non-limiting example shown in FIG. 18 based on the user him/herself, based on a group of individuals or inter-relational situation (e.g., depicted as a plurality of circles), and/or based on another environmental phenomenon that may or may not be known or appreciated), and having the device make the user aware of such situation (e.g., as a means to meter, identify, evaluate or observe, rather than to control, resulting in focus on action in the direction of the arrow 1 shown in FIG. 18). And, in some preferred embodiments described herein, this action also leads to facilitating identification of other environmental factors and/or issues (such as, e.g., shown at the arrow 2 in FIG. 18) that may have an impact on the operation or reading of the device. Thus, the device can serve to help the user to obtain a greater appreciation on events around him/her (i.e., resulting in evaluation, rather than control). It is noted that, among other things, Psyleron's well controlled experiments have demonstrated numerous results of this nature, such as, e.g., that when the REG is operated during games where people are having fun, a result frequently occurs, or when the REG is operated during a talk by a "charismatic speaker," an interesting result often occurs, while in various other, uninterested situations, such results do not often occur.

Among other things, as described herein-below, it is noted that the various embodiments herein do not rely on the paranormal phenomena for legal utility under 35 U.S.C. 101, but that, by way of example, the mere possibility or theoretical potential or belief in a user thereof can also achieve very valuable uses and benefits, from education, to helping focus attention, to amusement, to reminders, and more, as the reader will appreciate based on this disclosure.

3. References

Each and every one of the disclosures of Nelson, R. D., Bradish, G. J., Dobyns, Y. D., Dunne, B. J., Jahn, R. G., FieldREG Anomalies in Group Situations (1996). *J. Scientific Exploration,* 10, No. 1, pp. 111-141, Nelson, R. D., Jahn, R. G., Dunne, B. J., Dobyns, Y. D., Bradish, G. J, FieldREGII: Consciousness Field Effects: Replications and Explorations (1998). *J. Scientific Exploration,* 12, No. 3, pp. 425-454, U.S. Pat. No. 5,830,064, Bradish, et al., 1998, for an "Apparatus and method for distinguishing events which collectively exceed chance expectations and thereby controlling an output", U.S. Pat. No. 7,124,157, Ikake, 2006, for a "Random number generator", and U.S. Pat. No. 6,369,727, Vincze, 2002, for an "Analog-to-digital conversion method of random number generation", are incorporated herein by reference, in their entireties, as though recited in full.

SUMMARY

A system, in one embodiment, comprising a generator of a truly random signal connected to an input and feedback device for the purpose of providing a user with real time feedback on the random signal. The user observes a representation of the signal in the process of an external physical event for the purpose of finding a correlation between the random output and what happens during the physical event. The system, in another embodiment enhances the ability of users to correlate the effects of human consciousness with the output of random physical processes. A third embodiment teaches the method and apparatus of generating values, in particular to generating values that are influenced by human consciousness, and detecting whether the values fall outside chance probabilities.

In some preferred embodiments, the term "extra-chance deviation" can involve, e.g., when the output [e.g. theoretical output] of the REG has a known distribution (either theoretical, as in mathematically computable based on the physical nature and/or other properties of the system, or expected due to empirical calibrations, as in based on prior values obtained from sampling the REG many times to determine its behavior) and it is determined that a given output [e.g. sample] falls outside of a range that would be expected to occur by chance most of the time (e.g. those ranges which would occur by chance in 95%, 99%, 99.5%, 99.9%, . . . . , of situations), we deem the deviation to be "extra-chance." While these extra-chance events may and will happen even the absence of any influence due to consciousness, intention, or the outside environment, studies have shown that these deviations are more likely {e.g., occur more frequently than standard physical and statistical theory would predict} or more meaningful {e.g., occurring at times that are relevant to the user, or in accordance with some patterns not expected by standard physical or statistical theory} when human consciousness, intention, or other subjective factors are at work.

In some preferred embodiments, the term "Random Event Generator" (REG) includes, e.g., either a standard random event generator, or a random event generator combined with a process that looks for extra-chance occurrences (subsets of output which are statistically significant vs. the null-hypothesis that the random event generator is producing its expected theoretical output) in order to carry out, as some illustrative examples, one or more of the uses set forth in this application. As would be appreciated upon a full reading of this disclosure by those in the art, there is a distinction between a process that is supposed to be random based on physics and which is designed to be random in a control condition but which is no longer random under the influence of some anomalous factor(s) (such as, e.g., the effect of consciousness or the like).

In some preferred embodiments, some uses of the system of the present invention include the following:

1) A person uses the random event generator with software designed to aid in short-term decision making; for example, the output of the REG is used by a person to make binary decisions (e.g., YES or NO decisions regarding a choice or option). Here, it is noted that in the preferred implementation, this type of YES/NO process is a very unique and different use of a traditional REGs in the sense that getting a "Yes" or getting a "No" relies in some examples herein on producing some result which falls outside of chance probabilities. In particular, REG devices have not been understood as being capable of Yes/No and/or I/O types of decision-making. Here, the present inventor(s) has employed a novel and unique process involving detecting extra-chance probabilities and providing a particular answer YES or NO output based on, e.g., such extra-chance probabilities (e.g., passing a certain threshold). Here, the present invention is adapted to, e.g., look for an extra-chance result to derive a YES or NO output because it is expected that there is some other connection or influence.
2) A person uses the random event generator as in #1 above, but with additional software processing to allow for non-binary outcomes, selecting one of a larger number of possible choices based on the output of the device.
   a) In some examples, the random event generator generates numbers, which are used to predict.
   b) In some examples, the output is refined to include a statistical confidence level for each outcome based on the magnitude of the anomalous deviation from chance.
3) The output of the REG chooses which words should be selected from a word bank and presented to the user; in some examples, the user interprets the word or phrase as an answer to a question, uses it in a story and/or otherwise uses the word or phrase.
3b) A user enters different options into a program (such as, e.g., "Go to the movies"; "Visit my friend"; "Rent a video game"). The user then sits in front of the REG focusing on their goal, after collecting data for a period of time. At the end of the process, the software provides the operator with information relating to which choice they should pursue.
4) The output of the REG is processed to detect the influence of consciousness, and the output is used in conjunction with genetic algorithms, artificial intelligence, and/or a Monte Carlo simulation for the purpose of enhancing the efficiency of a financial or business or scientific simulation. In some illustrative examples, a small increase in the accuracy of such a simulation could make millions of dollars for a company.

5) The output of the REG is fed into a data-mining system along with other indicators for the purpose of, e.g., detecting indicators of subjective resonance in an environment. In a hotel chain, for example, REG output can be correlated with measures of guest satisfaction and/or with sales of products.

6) A person tests their ability to influence the outputs of the random event generator for the purpose of exploring the states of mind that are required to produce such an effect.
   a) For example, a program provides ways for a person to record their states of mind during the process by—e.g., such person typing in their subjective comments, speaking into a microphone, recording video of their experience, or allowing an observer to make comments.
   b) For example, the person is connected to a physiological monitoring apparatus and the output of the apparatus is correlated to the REG output in real-time and used to aid in, e.g., any of the above processes.
   c) For example, the person is connected to a physiological monitoring apparatus and the output of the apparatus is correlated to the REG output after the fact to explore how biological states correlate with extra-chance outcomes.

7) An REG is used as in #6 above, but with the aid of a facilitator who helps the person to explore and understand how their states of mind relate to the device, and subsequently how their states of mind help or hinder their performance in other activities (such as, e.g. other activities in day to day life).

8) A software program provides feedback to the user regarding, e.g., their REG performance, using a) artificial intelligence, b) the user's prior history and c) comments, and/or a) previously documented trends for the sake of, e.g., providing cues relating to the operators state of mind in their native language, as if another human being were providing feedback to them.

9) A REG circuit, connected to a microcontroller, is placed inside an object (such as, e.g., stuffed animal or toy)), and when extra-chance deviations from chance are detected, the circuit causes the toy to make response (e.g., an emotional response) to the user.

10) A REG circuit, connected to a microcontroller, is placed inside a piece of furniture or decorative object for the purpose of detecting emotional excitement or coherence in the environment. When such extra-chance deviations are detected over various time-scales, the device enters into, e.g., an attractive visual state for the purpose of alerting its viewers to the significance of the event. See, e.g., embodiments related to lamp and the like as described below.

11) The REG output is used in conjunction with a search algorithm to help locate a person, an object, and/or another item in an unknown location.

12) The REG output is used in a romantic or personal-relationship context, with users correlating extra-chance results with the potential for a strong emotional connection between participants on a date or in an intimate encounter.

In some of the preferred embodiments, the system can include some or all of the features described below. As described in the detailed discussions of the preferred embodiments, there are numerous embodiments of the present invention, and various aspects of these embodiments can be employed depending on circumstances (e.g., combining various functionality or uses in some embodiments with various architecture or technology in other embodiments). For example, various embodiments described herein can involve portable hand-held devices that are wholly independent units, to employing devices that are remote and communicate via, e.g., the Internet, cell phone and/or the like, such as, e.g., described in various embodiments hereinbelow. Moreover, various functionalities, such as, e.g., providing of messages (e.g., text messages) to users can be implemented in various architectures of the device (e.g., as messages made by a particular device for that device's user or sent via cellular phone, via the Internet, or the like.

1) Multiple analog noise sources are combined together on a single circuit board and combined together in a mathematical manner so as to enhance the statistical output of the device without resorting to pseudo-random or deterministic processing.

2) Multiple, independent random event generator units are combined together in a single package for the purpose of being able to serve out a large number of random bit-streams to users over the internet, with each user "owning" their own portion of a particular unit and bit stream.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

FIG. 1 is an initial screen illustrating an illustrative set up of an experiment in accordance with an illustrative embodiment of the invention;

FIG. 10 depicts an illustrative embodiment having a LCD display, external buttons, a wireless transmitter, and a memory card reader in accordance with an embodiment of the invention;

FIG. 11 depicts an embodiment including a slide-up LCD screen and full keyboard in accordance with an embodiment of the invention;

FIG. 12 illustrates a smaller version of FIG. 11 in accordance with an embodiment of the invention;

FIG. 13 illustrates a device having a toggle knob and multi-buttons in accordance with an embodiment of the invention;

FIG. 14 illustrates the device having three push buttons in accordance with an embodiment of the invention;

FIG. 15 illustrates an embodiment incorporating the device into a body-worn device (e.g., an arm or wrist worn device, such as, e.g., a wrist-watch) in accordance with some embodiments of the invention;

FIG. 19 is an illustrative architectural technical diagram according to some illustrative embodiments, while

FIG. 20 is an example screen and usage process user interface login screen according to some embodiments;

FIG. 21 is an illustrative Event Scheduler display according to some embodiments;

FIG. 22 is an illustrative Event Scheduler Confirmation screen according to some embodiments;

FIG. 23 is an illustrative exemplary email received from an auto-mailer according to some embodiments, while FIG. 23(A) is an illustrative email attachment and FIG. 23(B) is an illustrative attachment with textual data according to some embodiments;

FIG. 24 is an illustrative Main Page display according to some embodiments;

FIG. 25 is an illustrative screen related to viewing of data online according to some illustrative embodiments;

FIG. 27 is an illustrative screen shot related to an exemplary situation involving a "first date with Sally" according to some embodiments;

FIG. 28 is an illustrative screen related to, e.g., sharing of data according to some embodiments;

FIG. 29 is an illustrative diagram depicting splitting a bit stream into virtual streams;

FIG. 30 is an illustrative diagram depicting the REG Scheduler receiving a Schedule Request;

FIG. 31 is an illustrative diagram depicting monitoring the Schedule Table according to some embodiments;

FIG. 32 is an illustrative boot sequence diagram according to some embodiments;

FIG. 33 is an illustrative diagram showing initialization of a single device according to some embodiments;

FIG. 34 is an illustrative diagram showing calibration collection sequence according to some embodiments;

FIG. 35 is an illustrative diagram showing a data collection sequence according to some embodiments;

FIG. 36 is an illustrative diagram showing a calibration test sequence according to some embodiments;

FIG. 37 is an illustrative calibration test pseudo code according to some embodiments;

FIG. 38 is an illustrative diagram depicting processing of the data file;

FIG. 39 is an illustrative diagram depicting a high level overview of an REG server system according to some embodiments;

FIG. 40 is an illustrative housing for a lamp according to some embodiments of the invention;

FIG. 41 is an illustrative perspective view of some illustrative components that are combined into some embodiments of the invention;

DETAILED DESCRIPTIONS OF THE PREFERRED EMBODIMENTS

Figure 2:
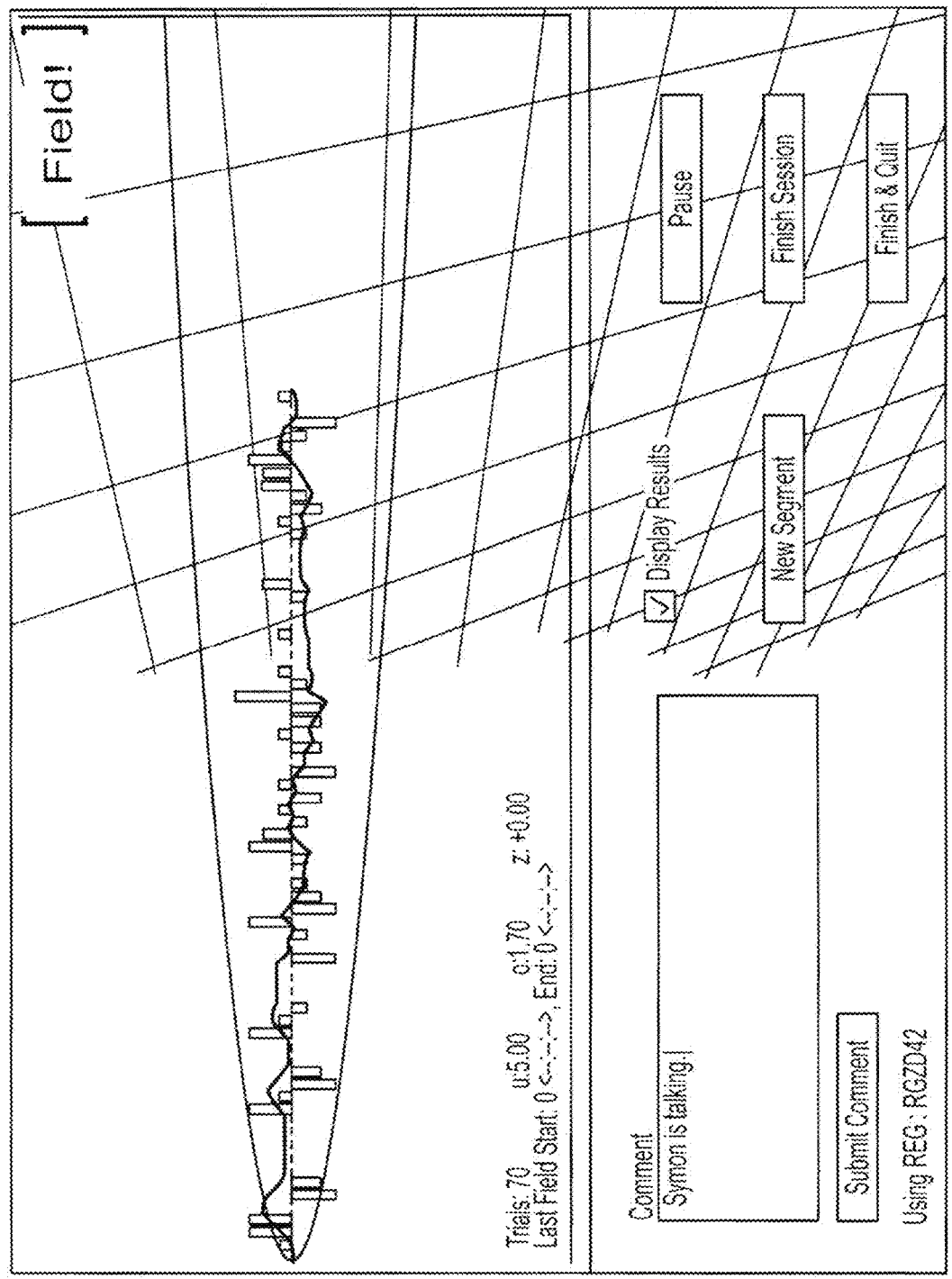
FIG. 2 shows some illustrative comments that are made as things happen in an environment in accordance with an illustrative embodiment of the invention.

1. Embodiment Set "I"—A System for Correlating Events with Deviations from Chance Due to Interpersonal Happenings in Real-Time Overview:

A system comprising a generator of a truly random signal connected to an input and feedback device for the purpose of providing a user with real time feedback on the random signal. The user observes a representation of the signal while acting as an observer or participant in an external physical event for the purpose of finding a correlation between the random output and what happens during the physical event.

In an illustrative embodiment of the invention, an electronic source of true physical randomness, self powered, as for example by a battery (such as, e.g., a 3V lithium ion battery), is interfaced to a microcontroller which, based on the configuration of activation or control mechanisms, such as switches, buttons, or the like, performs one or more computations on a digitized representation of an analog source of physical randomness (such as but not limited to the current across a reverse-biased PN junction such as in a transistor or diode; the output of a phototransistor, photoresistor, photo-multiplier or other electronic apparatus that allows current to flow, voltage to increase, or resistance to change as a result of incident photons that arrive in some stochastic way; an electronic signal measured by a Geiger county or other instrumentation meant to measure radioactive decay; pixels from a CMOS, CCD, or other digital camera measured in dark conditions where the leakage of current and thermal environment can create a non-deterministic output signal). In some embodiments, the result of these computations subsequently drives one or more signaling sources, such as, e.g., one or more LED, an audible alarm, or a vibrating motor, and/or another device, such as, e.g., a monitor, or even a printer, for, e.g., the purpose of informing a user of an outcome (e.g. that the digitized representation of the random analog signal has surpassed certain pre-determined levels of statistical significance).

By way of example, this type of device would have a variety of advantageous uses and applications. For example, a user could use the device to correlate an REG output with their environment. For instance, when the REG notifies the user of an event (e.g., when it buzzes), the user may, e.g., be talking on the phone with a friend, or when an individual walks into a room, or when some other event occurs, which can then lead the user to address the situation differently, such as, e.g., to go initiate a conversation with the person that entered the room or the like.

In a preferred embodiment of the device, data sampled from the analog source is stored to a form of internal memory within the device and later sent to a computer using, e.g., a) a hard wired interface such as, e.g., an USB, firewire connection or b) a wireless interface, such as, e.g., a Bluetooth connection or another wireless interface. The person is then able to analyze said data using the personal computer and compare happenings in the data with recollections of an event.

In a further embodiment of the invention, a portable hand-held device is provided with a user manipulated interface (such as, e.g., buttons or the like) and a display (such as, e.g., an LCD screen), wherein the device can be carried around by a user, such as, e.g., when attending an event, such as a meditation session. In some embodiments, at the press of a button on the device, the device begins "recording" data by taking samples from an internal random generator, and it plots them on the display or screen in a manner that expresses the likelihood of said random signals occurring by chance. If the user observes statistically significant deviations from signals that would be generated purely by chance, the user can then examine the subjective environment in order to determine the cause of the deviation from chance.

The above and/or other aspects, features and/or advantages of various embodiments will be further appreciated in view of the following description in conjunction with the accompanying figures.

Discussions Regarding Embodiment Set "I"

In an embodiment of the invention, the device is provided with a circuit in which there is a high ohm resistor fed into the gate of a FET that creates a source of thermal noise. The thermal noise is filtered using passive components (such as resistors and capacitors) and put through a multi-stage transistor amplifier or op amp for the purpose of amplifying the signal, preferably, by a factor of at least 100.

The effect of the analog source is to generate a non-deterministic analog signal that can be sampled by a digital circuit to create a fundamentally unpredictable source of random bits. That is, in some preferred embodiments, rather than relying solely upon an algorithm to generate random numbers, another input, such as, e.g., an analog input, is provided to feed an unpredictable variable to the random number generation system. In some illustrative preferred embodiments, the analog input is related to ambient conditions, or to changes in such conditions. In some embodiments, ambient conditions can range from physical conditions, such as temperature, pressure, humidity, and/or the like, to emissions from biological creatures (such as, e.g., plants, bacteria, insects, rodents, etc., up to and including humans). The analog signal is preferably not affected by ambient conditions. However, ambient conditions can preferably be measured and factored into the processing in order to negate the affect of ambient conditions. [For example, in the prior case, temperature may be monitored and the microcontroller may calculate an increase in the mean number of "1" bits per each increase in temperature, and dynamically re-normalize the data according to the temperature in order to maintain a 50/50 balance of "1" and "0" bits.] In some embodiments, biological emissions can include those that are presently known, as well as those that will be known in the future. In some embodiments, in the case of biological changes, it can be advantageous to correlate the REG output with the biological signal for the purpose of enhancing the output. For example, heart rate variability can be measured to get a sense of whether or not a person is feeling stressed, and processed in conjunction with the random output; by way of example, if a program identifies that results occurred more often when a person is not stressed, it can report on that or provide a new feedback. By way of example, if a particular measured deviation in the REG could be determined, based on prior research, to correspond to either enthusiasm or to anger, the system might, e.g., use the physiological correlates (such as, e.g., heart rate, galvanic skin response, FMRI readings, the output of EEG or EKG apparatus) to determine if the person is more likely enthusiastic rather than angry, and the system can be configured to, thus, rule out any kind of feedback message that would correspond to anger such as "You need to stop being so angry!" And, the feedback that is presented can be enhanced based on the physiological state of the end user.

A low power microcontroller running off of an internal oscillator connects to the analog source and to external control circuitry (e.g., input, output, memory, and communications.) The digital portion of the circuit uses a comparator or analog-to-digital converter to sample the analog source, and subsequently performs various calculations on the bits based on the state of the external control circuitry.

In some embodiments, the calculations can be in any combination, such as for example:

1) Enable one or more of many outputs based on a value sampled from the analog source at a point in time;
2) Selectively invert some digitized bits sampled from the analog output for the purpose of, e.g., enabling or disabling one of the many outputs;
3) Generate a running average of bits or of selectively inverted bits from the digitized analog source over a period of time and modify the state of the output circuitry based on that combination;
4) Take a measure of variance on the digitized analog output sources over a period of time and modify the state of the output circuitry based on that variance;
5) Modify the state of outputs based on the state of prior outputs (for example, playing a game where the external output is changed when the digitized analog input returns similar values);
6) Accumulate outcomes in a register for the purpose of triggering an event when a particular threshold has been reached;
7) Comparing digitized analog inputs to a template for the purpose of triggering an event at an unpredictable time.

In some embodiments, a memory attached to the Microcontroller stores digitized samples from the analog source and information about the state of control circuitry whenever the device is activated by a configuration of other elements in the control circuitry, or continuously samples data from the analog source.

In some embodiments, a communications chip (e.g., Bluetooth, USB, or the like) is connected to the microcontroller for the purpose of sending data to a computer or device (such as, e.g., a PC), where it can be read by another program and subsequently copied to a storage device, such as a hard disk.

In some embodiments, inputs to the microcontroller can be a combination of push buttons, potentiometers, a touch screen, and switches, and/or the like, which are fed through passive components or semiconductors for the purpose of enabling a user to configure the operation of the microcontroller.

In some embodiments, outputs of the microcontroller can be any combination of visual displays (such as, e.g., LEDs, or LCDs), audible devices such as buzzers, speakers, or piezoelectric elements, and/or tactile sensors such as vibrating motors or buzzers for the purpose of communicating a result to the user.

In some embodiments, the analog portion of the circuit can be enclosed in a conductive metal housing as a supplement to any external shielding that is provided as a result of the device's case.

In a preferred embodiment, the device can be in the form of a small portable electronic device, such as, e.g., similar to a keychain-like device, such as, e.g., rectangular in shape, with at least two push buttons, three LEDs, and a vibrating motor. Other embodiments can include a retractable USB connector and can be carried around as is common with portable electronics devices.

In some embodiments, applications can be in any of a variety of forms, as for example:
1) To generate truly random binary outcomes that can be observed by the user;
2) As an aid or supplement to decision making where a chance element would provide useful;
3) As an electronic game or as part of an electronic game;
4) As a reminder of events or ideas that could benefit from random timing—such as, e.g., to remind a person to write down what they are thinking about, or as an aid to induce lucid dreaming (i.e., by reminding of an individual to perform a certain act or to focus on a certain act at a particular point in time);
5) As a detector of the effects of consciousness in group environments;
6) As an educational tool to provide a demonstration of concepts of probability.

Additional Features:

In some embodiments, the system enables the user to enter information about the current subjective environment into the computer as the program runs and events happen in the world. For example, a music critic might type "Angela sings the introduction" as said data is recorded, so that it can be retrospectively examined and compared to other such events.

In some embodiments, the system can make real-time measurements with audio and/or video in order to identify other correlations.

Descriptions of Further Examples of Embodiment Set "I"

General Description

According to some other embodiments, an electronic source of true physical randomness (which is, e.g., powered by a battery, such as, e.g., by a 3V lithium ion battery) is interfaced to a microcontroller which, based on the configuration of attached switches and buttons, performs one or more computations on a digitized representation of the analog source. In some embodiments, the result of these computations subsequently drives one or more signaling sources, such as, e.g., one or more LED, an audible alarm, and/or a vibrating motor, for the purpose of, e.g., informing a user of the outcome.

In some advanced embodiments of the device, data sampled from the analog source is stored in, e.g., an internal memory and later sent to a computer using, e.g., a wired transmission (e.g., via USB) or a wireless transmission (e.g., via Bluetooth).

Analog Source:

In some embodiments, a high ohm resistor fed into the gate of a FET creates a source of thermal noise, which is filtered using passive components and put through a multi-stage transistor amplifier or op amp for the purpose of amplifying the signal by, e.g., a factor of at least 100.

Preferably, the effect of this analog source is to generate a non-deterministic analog signal which can be sampled by a digital circuit to create a fundamentally unpredictable source of random bits.

Digital Circuit:

In some embodiments, a low power microcontroller with its clock rate set by an internal oscillator connects to the analog source and to external control circuitry (e.g., input, output, memory, and communications.) In some examples, the digital portion of the circuit uses a comparator or analog to digital converter to sample the analog source, and subsequently performs various calculations on the bits based on the state of the external control circuitry.

In some embodiments, the calculations can include one or more of the following:
1) Enabling one or more of many outputs based on the value sampled from the analog source at a point in time;
2) Selectively inverting some digitized bits sampled from the analog output for the purpose of enabling or disabling one of the many outputs;
3) Generating a running average of bits or of selectively inverted bits from the digitized analog source over a period of time and modifying the state of the output circuitry based on that combination;
4) Taking a measure of variance on the digitized analog output sources over a period of time and modifying the state of the output circuitry based on that variance;
5) Modifying the state of outputs based on the state of prior outputs (for example, playing a game where the external output is changed when the digitized analog input returns similar values);
6) Accumulating outcomes in a register for the purpose of triggering an event when a particular threshold has been reached;
7) Comparing digitized analog inputs to a template for the purpose of triggering an event at an unpredictable time.

Memory:

In some embodiments, a memory attached to the Microcontroller stores digitized samples from the analog source and information about the state of control circuitry whenever the device is activated by a configuration of other elements in the control circuitry, or continuously samples data from the analog source.

Communications:

In some embodiments, a communications chip (e.g., wireless, such as, e.g., Bluetooth or wired such as, e.g., USB) is connected to the Microcontroller for the purpose of sending data to the PC, where it can be read by another program and subsequently copied to, e.g., the hard disk.

Input Circuitry:

In some embodiments, inputs to the microcontroller are a combination of push buttons, potentiometers, and/or toggle switches which are fed through passive components or semiconductors for the purpose of allowing a user to configure the operation of the microcontroller.

Outputs:

In some embodiments, outputs of the microcontroller can include any combination of, e.g., visual devices (such as, e.g., LEDs and LCDs), audible devices (such as buzzers, speakers, or piezoelectric elements), and tactile sensors such as vibrating motors or buzzers for the purpose of communicating a result to the user.

Shielding:

In some embodiments, the analog portion of the circuit can be enclosed in a conductive metal housing as a supplement to any external shielding that is provided as a result of the device's case. The system is preferably designed such that the system is shielded from all classically known forces (such as, e.g., gravity, physical pressure, motion, electromagnetic fields, humidity, etc., and/or, such classical forces are factored out of the process as much as possible. The system is, thus, preferably designed to be selectively responsive to signals from living creatures, such as, in particular, humans.

Form Factor:

According to an illustrative initial embodiment of the device, is the device includes a small rectangular key chain with two push buttons, three LEDs, and a vibrating motor. In some other embodiments, other models can include, e.g., a retractable USB connector and/or can be carried around as portable electronics devices (such as, e.g., by employing a support strap, band, or tether, a clip, a buckle or clap, and/or another mechanical coupler configured to support the device upon a user).

Uses:

According to some illustrative embodiments, one or more of the following uses can be carried out:

1) To generate truly random binary outcomes which can be observed by a user;
2) As an aid or supplement to decision-making where a chance element would provide useful;
3) As an electronic game;
4) As a reminder of events or ideas that could benefit from random timing—such as to, e.g., remind a person to write down what they are thinking about, or as an aid to prompt an individual to perform certain mental tasks (such as, e.g., as an aid to induce lucid dreaming by imparting an alarm or other notification for an individual in a resting state);
5) As a detector of the effects of consciousness in group environments;
6) As an educational tool to provide a demonstration of concepts of probability;
7) As a method of assessing the subjective "resonance" or "connection" between groups of people; and/or
8) As a method of creating a subjective assessment of the merits of ideas that come up during a business meeting.

Bottom-Line Point:

With reference to the foregoing uses, one bottom-line point is that extra-chance deviations can correlate with times that are of particular subjective meaning to the observer. The above illustrative uses include, e.g., environments within which extra-chance deviations (i.e., identified by an REG unit) can be correlated to certain such times or events, such as, e.g., during a group meeting (i.e., use item #7), during a business meeting (i.e., use item #8), during decision-making (i.e., use item #2), etc. In some preferred embodiments, the device makes it possible for people to take a physical measurement of something (e.g., an REG reading that is commensurate with a particular usage scenario or event) that was otherwise intangible.

SPECIFIC ILLUSTRATIVE EXAMPLES

Example I

In this illustrative example, an employee of a retail store has a background application running on a checkout screen that displays a processed version of a similar random signal. When a new checkout begins, the generator begins to produce a feedback that is meant to be indicative of the interaction between the customer checking out and the employee. For example, the system can enable the customer and/or employee to become aware of strong deviations from chance and can, e.g., inform or cue the employee to act towards the customer in a specific or pre-defined way.

Example II

Figure 1:
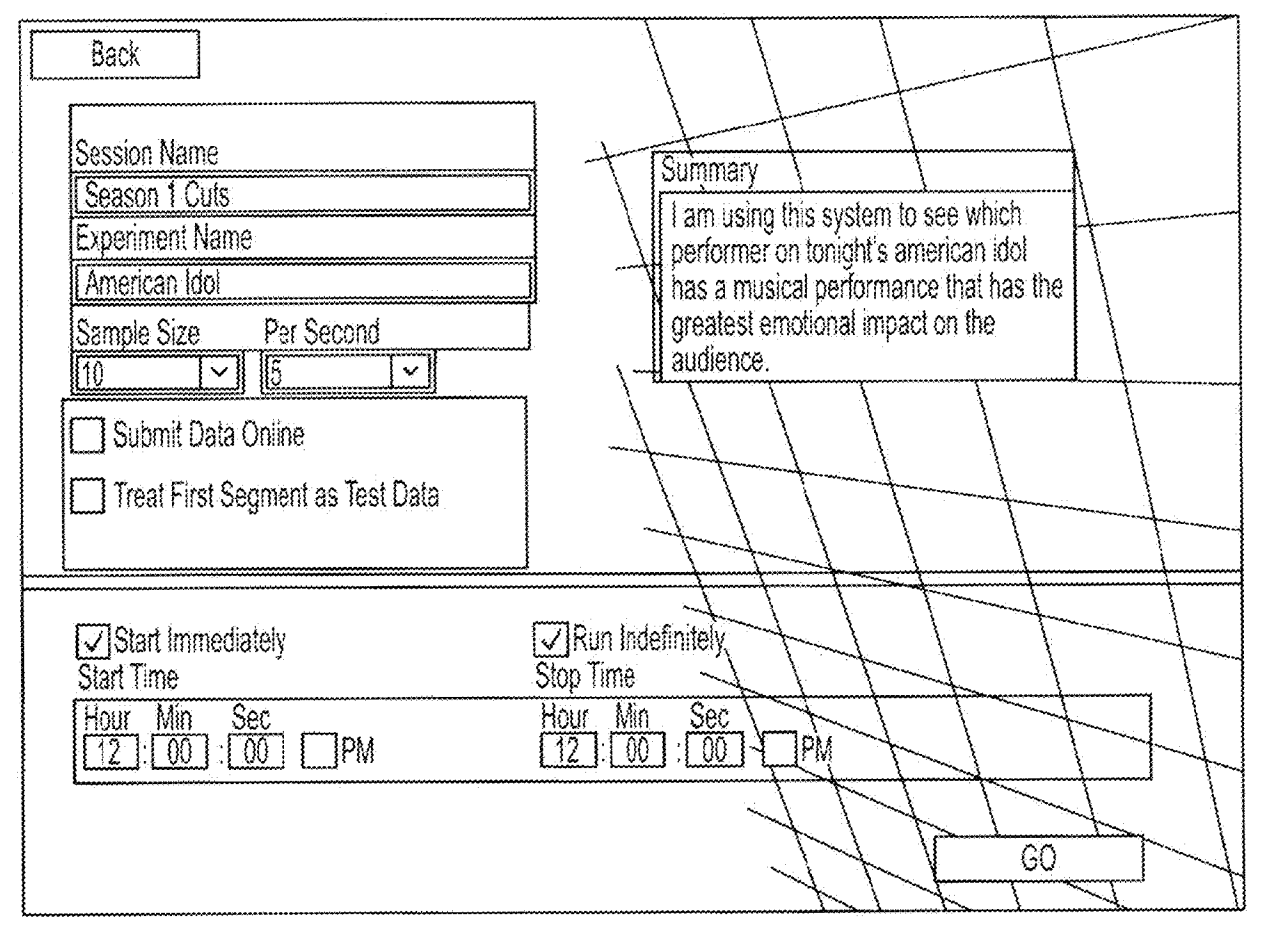

In this illustrative example, during an opera, a music critic or recruiting agent carries a small handheld device (similar to a device as could be employed in Example #1) and operates it (e.g., holds down a button) as a performer gives a presentation, creating a profile of the performer based on the extent to which the performance causes the generation of a statistical deviation from chance. By way of illustration, FIGS. 1-7 shows some illustrative data that is picked up as the Parkers (i.e., hypothetical performers) performed on "American Idol."

In this regard, FIG. 1 shows an illustrative graphical user interface of a device and illustrates the setting up of an experiment to explain what is being done.

In addition, FIG. 2 illustrates a graphical presentation of deviations from chance, along with a comment field to enter comments that are made as things happen in the environment.

Figure 3:
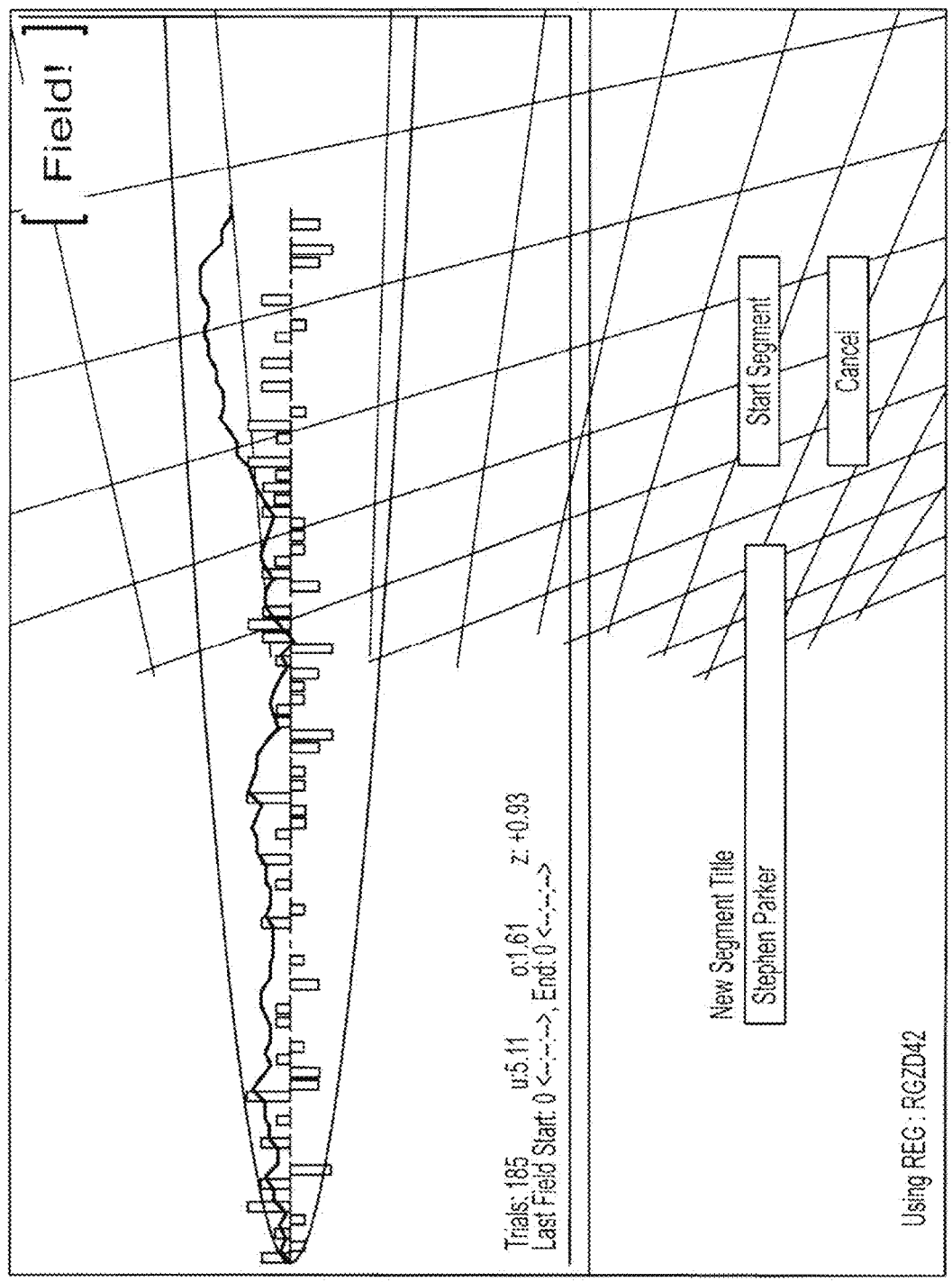
FIG. 3 is an illustration of a new segment in data in accordance with some illustrative embodiments of the invention.

In addition, FIG. 3 is an illustration of a new segment in the data as Stephen Parker (i.e., a hypothetical performer) comes on to give his performance and shows, e.g., a response to the performer's high-note. The deviation downward and outside of the parabola might suggest how the audience responded to the event.

Figure 4:
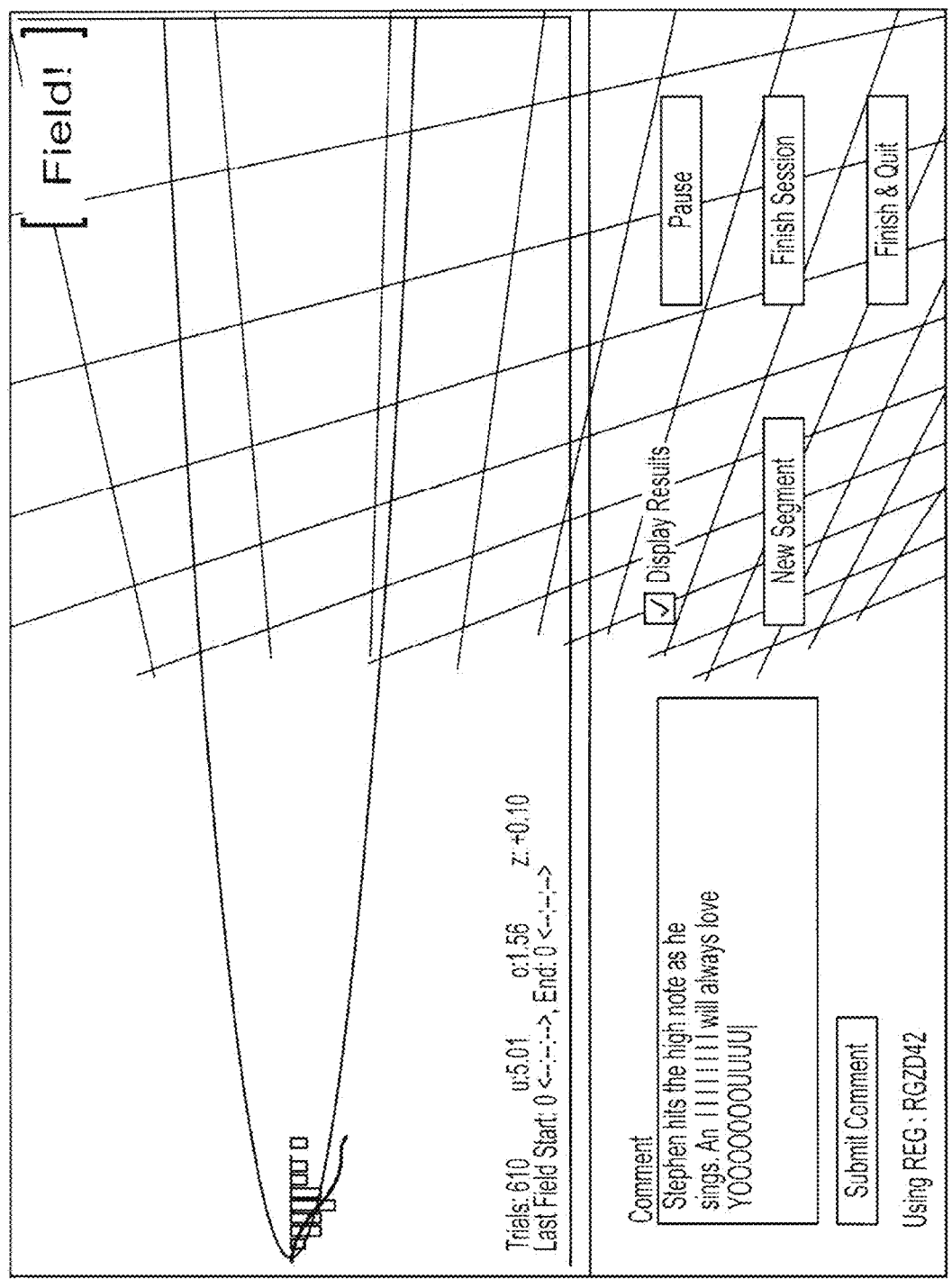
FIG. 4 is a graphic illustration of data relating to the performance illustrated in FIG. 3 in accordance with some illustrative embodiments of the invention.

In addition, FIG. 4 is an illustrative graphic illustration of data relating to Stephen Parker's performance for use after the event (such as, e.g., in order to tell the performer's wife about her husband's performance). In this illustrative example, the data indicates that Mr. Parker's performance was flat except, that there is little marker (e.g., blue marker) at the bottom of the graph.

Figure 5:
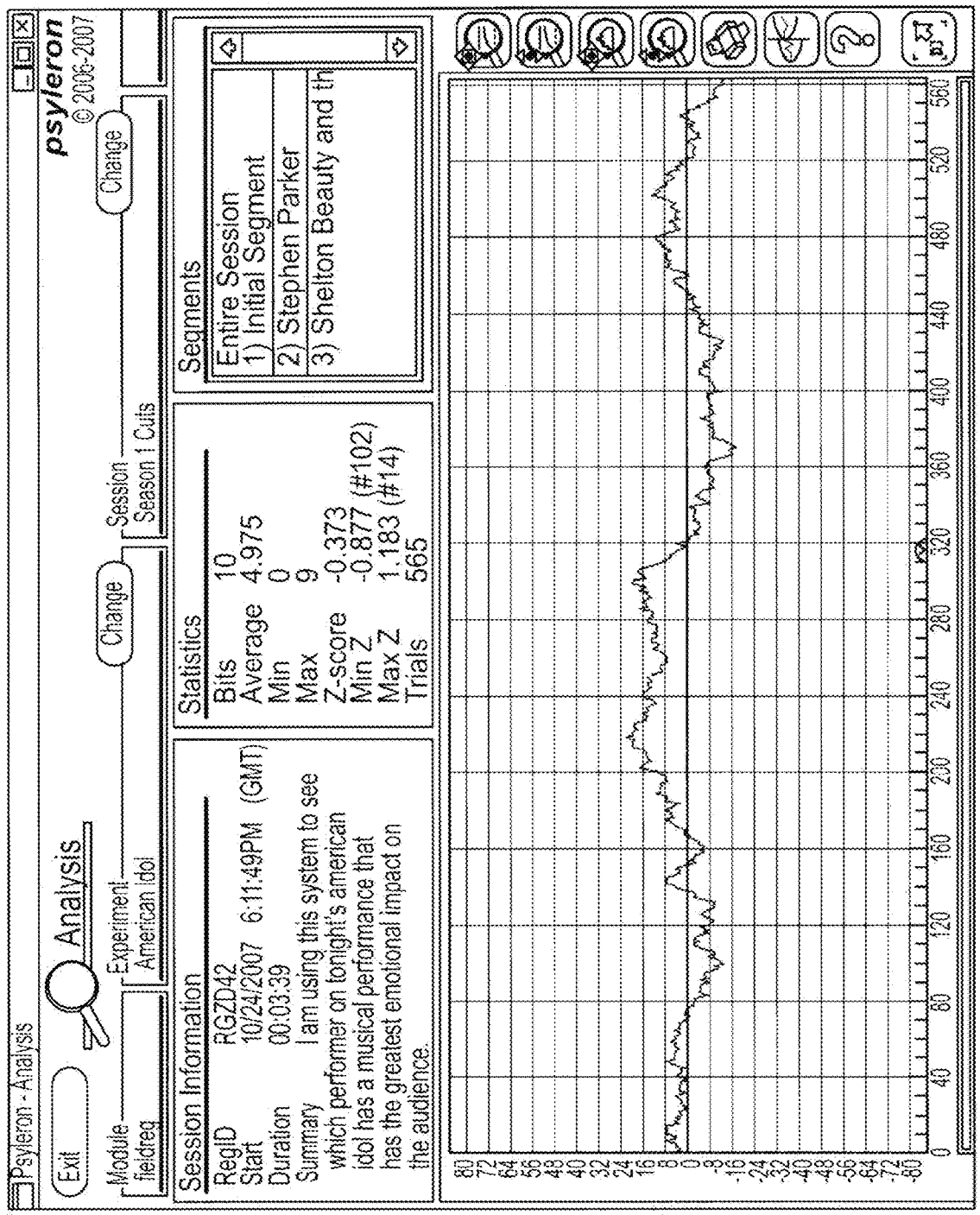
FIG. 5 is a graphical illustration of additional data relating to the performance of FIG. 3 in accordance with some illustrative embodiments of the invention.
Figure 6:
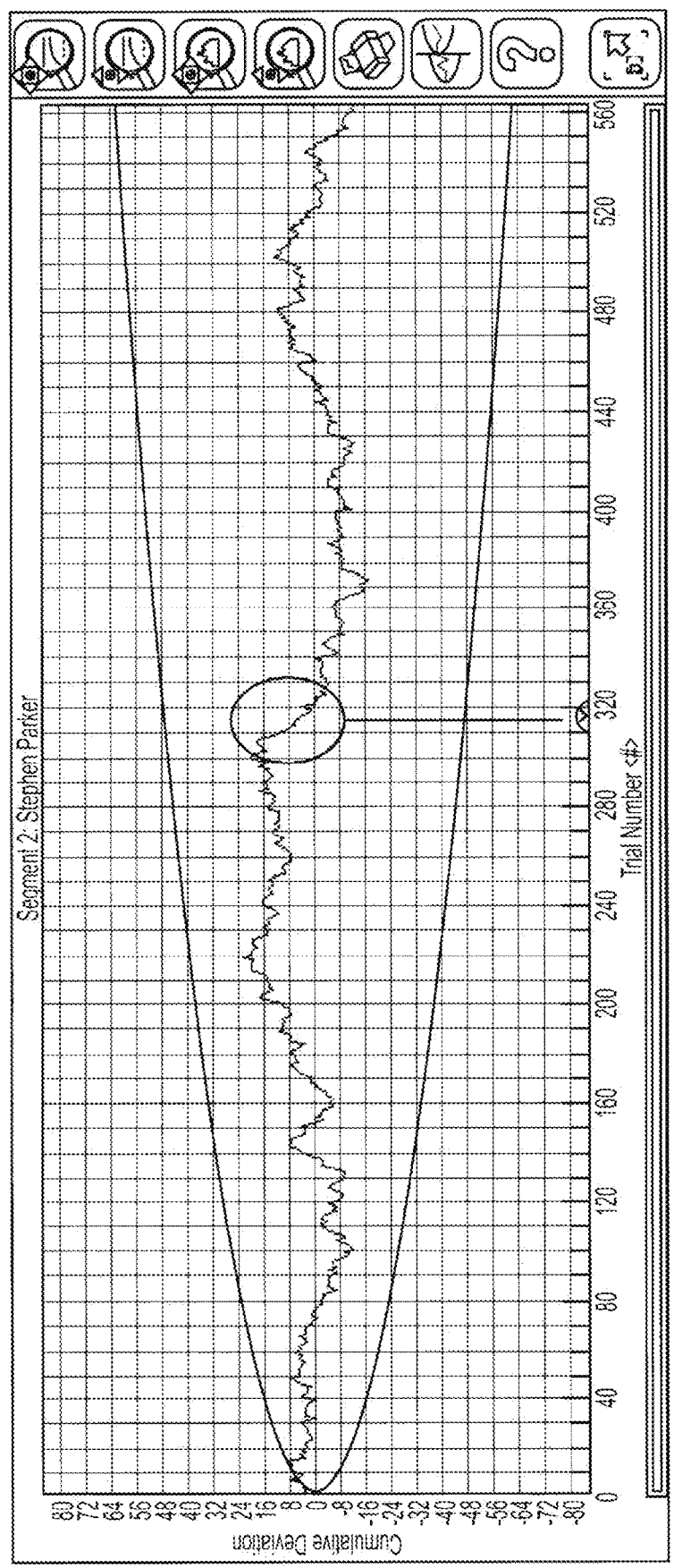
FIG. 6 is an enlarged graphical illustration of the data of FIG. 5 in accordance with some illustrative embodiments of the invention.

In addition, FIGS. 5 and 6 show that there is a bit of a strong slope over some trials, suggesting that something happened. In particular, an underlying principle of these embodiments is that certain deviations from chance identified by a device according to the present invention can often relate to certain events, and, in particular, to emotional events occurring at that time—such as, e.g., that it can indicate that the high-note made many of the young women in the audience to start crying.

Figure 7:
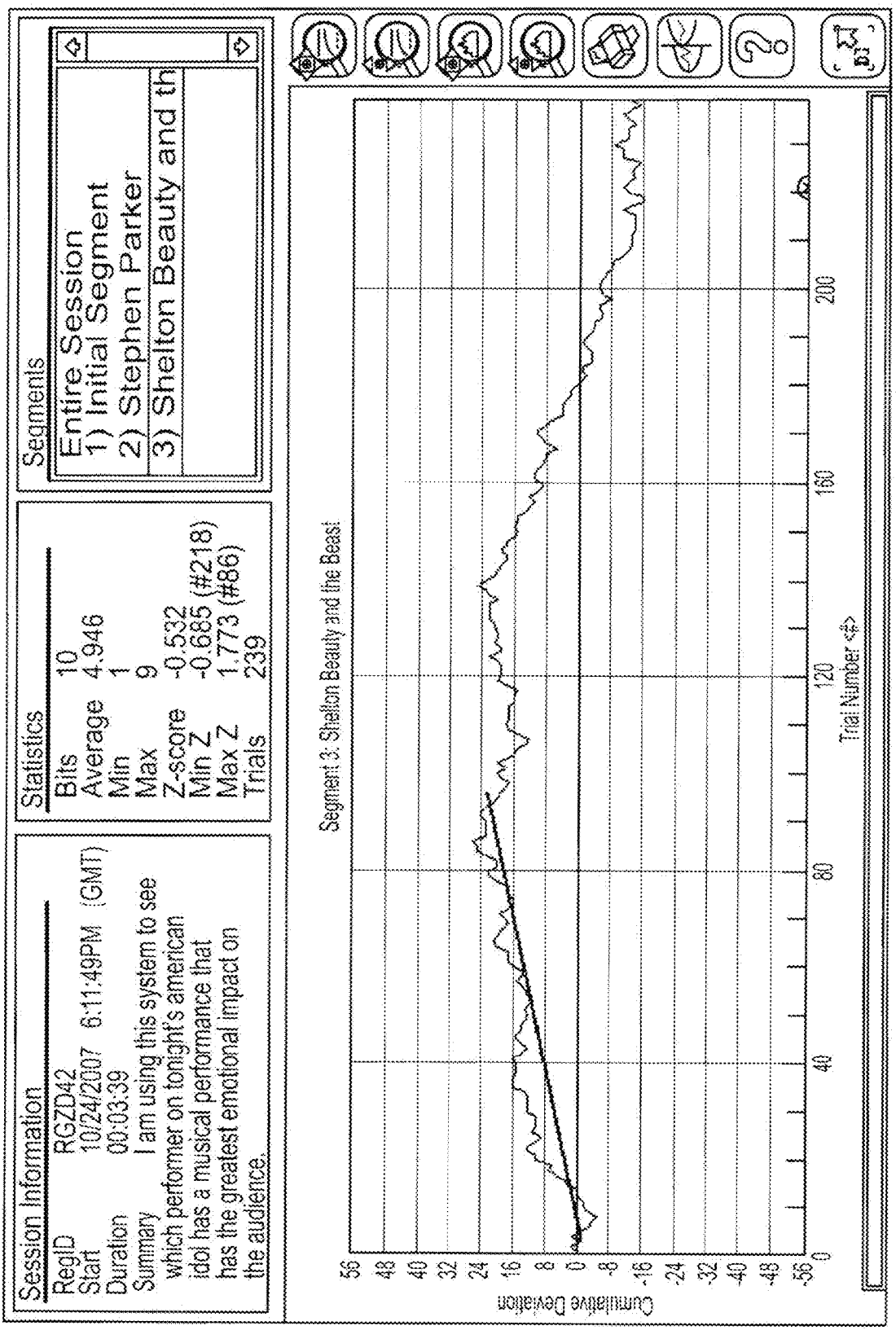
FIG. 7 is an illustration of a new segment in the data in accordance with some illustrative embodiments of the invention.

In addition, FIG. 7 shows data for Sheldon's (i.e., another illustrative performers) performance. In this illustrative example, it may appear that there is not much there; but, it looks a little bit different from Stephen's. This can, e.g., potentially help to identify some differences. For example, maybe Sheldon's dance moves that he was doing in the beginning got the audience excited. As such, the preferred embodiments can be used to evaluate certain usage situations by concurrently looking at the deviation away from chance. For example, the performer's starting to strip during the performance could coincide with the shown downturn of the data in FIG. 7.

Conclusion:

According to these illustrative (although whimsical) examples, the data generated by a system of the present invention during these hypothetical performance of the Parkers on American Idol can lead an observer to question whether or not these performers really have that "magical touch" that the observer desires (e.g., if the observer is a recording studio, the studio can use this information to ascertain if the Parkers would be a preferred addition to their record company); or, the observer may conclude that maybe there should be some further studies on Sheldon's dance performances based on the data obtained.

Example III

In this illustrative example, a portable hand-held device with buttons and an LCD screen is carried around by a user when they attend a meditation session. In some examples, at the press of a button, the device begins "recording" data by taking samples from an internal random generator, and it plots the samples on the screen in a manner that identifies the likelihood of said random signals occurring by chance. If the user notices statistically significant deviations, the user can examine their subjective environment so as to determine or to help identify what caused the deviation.

2. Embodiment Set "II"—A Portable System for Providing Real-Time Feedback on the State of a Truly Random Process for the Purpose of Exploring the Effects of Human Consciousness Overview:

According to some embodiments, the present invention involves a system in which various elements are combined into a single streamlined system that can use one device to provide the desired functions.

In some examples, the present embodiments relate to a system for enhancing the ability of users to correlate the effects of human consciousness with the output of random physical processes.

In an illustrative embodiment of the invention, a system is provided for producing a series of true random numbers. In some embodiments, the system includes using a hardware device to produce an analog noise signal, converting the analog noise signal to a binary true random sequence of signals, interfacing the binary true random sequence of signals to a general purpose personal computer, and utilizing the interfaced binary true random sequence of signals in said computer. This is a completely new integrated system for producing random number generation, specifically for the purpose of looking for extra-chance deviations that relate to consciousness. In the preferred embodiments, the user does something with the outcomes that relates to life and/or personal states (e.g., something other than cryptography, generating numbers for gambling, etc.), such that the system relates to a totally new paradigm.

The above and/or other aspects, features and/or advantages of various embodiments will be further appreciated in view of the following description in conjunction with the accompanying figures.

Discussions of Examples of Embodiment Set "II"

While the present invention can be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

In one class of experimentation, users attempt to correlate the outputs of the random process with physical events for the purpose of seeing if the device produces a statistically significant deviation from chance during that particular event.

In some of the preferred embodiments, a system according to the present invention greatly improves upon this process by 1) incorporating a true random event generator, 2) into a portable system, and 3) providing a software interface that enables its users to observe data being collected in real time, analyze prior results, and easily transfer data to a personal computer. In the preferred embodiments, the system also makes it possible for the user to track happenings in the physical environment by entering comments into the device (e.g., by operating a keyboard or other user interfaces, by hitting a button, and/or through a multiple-sensor data recording system). Preferably, this information is recorded in parallel to the output of the random signal device and can then be analyzed directly by the user (such as, e.g., via a time-wise graphical output of results or the like).

In some embodiments, a portable and self-powered system is provided that includes one or more inputs (e.g., a keypad, push buttons, a microphone element, a CCD, etc.), outputs (e.g., an LCD display, LEDs, an audible alert, or alarm or speaker, and/or a vibrating motor), and an integrated truly random physical signal generator. Preferably, the system is fit into a single housing with a processor and with integrated software that is also configured to detect deviations from chance in the random signal generator and to present and/or relay information about those outputs back to the user (preferably, in real time).

In some embodiments, the random signal generator includes a physical noise source such as a reverse biased PN junction, a resistor, or a transistor, fed into an amplification circuit, and then converted to a digital signal using a comparator or analog to digital converter. In some examples, this digital signal is fed into the microcontroller or processor so as to create an unpredictable digital stream (e.g., of ones and zeros), which is stored by the software system.

In some embodiments, the software system is programmed to allow users to identify or mark events and/or mental states in a time-wise fashion—e.g., at the beginning or ending of particular events in their environment or mental state by using an attached input device. In some embodiments, this information can be provided via entry in a keypad, via sound recording, via video recording, via pressing of a button, and/or via the measurement of a physiological response such as, e.g., an individual's pulse, heart rate variability, galvanic skin resistance, and/or some other measurement taken, e.g., through a sensor attached to the device.

In some embodiments, advantages of the system of the present invention can include one or more of the following:

Portable and Integrated. Prior systems for exploring the effects of consciousness on random systems have involved a computer device as well as an external random event generator and software that must be loaded into the system. The need for multiple devices is cumbersome, and the need to install software onto different systems can be tedious, time consuming and prone to creating crashes and/or other bugs. Among other things, in the preferred embodiments, by combining the computer system, external hardware device, and software into one portable and integrated system, users are able to conduct experiments in venues that were previously impractical.

Software Flexibility. In the preferred embodiments, the software that is included in the system makes it possible for both those with and without a strong scientific backgrounds to evaluate, on their own, whether certain effects can be measured and to come to their own conclusions about the effects being measured. In some embodiments, for scientists, the device can preferably be put into an "advanced mode" via a software selection (such as, e.g., in a mode in which raw statistical outputs and cumulative deviation graphs are displayed on the screen). For other users, the device can preferably be set to a "simple mode" in which some form of simple visual and/or other indication is provided to show the magnitude of the deviation from chance (for example, the system can present numbers (e.g., showing scaled values) and/or colorful displays indicating the magnitude of an effect that can be shown on a display screen.

Additional Inputs. In some embodiments, in addition to and/or as an alternative to a standard keyboard or keypad, the device can provide additional inputs such as a microphone, a CCD, and/or sensor inputs (e.g., sensor inputs that measure physiological parameters such as pulse, heart rate variability, EEG activity, skin conductance, or muscle tension). In some embodiments, these other inputs can be used to simplify and enhance the user's ability to correlate happenings in the physical environment with data generated by the device. Preferably, data from these inputs is stored in the device's memory in a time-stamped fashion that correlates it to the random output (such as, e.g., having data from the random output shown concurrently on a time-based graph adjacent data related to said one or more inputs).

Entry without opening. Prior multi-part systems required that the user interrupt their activity to open the device for the sake of marking a new event. In some embodiments, however, this device makes it possible to unobtrusively mark happenings in the external environment (for example, in some embodiments, such events can be marked with a single action to effect an input, such as, e.g., the press of a single button located on the outside of the case). In some embodiments, the "mark" is stored in the data and a user can later, using, e.g., a keypad, after the real-time data recording, edit the data so as to input additional information (such as, e.g., additional comments or the like related to the "mark").

Built-in Analysis. In some embodiments, the device makes it possible for users to review the outcome of prior sessions (such as, e.g., via a display on an LCD screen). In the preferred embodiments, the device stores past data and is configured to present such stored data on the screen. Among other things, such storage and presentation further facilitates comparison of data obtained and further identification of information of interest. Among other things, this is a step forward from other devices such as the MindSong "Drum" which could collect data but could not review prior sessions without a host computer.

Removable Memory. In some embodiments, in addition to employing a built-in memory, the device can have an expansion card or other removable medium that accepts off-the-shelf removable memory cards and enables data to be stored on them for easy transfer to a PC and increased data capacity.

Multi-Mode data transfer. In some embodiments, the device is also configured to enable users to transfer data to an external computer (e.g., an external PC) using one or more of a variety of methods, such as wired data transfer methods (e.g., using USB cables, Ethernet connections and/or the like), wireless data transfer (e.g., using WLAN, cellular, Bluetooth, IrDA, Wi-Fi and/or other wireless or wired interfaces or connections to a computer or other network (e.g., a local or public network). In some preferred embodiments, the device enables multi-modes of data transfer, including, wired, wireless, etc.

Ability to function as a wireless sensor. In some embodiments, the device can use its wireless communications capability to function as a real-time provider of statistical data to a computer (e.g., a PC or a server). In some embodiments, a plurality or many of such devices can communicate to a single computer (e.g., a single server or host PC) for the purposes of, e.g., transferring data between devices, gathering data from multiple devices, identifying statistical data from among a group of devices, identifying anomalies and/or confirming results, etc.

Vibration alert mode. In some embodiments, the device can contain a motion-creating mechanism (such as, e.g., vibrating or buzzing motor) that, e.g., privately alerts the user to the occurrence of interesting data (e.g., by buzzing when the deviation from chance exceeds a certain threshold). In some embodiments, such an alarm or alert can be pre-programmed or set by the user in software (such as, e.g., by providing the user with a user interface via which to input and select threshold values or the like). In some embodiments, such an alert mode can use other forms of alert, such as, e.g., auditory, visual, heat, pressure, electronic charge and/or other forms of output that can alert a user.

True Randomness. In the preferred embodiments, the noise source used by this device is truly random. In this document, the terminology "true random" or "truly random" generator means that the output of the generator is not generated by deterministic algorithms and cannot be predicted based on any knowledge of the state of the system.

Main Menu:

In some embodiments, a user interface presented on the device to a user can include a main menu that includes at least some, preferably all, of the following features:
 A) Begin data collection/run a session.
 B) Analyze previous sessions.
 C) Transfer data.
 D) Device Settings
 A) Data Collection:
 With reference to A) above, in some embodiments, this can include, e.g., at least some, preferably all, of the following functional features:
  1) Setup the Session:
   a. Create/Enter an Experiment Category.
   b. Enter a name for the session.
   c. Select other options. (e.g., Buzz at a certain level of significance).
  2) Record Data:
   a. Allow user to enter comments.
   b. Allow user to mark a new segment.
   c. Back to #2.
  3) Quit data collection.
 B) Analysis:
 With reference to B) above, in some embodiments, this can include, e.g., at least some, preferably all, of the following functional features:
  1) Select by experiment category.
  2) Select experiment name.
  3) Browse the session.

C) Transfer Data:

With reference to C) above, in some embodiments, this can include, e.g., at least some, preferably all, of the following functional features:

1) Select transfer method.

D) Device Settings:

With reference to D) above, in some embodiments, this can include, e.g., at least some, preferably all, of the following functional features:

1) Single settings screen to configure options.

Figure 8:
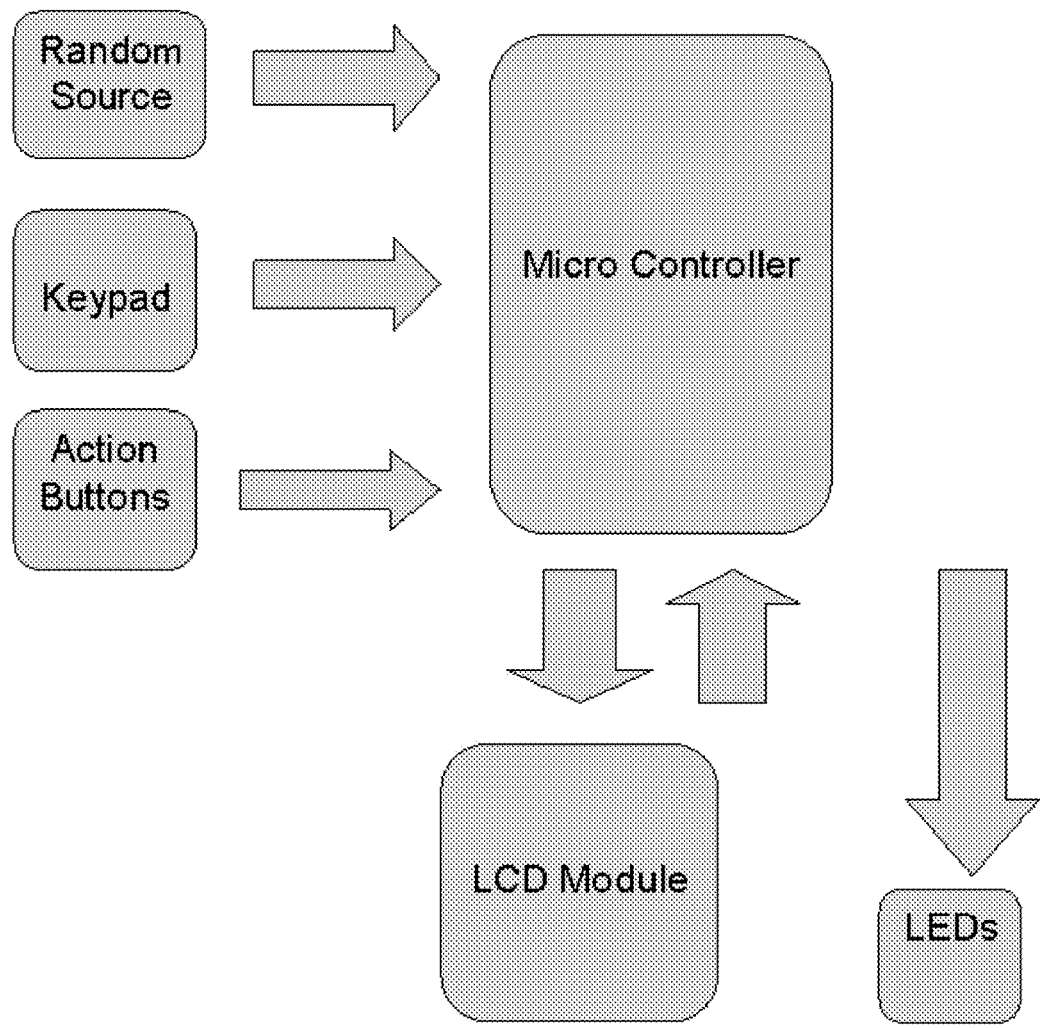
FIG. 8 is a block diagram of the input and output of the microcontroller in accordance with some illustrative embodiments of the invention.

Architectural Details According to Some Illustrative Embodiments:

With reference to FIG. 8, this figure shows illustrative architectural components according to some illustrative embodiments. As shown, the figure is a block diagram illustrating some inputs (e.g., random source, keypad and action buttons) into the microcontroller. As also shown, in this illustrative example, a display is provided that includes an LCD Module that is depicting as preferably exchanging input with the microcontroller, while in some embodiments LEDs are included that strictly receive data from the microcontroller.

Figure 9:
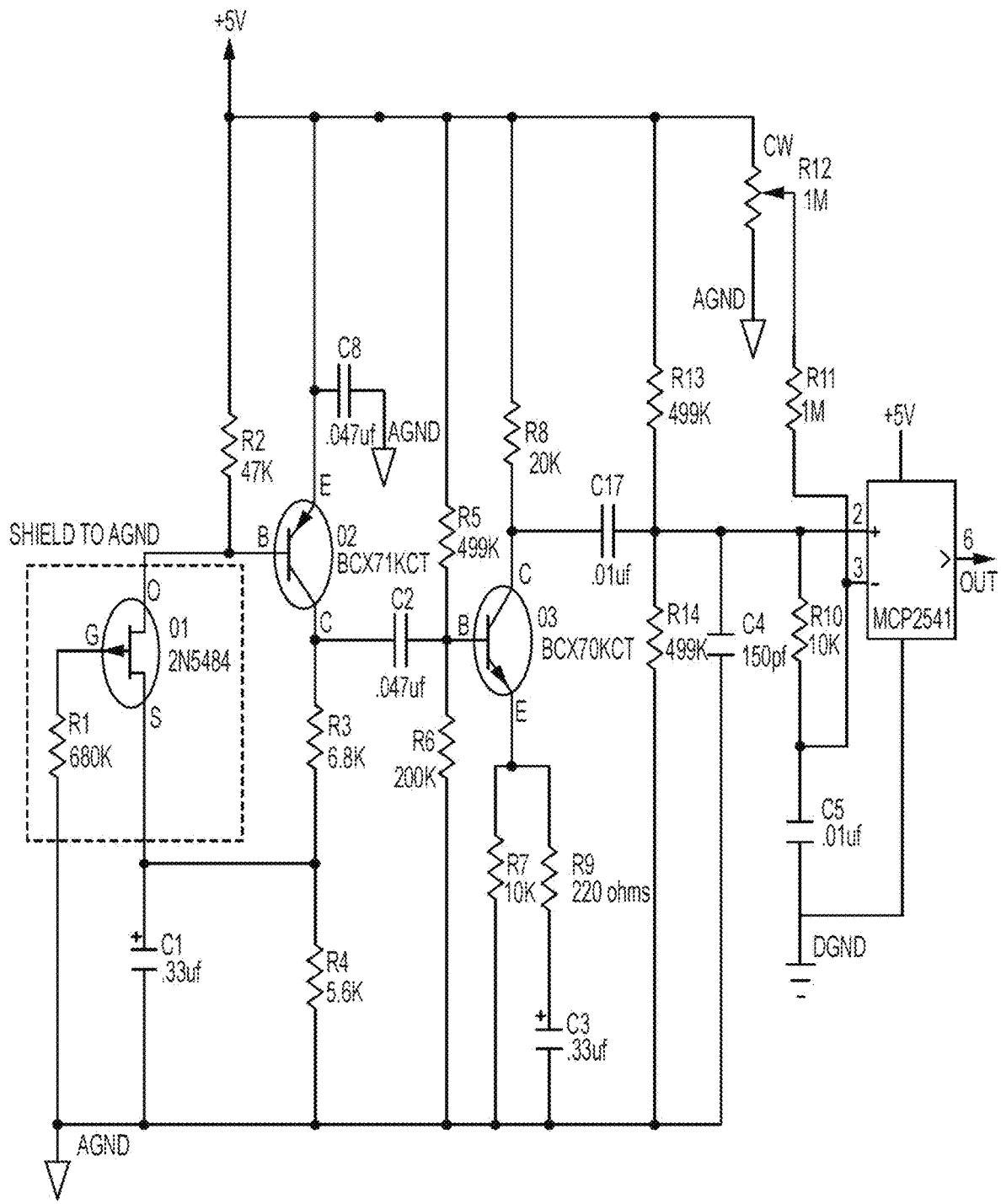
FIG. 9 is a schematic of an example an analogue noise source in accordance with some illustrative embodiments of the invention.

With reference to the electrical schematic diagram of FIG. 9, this figure shows one embodiment of an analog noise source that may be used in the system. In this example, Q1 and R1 generate thermal noise, which is amplified by Q2 and Q3, put through an integrator (e.g., R10 and C5) and fed to a comparator whose transitions have approximately a 50% chance of being high and a 50% chance of being low.

With reference to FIG. 10, this figure depicts an illustrative embodiment of the device that includes a tough sensitive LCD display, external buttons (which can, e.g., in some embodiments be integrated as part of the LCD display by incorporating touch-screen capabilities (e.g., similar to a touch screen on an iPHONE or the like), a wireless transmitter, and a memory card reader. In the preferred embodiments, this version of the device preferably runs its own software capable of analyzing data (e.g., prior data) and/or displaying results in real time. Preferably, this device is also configured to transmit its data via a wireless connection and/or via a wired connection (e.g., via a USB cable).

With reference to FIG. 11, this figure shows another embodiment that is similar to embodiment shown in FIG. 10 except that it includes a slide-up LCD screen (e.g., the screen is mounted so as to slide laterally from a closed position covering the keypad or keyboard to an exposed position exposing the keypad or keyboard), a full (e.g., QWERTY-style keyboard with physical keys in place of the touch screen and includes a wireless transmitter.

With reference to FIG. 12, this figure shows another embodiment that is essentially a smaller version of the embodiment shown in FIG. 11 with a fixed position LCD display and with a small/full keypad (e.g., similar to a common BLACKBERRY device employed thumb-activated keys) or with an abbreviated keypad (e.g., which can involve a keypad with fewer keys than a full QWERTY keypad). In some embodiments, the device is configured to be less than about 8 inches wide and 11 inches high and 1 inch deep. In some preferred embodiments, the device is configured to be less than about 7 inches wide, 9 inches, and 0.50 inches deep. In some embodiments, the device is approximately 4.5" (high)×3.5" (wide)×0.25" (deep) or even smaller, such that it can be comfortably carried around in a user's shirt and/or pants pocket.

With reference to FIG. 13, this figure shows another embodiment of a device that is similar to the above devices except that the keypad input is replaced with a toggle knob (shown in the bottom-center region on the face of the device) and a plurality of buttons (e.g., multi-buttons shown at the top right side of the device). By way of example, this toggle knob can include functionality similar to that of a commonly-known iPOD device. Among other things, in some embodiments, this embodiment can, thus, employ GUI software providing a simplified Graphical User Interface (GUI) to make access easier to the user. In some embodiments, due to the simplified GUI, the device can be even smaller in size, such as, e.g., having a height of less than 4 inches, a width of less than 2 inches and a depth of less than ¼ inch. In some examples, the size can be about 2.5" long×1.75" wide×0.15" deep or even smaller. In addition, in some embodiments, the device can be affixed to a user's apparel or body (e.g., in some embodiments, the device can include a strap, a clip or other attaching means to affix it to, e.g., the user's arm or other body-part, and/or it can be readily carried around in a users pocket.

With reference to FIG. 14, this figure depicts another embodiment of the device that does not employ a display and keypad (e.g., forsaking an LCD display and keypad) in favor of a most economical design that features a few (e.g., three) push buttons), a few (e.g., three) light-emitting elements (e.g., LEDs), a microphone, and, in some embodiments, a vibrating motor. In this embodiment of the device, the user can simply push a button to mark the beginning of a new data collection segment, can simply push another button to start/stop the device, and can simply push a third button to mark a new experiment. Preferably, data is stored on an internal memory and can be uploaded to an external computer (e.g., a PC), such as, e.g., with a USB cable. In addition, in some embodiments, the USB cable can also be employed to charge a battery power-source within the device. In some preferred embodiments, this device can be made very small, such as, e.g., even less than about 2 inches wide, 3 inches long, and ¼ inch deep, and, in some embodiments, the size can even be smaller than 1.75"×1.5"×0.15" and can be readily fit onto a keychain to facilitate carrying, etc.

With reference to FIG. 15, this figure depicts another embodiment that incorporates the device into a wrist-watch form-factor. In this disclosure, the terminology "form-factor" is meant to identify a form within which an example device can be constructed, and is similar to the terminology "embodiment." In this example, the device does not have to be integrated with a time display for incorporating common watch-related functions, but is configured with a strap and sized so as to fit around a user's wrist in a manner similar to a common wrist-watch. In the preferred embodiments, the device includes a strap (e.g., having two sections that can be clasped together around a user's wrist, such as, e.g., with Velcro, a buckle-type connector, etc.), a device enclosure with a front display region (e.g., similar to a common electronic watch), and one or more front face or peripheral side operating buttons (e.g., such as the two depicted side buttons). In some preferred embodiments, the device is configured to connect to an external computer (such as, e.g., an external PC) using a wired interface (e.g., a micro-USB connector) or a wireless interface (e.g., using Bluetooth), and employs a plurality of buttons (such as, e.g., in an illustrative example, three on the front face, and two on the peripheral side of the device enclosure), which buttons can be adapted to provide the controls to use the device (which can, in some embodiments, be a functionally reduced version of the software).

3. Embodiment Set "III"—A System for Providing an Alert to its User at Times that are Based on True Physical Randomness and can be Affected by the Influence of Human Consciousness Overview:

The present embodiments of the invention improve upon the above and/or other background technologies and/or problems therein.

The preferred embodiments of this invention relate to the field of electronic detectors and controllers, and more specifically to a method and apparatus of generating values, in particular to generating values that are influenced by human consciousness, and detecting whether the values fall outside chance probabilities.

The present embodiments of the invention involve, e.g., a system in which various elements are combined into a single streamlined system that can use one device to provide the desired functions.

In a broad embodiment of the invention, a potentiometer or switch on the device is provided to adjust the frequency of the reminders from a period of, for example, less than one or two times per day to as many as one time per half-hour. This enables the device to be adjusted based on the purpose for which it is being used, while retaining its random character in that the adjustment merely sets an approximation or an expected number of times that the device should go off.

Unlike other reminder devices on the market, the technology of the present invention uses a truly random physical source to determine the times at which an event is triggered. A true random source has been shown to be susceptible to the influences of human consciousness. For example, there is laboratory evidence that shows that a device in the described configuration is more likely to trigger a reminder when the user is, e.g., emotionally engaged in a particular process or would find the reminder to be beneficial. Accordingly, although devices of the present invention can employ pseudo-random generation, such pseudo-random generation devices do not provide the advantages of consciousness influenced random generation.

Consciousness influenced random generation makes it impossible for a person to predict the occurrence of the event trigger, except in the cases where the event is triggered by the influence of the user's consciousness.

The above and/or other aspects, features and/or advantages of various embodiments will be further appreciated in view of the following description in conjunction with the accompanying figures.

Description of Embodiment Set "III"

According to some illustrative embodiments, a small battery powered device is carried about by a user for the purpose of being reminded of a particular event, idea, or goal. In some embodiments, unlike other reminder devices, this device reminds the user at times that are random and unpredictable (i.e., based on an REG device output). Among other things, the device can be used, e.g., for the purposes of putting an idea into the users conscious or subconscious, helping to bolster or to create user habits, and/or catching the person at unexpected times. Furthermore, in the preferred embodiments, the process that generates the timing and characteristics of the random reminders is unique in that it is driven by a non-deterministic physical signal and has been engineered based on empirical evidence that the device can respond to human consciousness and create an alert at times that are particularly relevant to the user and his or her goals. For example, based on the theory or concept that a user's consciousness can affect such an REG output, the device can theoretically provide reminders or the like at particularly relevant times based on the theory that such times may be triggered in part by the user's or other human consciousness.

In some illustrative embodiments, the system includes a circuit, driven by an electronic source of true physical randomness and powered by a battery (such as, .e.g., a 3V lithium ion battery), is interfaced with a microcontroller that samples a random source, stores the samples in a memory, and performs computations on the data. In some preferred embodiments, these computations serve the purpose of adjusting or varying the time(s) at which a "reminder event" will occur based on manipulations of the random source and, in some embodiments, on a configuration that can be defined by the user.

In some embodiments, when an internal threshold has been reached and the device decides that a "reminder event" or "alert event" should occur, the microcontroller activates a connected output device such as, e.g., a vibrating motor, an LED, and/or an audible alarm, any of which is used for the purpose of making the user aware that the "reminder event" has occurred or for tracking the historical occurrence of such events.

In some embodiments, an effect of this configuration is to create a device that alerts its user at times that are essentially completely unpredictable and follow a random statistical distribution. Among other things, this can be very useful to the user because, e.g., the user can, thus, be taught to mentally associate the triggering of the device with a particular idea, goal, and/or outcome that they wish to remember or be reminded of. Among other things, the spontaneous nature of the alert can help to draw the user's attention back to something that they otherwise may have forgotten about or have been unaware of in the particular mental state that they were in when the device initially went off.

In addition to this usage in the foregoing paragraph, as indicated herein, there has been some evidence and data that has shown that a random source can be influenced by some subtle processes of human consciousness. In situations that are rich in emotional content, or group interactions, and/or in other circumstances involving human consciousness, a random source used in the device can, according to this research and evidence, be more likely to produce outputs that deviate from its theoretical physical behavior (e.g., an REG device can, thus, be more likely to deviate from a random behavior due to effects of human consciousness). In some embodiments, the device described herein uses algorithms to measure and detect these deviations, and based on these deviations causes the occurrence of or the adjustment of a "reminder event" in such a way that it is more likely to go off at times that are relevant to the user.

While some embodiments of this invention relate to uses that are based on the theories that human consciousness can affect certain random sources, it should be understood that this illustrative type of use is not the only form of use possible with such embodiments. For example, the various embodiments of this type are not solely useful for measuring or correlating results to conscious events. That is, the utility of the present device does not depend on the accuracy of or the truthfulness of this scientific proposition. In particular, one illustrative utility of the present device can be to test and/or analyze whether or not human consciousness can potentially have an affect on certain random sources and the like. In addition, other utility of the present device can relate to, e.g., encouraging individuals to evaluate certain theoretical concepts, such as, e.g., whether one's consciousness has or can affect things such as, e.g., random events. Moreover, the devices of the present invention can also have great utility as fun toys or amusement items, generating interesting and thought provocative results and outputs. Some other illustrative examples, can include, e.g., 1) for creative writing, writing about what one observes in their environment when it buzzes, 2) for parties, hug whoever is closest to you when it buzzes, or drink a beer when it buzzes, or the like, 3) for psychology uses, a user can write what they were thinking about when it buzzed and put it into their journal.

These points apply to the utility of all of the embodiments described in the present application. Thus, while it is understood by the present inventors that human consciousness does indeed have the ability to affect certain events, such as, e.g., random sources, the utility of the various inventions described herein do not rely solely on such phenomenon for utility under 35 U.S.C. 101.

Process of Use:

In some embodiments, a device can be configured to carry out the following in the use of the device:
1. A user configures the device by setting it to an ON state, and possibly adjusting a switch.
2. The user consciously brings to mind or thinks about a particular "purpose" to associate with the device.
3. The user carries the device on their person, perhaps, e.g., on a keychain or in a purse/pocket (e.g., the device can have any form as described in relation to any of the various embodiments of the present application).
4. At some time later, the device provides an "alert" or "reminder" (as described above) to the user.
5. In response to such an alert or reminder, the user performs some task or action (such as, e.g., enacts or performs a pre-specified action, thinks about a pre-specified thought, and/or assesses their surroundings and environment based on the purpose).
6. Repeat at step 3.

Detailed Technical Description

Figure 16:
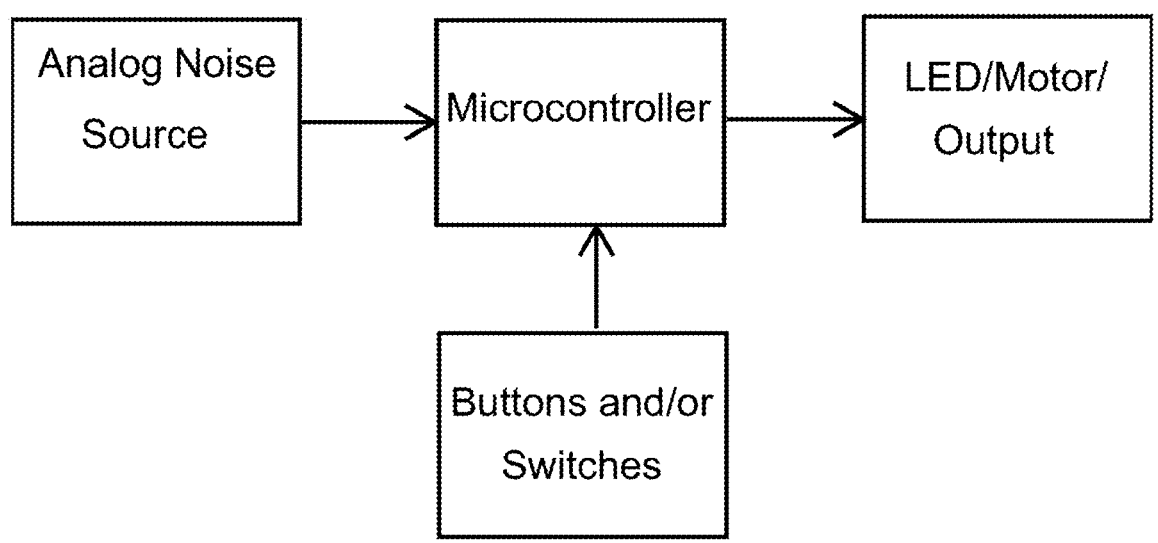
FIG. 16 illustrates a block diagram of another embodiment of the input and output element of a microprocessor in accordance with some embodiments of the invention.
Figure 17:
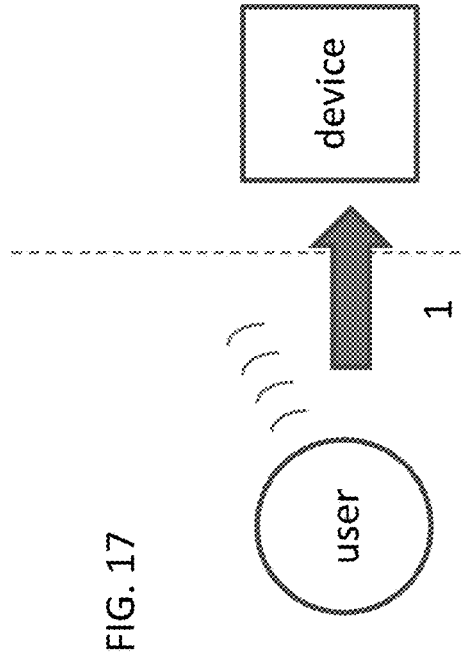
FIG. 17 is a schematic diagram showing the inventors depiction of focus in the background art.
Figure 18:
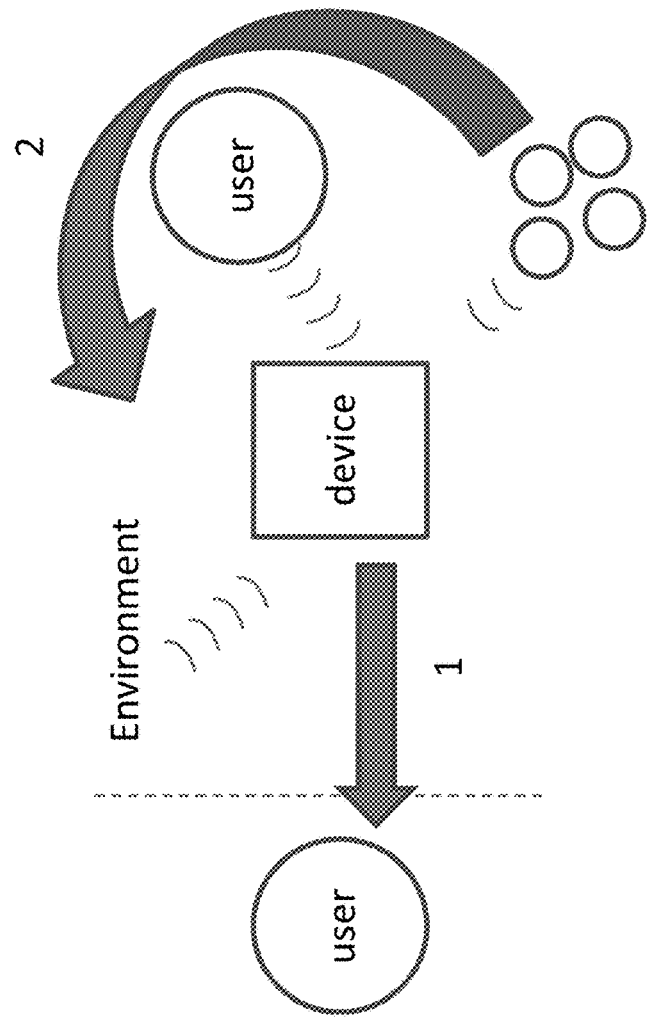
FIG. 18 is a schematic diagram showing differing point of focus from the background art in relation to some embodiments of the present invention.

With reference to FIG. 16, the figure shows a block diagram of an illustrative and non-limiting embodiment depicting basic components of the device, including, e.g., an analog noise source, a microcontroller, an input mechanism (such as, e.g., buttons and/or switches), and an output mechanism (such as, e.g., one or more LED, a motor and/or the like).

Analog Source (1):

In some embodiments, a purpose of the provision of an analog source is to generate an electronic output that is fundamentally random and that closely approximates a theoretical statistical distribution. By most definitions, the output would be considered to be "truly random" and contain a form of chaos and/or quantum mechanical uncertainty that makes it different from traditionally pseudo-random sources, which are often generated computationally or from mechanical devices, which can often be modeled using deterministic physical laws.

In an illustrative particular embodiment of the device, a high ohm resistor fed into the gate of an FET creates a source of thermal noise, which is filtered using passive components and put through a multi-stage transistor amplifier or op amp for the purpose of amplifying and conditioning the signal so that it can be interfaced with digital components. In other illustrative embodiments, other methods of building a similar source can replace the FET and resistor combination with a reverse biased PN junction (e.g., embodied in a diode, transistor, or semi-conductor), a resistor itself, or an emitter and detector of photons.

Regardless of what method is used, this portion of the circuit will preferably create an analog signal that has an essentially flat noise spectrum over some frequency range. This signal can then be digitized and sampled using, e.g., a comparator, analog to digital converter, or an equivalent process for the purpose of creating fundamentally unpredictable bit combinations which can be manipulated with digital logic. In this document, a generic digitized form of an analog signal is encompassed under the terminology "random source."

In some preferred embodiments, the analog source can be shielded using a form of shielding (such as, e.g., a conductive metal shield encasing all or part of the pertinent section) to separate it from other portions of the circuit and to essentially eliminate or greatly reduce external physical interference.

Input (2) and Output (3):

In some preferred embodiments, the device can have a various number of inputs and outputs, wherein such inputs would generally have the purpose of configuring the device and the outputs would have the purpose of providing information to the user, such as, e.g., alerting the user as to the occurrence of a reminder event and/or transmitting data about current and previous reminder events to another device, such as, e.g., a server, personal computer and/or PDA.

In one preferred embodiment of the device, the input can include a multi-state switch, and the output can include a vibrating motor. In some examples, a first state on the switch would represent an "off" configuration, in which no power is provided to the device, and another state would be to turn the device on and to determine a relative frequency (e.g., the average or approximate time periods or intervals between events) at which the device should randomly trigger its output. The output/alerting element, which is a vibrating motor in some illustrative embodiments, can provide the user with a buzzing sensation whenever digital logic module of the device determines that an alert should be triggered.

It should be appreciated that this embodiment can have a variety of variations, such as, e.g., in inputs and/or outputs. By way of example, other variants of this device can include the use of, e.g., potentiometers, switches, and/or buttons for inputs, and the use of LEDs, audible indicators, and/or other forms of sensory stimulation for outputs.

Digital Circuit (4):

Overview:

In some preferred embodiments, the digital portion of the circuit involves a microcontroller (e.g., preferably this can involve one in the smallest possible package that is of least expense and lowest power consumption, and preferably one which contains an internal oscillator, a power-saving mode, and a built-in analog-to-digital converter or comparator). However, the exact type of microcontroller is not critical to the operation of the device, and for the purposes of cost savings can even be replaced by, another type of controller, such as, e.g., a custom chip or combination of basic digital logic gates accomplishing a similar purpose.

In the preferred embodiments, the microcontroller serves as the "brain" of the device and is programmed to, e.g., sample data from the analog source and to perform computations which vary based on the configuration of the attached input devices, which can be any combination of the types mentioned above in this application. In some embodiments, for example, when it has been determined by a computation that the reminder event should occur, the microcontroller activates an output device for the purpose of alerting the user (e.g., to alert the user to take some action, perform some task, or to note that something has happened).

In various embodiments, the calculations performed inside the microcontroller can vary in their implementation, but, in some preferred embodiments, there are two notable purposes of the computation: 1) one is to cause the device to trigger an alert at an unpredictable time with a high likelihood of occurrence over a particular timescale that may be selected by the user [random time selection], and 2) the other purpose of the computation is to dynamically adjust the time at which the reminder event is triggered based on an analysis of the output of the random source for the purpose of detecting meaningful events [event detection].

Random Time Selection:

In the preferred embodiments, the device is capable of selecting a truly random time to trigger its alert or reminder. Here, the terminology "truly random" means that the time should not be directly predictable. For example, even if a user had knowledge of the algorithms and processes that take place in the device, the user should not be able to directly predict the output timing. In short, the trigger of the event should always be a surprise, and barring any unanticipated physical influence or the effects of consciousness, the random time selector should select times to go off without any form of bias towards a particular time. That is, over the time scale in question, there should be essentially the same probability of any one time being selected as any other.

Implementation:

In various embodiments, there are many methods to implement the random time selection in software; but, one of the most appropriate from functional and simplicity standpoints is to use the input configuration for a user to define a maximum-time scale, such as, e.g., an hour (or some other time period such as, e.g., 10 minutes, 20 minutes, 30 minutes or the like). In some embodiments, this value is then multiplied by two, and data from the analog source is sampled into a register containing one or more bits. The decimal representation of these bits is divided by the theoretical maximum value of the register to create a value that represents the proportion of the value relative to its maximum. This value is multiplied by time-scale to come up with a representation of time that ranges from the immediate present to twice the expected frequency.

The end result of this illustrative computation represents a number of "time units" in the future at which the device should trigger its reminder. The value is stored in the internal memory of the microcontroller, and is adjusted by a periodic countdown sequence as well as by the event detection process. When the value reaches zero, the reminder event is triggered.

In order to help guarantee uniformity of the selected times, the device may process the digital outputs of the physical source in some way, such as by discarding particular bits or by XORing the digitalized output with "mask patterns" that have an equal number of ones and zeros. The goal and effect of this is to remove any bias from the analog source that would interfere with each time having the same probability of being randomly selected.

Event Detection:

In some embodiments, the output of a truly random physical device can deviate from its chance behavior under the influence of human intention or when it is exposed to and observed in situations that are emotionally relevant to the observer of the output or a group. In some embodiments, the device can detect these deviations in the random source for the purpose of adjusting the timing of the reminder event such that it might be more likely to go off at times which are interesting and relevant to the user. Once again, although there is substantial scientific evidence in support of this phenomenon, the utility of the device is not solely dependent on this phenomenon, such as, e.g., discussed above.

In some embodiments, the general principle of operation for this feature is that the analog source being sampled roughly approximates a perfect theoretical statistical distribution in that its output has expected values when sampled. By comparing the statistical properties of the actual samples to their theoretical distributions, it becomes possible to detect when the process underlying the random source is behaving in way that would not occur by chance [e.g., an "anomalous deviation"] and to subsequently modify the behavior of the overall device appropriately.

As a general rule, a process employed for the detection of anomalous deviations will either be looking for a) an indication of order in a particular random bit stream (such as, e.g., the presence or absence of patterns, auto-correlation, comparisons to other bit streams or random templates, and/or structures within the data), or b) for an indication that the random source is producing output that would be improbably due to chance (e.g., by performing statistical calculations that compare the actual data with a theoretical or empirical expectation.)

In some embodiments, the detection of anomalous deviations provides the device with a richer range of characteristics than a standard random reminder process would on its own. For example, the device maintains its random reminder characteristics, but becomes more responsive to circumstances in the environment and/or the intention of its user or others. Moreover, the mere fact that a user will focus on the possibility that the reminder is somehow responsive to circumstances in the environment and/or the intention of its user or others, will lead towards greater mental effort at correlating such a reminder with circumstances at hand (i.e., helping to demonstrate additional utility of the device regardless of whether one appreciates the validity of the underlying principles and theories).

In the preferred embodiments, a core of the event detection process is that it looks for deviations from chance in what would otherwise be, e.g., an ordered or structured physical process.

In the preferred embodiments, the event detection operation also provides a more subtle feature which is that even in the absence of a truly anomalous deviation, it allows the random time selection process to be updated in real-time and adds additional degrees of freedom in the process. For example, in the implementation described above, the maximum time between reminder events would be twice the selected time scale frequency. By using the event selection method, the device becomes capable of going off at times that are outside of the frequency range.

Implementation:

In some embodiments, as with the random time selection portion of this circuit, there are a number of ways to implement the detection of the anomalous event as well as how to implement it into the existing circuit. Some illustrative methods of detecting anomalous deviations can include:

The step of sampling a number of bits from the random source and counting the excess or deficit of a particular bit (1 or 0) and adding this output to an accumulator. When the accumulator reaches a particular value that would not be obtained often by chance, the microcontroller can be configured to determine that it is an indication of an anomalous outcome.

In some embodiments, if a deviation is detected in any of these processes, the value of the countdown timer is adjusted so that it has the effect of moving the event alert further from or closer to the time at which the computation on the analog output took place.

As a general rule, samples that are deemed to contain more order or that are less probable by chance will have a larger impact on the adjustment of the timing of the reminder event. In a special case, an extremely improbable or ordered event sampled from the random source can cause the reminder alert to trigger immediately by, e.g., setting the value of the counter in memory to zero.

When the value stored in memory reaches zero, either due to the natural countdown process or because it has been accelerated by the progression of random events, the microcontroller activates the alert circuitry for a period of time, and, in some examples, this can involve the user enabling or responding via an input for the purpose of acknowledging the alert.

Form Factor:

In some embodiments, the circuit described above is preferably housed in a stand-alone case that is as small and portable as is possible and convenient to the user. In some preferred embodiments, the device measures less than 2 inches×2 inches×0.5 inches, and in some embodiments about 1.25"×1.00" ×0.25" or less. It is well within the realm of standard technology to reduce the device in size substantially so that it can easily and non-obtrusively be carried around by its user.

In other embodiments, another rendition of the device involves taking the circuit described above and incorporating it into an existing portable electronic device, such as a PDA (such as, e.g., an iPHONE, a BLACKBERRY, a PALM device or the like), cellular phone, an audio or video player (e.g., an MP3 player), a pedometer, and/or a wristwatch. In such cases, the device can have this additional circuitry built-in using additional components, fabricated into an existing chip, added as a stand-alone chip, and/or a variant of the above method could be carried out or implemented in software using a pseudo-random bit generator or by substituting the analog source with some type of other physical signal already available to the device.

Uses:

In some embodiments, one or more of the following uses can be achieved with embodiments of the invention:

1. As a general reminder of a concept.

For example, in some embodiments, the user associates the trigger of the device with the purpose of remembering to think about a particular concept (such as, e.g., a) to work on, think about a college admissions essay, b) to focus on their mental state (e.g., to remind oneself to think positive thoughts), c) to perform an act of kindness to a particular individual or set of individuals, etc.). For example, with a) above, when the device goes off, the user could, e.g., take time out to reflect on the answer to the essay question.

2. As a tool to engrain an idea into the subconscious or to facilitate the training of breaking of a habit. For example:
   a. A person seeking to have lucid dreams would ask themselves "Am I Dreaming?" whenever the alert is triggered. Among other things, the random timing and nature of the device helps the asking of this question to become built into the subconscious mind—e.g., by not occurring on recurring and predictable intervals, one cannot essentially get into a complacent mode under which one relaxes ones efforts in between alerts and does not keep their mental efforts and required actions in mind. In addition, because the alert is under theory described above, tied to consciousness, there is a potential that the timing of this alert would be advantageous for inducing of lucid dreams (i.e., lucid dreaming is essentially a state in which during a reposed or sleeping condition one's mental focus becomes present sense and essentially perceives a dream while realizing that one is in such a state of consciousness). Moreover, the mere fact that a user may believe that this relationship can exist (i.e., contemplates this possibility) can lead a user to be much more cognizant of this alert than in cases in which the alert is merely being provided on some otherwise non-critical periodic time period. That is, the initiating of the alert will instill a high degree of attention and focus due to the potential and/or believed or contemplated potential for significance or correlation to consciousness.
   b. A person with the goal of exercising and getting into shape does a number of pushups or some other activity when the device goes off. Once again, this reminder can have advantages over mere periodic reminders at some pre-set intervals. Here, again, there is a real or perceived correlation to consciousness that can create a greater degree of importance, meaning and/or a users belief or focus on the particular alert and the task to be performed. Moreover, the mere fact that such may be possible creates a degree of whimsicalness and intrigue that increases enjoyment in performance of the task or activity.
   c. When the device goes off, the person checks to see if they are or have been engaging in a particular habit or activity. If they have been, it is to be taken as negative reinforcement. Fear of the device going off at later times and the reminder of the desire not to enact the habit helps to prevent the user from engaging in the habit—such habits can include, e.g., biting one's nails, thinking critically of others, feeling distrustful of others, eating snacks, etc.

3. As a tool to aid in psychotherapy or counseling. For example:
   a. Person trying to resolve feelings of anger towards another or control a particular emotion.
   b. Marriage counseling, remembering to think of a particular idea or concept. During counseling, the therapist works with each user to identify a core issue that should be remembered, or an action that should be undertaken when the device is triggered. An unaffectionate husband might be encouraged to say something kind to his wife when the device goes off, or to ask if he has been behaving lovingly.

4. As a tool to aid in creative writing.

When the device is triggered, the user takes note of the environment around them and begins a writing exercise designed to hone his or her skills.

5. As a tool to aid in self-assessment and emotional understanding.

For example, a person keeps a journal with them and writes down their state of mind or what they are doing whenever the device is triggered.

6. As a tool to modify one's belief systems and method of thinking. A person associates an idea or goal relating to their thought processes to the triggering of the device.

For example, "I will think happy thoughts." When the device is triggered the person takes notice of their frame of mind and subsequently adjusts their attitude so that it is aligned with the pre-stated goal. As another example, an individual that does not appreciate the degree of negative thinking that they currently engage in can be made to evaluate their thinking upon such an alert and, in particular, whether they are engaged in negative thoughts. In such cases, over time, a user may come to appreciate their over negativity and change their behaviors towards thinking more positively.
7. As a tool for recognizing the importance of particular events or circumstances. For example, the user has the subconscious goal of triggering the device at times where they should be more introspective, or where they should be less introspective, or when it is time to complete a task or when it is time to take a break.
8. As a tool for reminding the user of nothing specific or to have a focus on the present. For example, causing the user to be aware of the user's surroundings, even at a random moment, keeping a user alert while drive a car, and the like. For example, this could even be helpful for athletes that need to maintain a very present sense of focus and to avoid over evaluation and/or anger and/or the like.

Alternate Embodiments

In various embodiments, the above device can be modified or built upon in a number of ways to increase its functionality. Some examples are as follows:
1) In some embodiments, the device can be modified to handle more than one "alert" by varying its output (e.g., an audio output can play different tones to alert the user of different things; an LED output can have various colors to alert the user of different things; a tactile or vibrational output can change the frequency or the duration or pattern of its buzzing.) In some embodiments, the device could also include a display screen (e.g., an LCD screen) and/or a voice synthesizer chip that conveys a particular message and/or information relating to one or more reminder(s).
2) In some embodiments, the mode of input to the device can be modified to include a more complex digital input, such as a configuration that involves a touch-screen, keypad, and/or interface with another controller device.
3) In some embodiments, a memory can be added to the microcontroller for the purpose of tracking data generated by the device and the timing and occurrence of reminder events.
4) In some embodiments, the device can use one or more wired or wireless interfaces, such as, e.g., Bluetooth, USB, TCP/IP, and/or some other method of interfacing with another device or computer, such as, e.g., a personal computer (PC) for the purpose of, by way of example:
   a) Configuring the device with software from the PC.
   b) Sending data regarding the output of the device to the PC.
5) In some embodiments, the analog portion of the circuit can contain two or more random signal generators for the purpose of better detecting the influence of consciousness or the like on the device. In the case of this configuration, the calculations employed can look for a combination of covariance, auto-correlation, and/or other structural similarities in the output streams of the two analog sources.

Online Alerter:

In some preferred embodiments, the foregoing alerter embodiments can be modified such that the alert or reminder system is made remote. For example, rather than carrying around an electronic device which buzzes, the user can, e.g., log into a web page (e.g., via a PDA, cell phone, lap-top or portable computer, desk-top computer or the like), establishes an account, and provides their telephone number (e.g., cell phone) or email address (and/or other contact information). Then, in use, based on the output of an REG connected to a server whose details are not necessarily known to the user, the person can be delivered particular alerts or messages, such as, e.g., receiving text messages (e.g. SMS messages or e-mails) on their cell phone, PDA or computer (such as, e.g., at times determined as in the above-described alerter embodiments. Furthermore, in some embodiments, these messages do not only need to occur at seemingly random times that are meant to pique the interest and curiosity of the user, but the messages themselves can be alternately or additionally randomly selected and drawn from a pool of messages (e.g., such as, e.g., messages that can be previously selected or entered by the user themselves via a web interface).

In some implementations, this embodiment also expands on the prior described alerter embodiments in that the user can engage in a bi-directional communication with the alerter process. For example, when a text message (e.g., an SMS or e-mail) is received by the user on their computer or cell phone, the user can, in some embodiments, respond with a message (e.g., containing information about what they were doing at the time of the message, or something possibly aligned with their intention/purpose in receiving the alerts), and this reply can be stored and cataloged in a database alongside the messages that were sent to the user. (Notably, as should be appreciated based on this disclosure, the foregoing non-online embodiments could also be modified to include this functionality (and/or other functionality described herein) in other examples.)

In some embodiments, the user can also use an online interface to view their alert history (e.g., a time-stamped and dated list of all dates and times that messages were sent to them, along with the nature of the message, and the message that the user sent back to it), to add additional comments, background information, and/or to add explanations or stories related materials to their alerts, and to share their alerts and stories with others (e.g., in an online forum or the like), who can decide to make comments on these alerts and stories, and/or rate them or share them with friends (e.g., in such an online forum or the like).

In some examples, a revenue model related to the above service can be operated so as to charge the user for each alert received, bill them on a periodic (e.g., monthly) basis for access to the system, or charge based on the overall amount of usage (e.g., bandwidth, REG time used and/or based on some other measure of usage.)

4. Embodiment Set "IV"—A System and Interface for Scheduling the Collection of Data from a Random Event Generator and Analyzing it to Find Correlations with Human Events that Occur in Relation to that Data for the Purpose of Optimizing Decision Making Processes Overview:

A system and/or method for scheduling the collection of data from a random event generator and analyzing it to find correlations with human events that occur in relation to that data for the purpose of optimizing decision making processes.

The preferred embodiments of the present invention provide a web based system where users can login to enter information about activities or events that are scheduled to occur at a time in the future. Based on the information entered by the user, a server, which can be in a remote location or exist in software on the users own computer, begins to collect data from one or a plurality of attached random event generator devices and stores that data in a file or database and indexes it to be linked with the users scheduled events.

After the data has been collected and stored, results are presented to the user in an easy to read format, such as in an automatically generated e-mail with an audio visual attachment and made available for future retrieval in a database accessible via a web based system. The user can log into their account and share this data with others, categorize the data according to subjective experiences, perform more detailed analyses with a suite of web based tools, or add notes and additional information that is related in time to that which was already collected. Advanced embodiments of the system make it possible to conduct a detailed correlation analysis between data from multiple users who attended similar events or categories of events, and between other information technology systems which may be relevant to an organization.

The purposes of this system are varied; but one notable use is to take the data that comes out of the system and use it as an objective measurement (e.g. including graphs, numbers, quantitative data, and analysis subject to predetermined methods) of subjective (e.g. emotional, aesthetic, and interpersonal) events that transpired during the time of data generation, and use the objective measurement to modify one's decision making processes in a tangible way. Other reasons for using the system would be to conduct scientific research on the extent to which human activity can influence the output of a random system; to obtain a visual representation of interpersonal happenings; to provide a method for inspiring creativity and reflection onto happenings; or to allow data-centric organizations to have an additional layer of data points which may have correlates with human interactions and may be mined in conjunction with other data and put to use to some profitable end.

The system can also include an online community, which is built around it with the goal of encouraging users to share their data and experiences with one another in a way that leads to mutual learning and/or builds friendships. Technology from this system may also be integrated into other online communities, knowledge bases, or built into the communications infrastructure of a particular business or organization.

In summary, some of the notable aspects of some embodiments include: 1) that the user schedules the collection of data or sets a process into motion ahead of time without having to worry about the details or carrying around proprietary equipment; and 2) that the user communicates with the system remotely, both at a technical level and at the level of an effect.

Further Background Discussion

Due to the increasing interest in the idea that the mind can affect the physical world, the research of the Princeton Engineering Anomalies Research Lab, and the Global Consciousness project; numerous philosophical discussions and research projects have begun to take shape in which the experimenters test the concept that Random Event Generators may produce non-random (e.g. those which deviate from their expected chance behavior) outputs at times that correlate with significant happenings in the world and/or one's own life.

Some time ago, the present inventor created a system (known as the Psyleron REG-1 Package) which, for the purposes of providing entertainment, increasing the efficiency of data collection processes, reducing the cost of experiments, and creating opportunities to allow a user (or many users) to experiment with this consciousness driven random event generator phenomena in their own life without having to purchase expensive equipment or install and manage a detailed software and analysis system as has been historically required in other contexts.

The new invention, as described in this document, builds on and surpasses the prior system by adding new features, being optimized to provide benefit in specific users, and extending it to an online platform that involves the collection of data from a remote random event generator (REG) device or devices that are connected to server. The system also gives the user the ability to schedule the automated collection of data to be accomplished at a future point in time, so that they need not always remember to carry around equipment for the sake of making a measurement at an event.

Another feature of the system is that some embodiments are designed to interface with other data collection processes or devices (e.g. cell phones, personal digital assistances, PowerPoint slide advancers, or security and monitoring devices), and is capable of capturing the real-time output of these devices in a way that provides additional information about the user's environment that will aid in correlational analysis after the experiment has been completed.

The cumulative impact of these changes is to reduce or eliminate the fixed costs associated with previously available systems, and to provide the user with an enhanced ability to use the system for the purposes of ascertaining information about or making decisions relating to their business processes and personal life. As research articles support the idea that there is a connection between the output of REG devices and a sense of "connection" or "resonance" between the observer of the data and his or her experience, this system allows an unprecedented level of analysis capability when such measurements could be useful to decision making processes.

Furthermore, the technology used in some embodiments of this invention simply the data analysis process by removing a layer of interpretation from the user. Whereas users of past systems were presented with only raw statistics and numbers, this invention is capable of providing visual (e.g. textual, graphical) indicators of data segments within an experiment that may be of particular relevance to the user.

Further Discussion Regarding Background Art

The Global Consciousness Project—The global consciousness is an online system for collecting data from the output of random event generators (REGs) scattered around the world and attached to local computers. These REGs, which exist in multiple locations, feed their data back to a centralized server, which processes the data as part of an experiment to look for correlations with happenings in the national news. The preferred embodiments can employ aspects of such a global consciousness project system; however, some notable differences from that system are listed below.

1. The GCP has single REGs in many locations, which feed their data back to a central server. While the invention can embody multiple servers, in its base form it is comprised of one REG (but can be a plurality or many REGs) at a single location being fed to one server.
2. The purpose of the GCP is to measure global events without any particular intention. In the preferred embodiment of the new system, individual users have their own intentions or lack of intention, and the goal is to measure events which are "local"—e.g., in the sense that they are relevant to individual users.
3. The GCP is meant to measure global events and looks for a similar effect across or between devices with the primary correlate being time. On the other hand, the preferred embodiments of the present system measures the experiences and events of individual users, and so data is considered to be user specific. Data generated at parallel points in time may be associated with different users and therefore different purposes.
4. In seeking to measure global events, the GCP aggregates the data from many devices into a single virtual stream (e.g. an analysis process or deviation graph). However, this system is based on a model which says that the observer of the data influences the outcome, which implies that data from separate streams of the same device can have very different characteristics. The primary correlate with these characteristics, based on research studies, can be an element of the observers (Users) intention or subjective experience.
5. The GCP is a closed system run by private experimenters who ask those holding the REG devices to attempt not to influence the device. On the other hand, in this system, the "experimenters" are the individual Users, and they have an implicit goal to influence the device vis-à-vis the fact that they are attempting to measure something in their own life and are seeking a personal response.
6. Information about real time events can not be added to and stored in conjunction with the accumulated data for decision making purposes.

FieldREG Publications—Work done by the Princeton Engineering Anomalies Research lab suggests that group interactions might influence the output of REGs. The relevant publications are incorporated herein by reference in their entireties, as though recited in full, and are listed below:

1. Nelson, R. D., Bradish, G. J., Dobyns, Y. D., Dunne, B. J., Jahn, R. G., FieldREG Anomalies in Group Situations (1996). *J. Scientific Exploration,* 10, No. 1, pp. 111-141;
2. Nelson, R. D., Jahn, R. G., Dunne, B. J., Dobyns, Y. D., Bradish, G. J, FieldREG II: Consciousness Field Effects: Replications and Explorations (1998). *J. Scientific Exploration,* 12, No. 3, pp. 425-454.

Some notable finding of these studies is that the random event generator devices, brought into particular venues involving human experience, seem to show striking departures from their chance behavior.

Psyleron Internal FieldREG Studies—To date, an organization owned and managed by the inventors of the described system has found that these departures from chance in a random event generator may provide information that can aid in decision making by emphasizing those points in time where observers feel a particular emotional or subjective reaction (e.g. excited, enthusiastic, or "resonant") with a presented idea, group, person, or concept.

Remote REG experiments—Publications by researchers have been created which show that the effects which have been demonstrated on an REG can occur remotely—e.g., that a positive result can be obtained even when the devices are not in proximity to their users. Such publications are listed below, and are incorporated herein by reference in their entireties, as though recited in full:

1. Experiments in Remote Human/Machine Interaction. (1992). *J. Scientific Exploration,* 6, No. 4, pp. 311-332;
2. Consciousness and Anomalous Physical Phenomena (1995). PEAR Technical Note 95004, May 1995.

Patents. The disclosure of U.S. Pat. No. 5,830,064, Bradish, et al., 1998, for an "Apparatus and method for distinguishing events which collectively exceed chance expectations and thereby controlling an output" is incorporated herein by reference in its entirety, as though recited in full.

Patent Applications. The entire disclosures of each of the following co-pending provisional applications of the present inventor, J. Valentino, are incorporated herein by reference as though recited herein in full: Ser. No. 60/986,954 (filed on Nov. 9, 2007); Ser. No. 61/012,434 (filed on Dec. 9, 2007); and Ser. No. 61/014,941 (filed on Dec. 19, 2007). These applications emphasize, among other things, the concept and use of correlating a random event generator output with real world events for the purpose of decision making; this present application, among other things, adds to and strengthens that finding.

Discussion of the Preferred Embodiments of Set "IV"

The preferred system is comprised of many components, which can be either virtual in the sense that they exist as part of the same computer (such as, e.g., as software modules, routines or the like components), or physical in the sense that each component of the system represents a different machine or process connected to another via some physical means (e.g. wires, a network, or a connection on a circuit board). FIG. 19 provides a visual outline of a system in accordance with some illustrative embodiments.

1. Client/User—The client is a person who accesses the system for the purpose of recording data and entering information about real world events (e.g. the time and date of an event or meeting, a comment about what occurred at a particular time during that meeting, or subjective notes regarding a response before and/or after the event.)
2. Client Device—A device, such as a personal computer, cell phone, PDA, or proprietary embedded system utilizing a microprocessor, memory, display, and input devices for the sake of allowing the user to communicate with the application server for the purpose of controlling the scheduling system, receiving data from the random event generators, manipulating data, and/or receiving analysis to present it to the User.
3. Client Interface System—The means by which the client device communicates with the application server to achieve the purposes or enact the steps required to fully use an embodiment of the invention.

4. Web (or "Application") Server—A machine or process, in some embodiments a personal computer, that takes requests from the User and provides feedback and messages back to them. This sever is responsible for coordinating and sending data between the user and other systems (e.g. those described below) and also for maintaining information regarding user accounts and sending email notifications to users. In some embodiments, it may be connected to external sub-systems (e.g. those necessary to connect with a cellular phone network to receive SMS messages) for the purpose of interacting with users.

5. Scheduler System—The scheduler system is a component of the system which takes requests from the application server containing information about the times at which a user hopes to schedule a session. The scheduler communicates with the REG Server System to learn about the number of available devices, is responsible for collecting data from the REGs, and also generates text, data, and image files to be stored in the data storage system.

6. REG Server System—This component of the system interfaces with a random event generator (e.g., single, or many, or a separate virtual server containing single or many random event generators) as well as the Scheduler system. Its primary purpose is to keep track of how many devices are available for use, the status of each device, and to provide the Scheduler with the functionality that it needs to control the generators.

7. Random Event Generator(s)—A single random event generator such as those described in other background art; or an embedded device comprised of a microcontroller, memory, and one or more analog circuits specifically designed for the purpose of generating truly (physically) random bits and serving them out to multiple users for the purpose of detecting the influence of consciousness. In some embodiments, the random event generator may be any probabilistic quantum mechanical system which produces a signal that can be fed to a computer for the purpose of measuring consciousness (e.g. with the intention of generating data which may be correlated to states of the human mind, or of a group consciousness.)

8. Data Storage System—This element of the system, which can be embodied by a database engine on a computer that is the same as the application server, or its own standalone machine is used to store both the raw and processed data generated by the random event generators in conjunction with the user experiments. When the Application server needs to request an image or data to be displayed by the User who is accessing the system through the client interface, it makes a request to the data storage system to find and retrieve the necessary data.

Abbreviated Usage Process (User Interface):

The following description provides an example of how a user could interact with the system, in some illustrative examples, for the purpose of providing additional clarity into the nature of the invention according to some embodiments;

1. The user logs into an online system [see, e.g., FIG. 20].
2. The user provides information about the event that they wish to collect data about. [see, e.g., FIGS. 21 and 22] This information contains things such as the start time and end time of the event, the name of the experiment, and any preliminary summary information (e.g. a description of the event, pre-event hypotheses or ideas.) When finished, the user clicks a "submit" button, which adds the session to a database table or file entry and passes the information along to the Scheduler system.
3. [A background process on the server continuously monitors the database table or file to determine if an event has been scheduled at or near the current time.]
4. [At the time that a scheduled event has been said to begin occurring, a program begins to collect data from an REG and begins accumulating data to a separate file or database.]
5. [This file or processed by a proprietary piece of software on the server, which automatically generates a picture file and some textual feedback conveying information about the result to the user. The file is e-mailed in an intelligently but automatically generated e-mail message.]
6. If the users account has been configured to allow for it [not shown], the user receives the e-mail message when the event has concluded [see, e.g., FIG. 23]] and is given a link to connect to the web page [see, e.g., FIG. 24].
7. If the link is clicked, the user is brought to a portion of the web system [see, e.g., FIG. 26] that makes it possible for them to archive the data, add keyword tags to it [see, e.g., FIG. 27], and share it with other users [see, e.g., FIG. 28]. All of these manipulations alter fields in the database.
8. The user can also analyze and compare prior sessions using an online tool. For example, all previously recorded data elements with the keyword "lunch" can be compared side by side and a cumulative statistical analysis of lunches can be presented to compare lunches with other data segments.
9. When data is shared with another user, that other user receives a notification on their own login screen [see, e.g., FIG. 20] and the data is accessible from their analysis archives.

This usage description focuses on the physical attributes of the system and its use but, for simplicity, neglects how a user might use the system to aid in their decision making process, or how a more detailed analysis may be conducted on that data.

Abbreviated Usage Process (Decision Making—User Side):

The following description provides an example of how a user can interact with some embodiments of the system, provided that they understand the above steps. The purpose of providing the illustrations is to provide additional clarity into the nature of the invention according to some embodiments, specifically those which involve augmenting a decision-making process.

These examples are representative of only a sampling of the number of uses for the invention;

In Selling a Product:

1. The user sets up an experiment as in Steps 1-2 above, setting the start time and end time as those times at which he will give a presentation of four potential advertising campaigns ("products") to a customer.
2. During a PowerPoint presentation at the scheduled date and time, the user pushes a button on his PDA to advance the slides forward, and a message is sent to the application server noting that this user has marked new segments at the times that the button was pressed.
3. When the user returns home and receives his e-mail as in Step #6 above, he can easily identify which portions of the graph correspond to each slide in his presentation.

4. If the user finds that the graph corresponding to a particular product is denoted as having particular statistical significance (e.g. the textual messages or statistical indicators in the e-mail attachments that he receives note that there was significant activity corresponding to the pitch of a particular product); he requires that his staff spend more time developing this product and talking with the customer about it than the others.

Determining Subjective Response to an Environment:
1. The User, who is in the process of looking for jobs at a number of companies, follows the steps outlined in the abbreviated usage (user interface) portion described above and schedules experiments for each of the days that she will spend visiting the facilities of and meeting with potential employers.
2. After having received e-mails for each of the scheduled experiments, the user compares her feelings about the companies with the levels of significance indicated during each visit.
3. If the user is unsure or split with regards to deciding on which job to take, she takes the indications of significance to mean that a particular job is a better fit for her, and makes the decision accordingly.

Assessing the Performance of a Person, Product and/or Other Item:
1. The User, who seeks to make a decision that hinges on the emotional responses of a crowd or group to a particular "product" (such as an audience's response to a performer, or a focus group's response to a potential product packaging), follows the steps outlined in the abbreviated usage (user interface) portion described above and schedules experiments for each of the days that she will spend visiting the facilities of and meeting with potential employers.
2. After watching the event or pitching the products, the User looks to see if a particular performer (such as a singer on American Idol) produced a statistically significant deviation or ordering of the random output.
3. The significance is taken to be a measure of emotional response to the product, and the user weights this information into their judgment of the candidates.

Notes on Decision Making Usage Process:
1. Rather than looking for pure statistical significance (e.g. deviations from chance behavior in the mean output of the random event generator), in some embodiments, the textual report presented to the user may indicate a deeper description regarding the data by describing characteristics such as "resonant," "dissonant," "neutral," "excited," etc. These determinations are made based on analysis of the data and primary comments or surveying accumulated by the user; as per provisional application Ser. No. 60/986,954 incorporated by reference above.
2. An indication of significance need not always mean something positive with regards to the intended use. For example, a presenter may believe that a negative (e.g. downward sloping cumulative deviation graph) going trend-line in their data means that they should not dedicate additional resources to a project, but rather drop it all together. The decision is highly subjective (and may be pre-stated, e.g. on the user interface page, in some embodiments of the invention) and is dependent on the user's intention and interpretation of their data.
3. It is pre-supposed that the users relationship to the experiment and the process plays a large role in this process, so introspection and thinking about the data may be necessary. (A supplemental part of this invention is a set of workshops or training materials which help users to learn to generate better data.)
4. Some embodiments of the system will support capabilities meant to aid the user in reflection and decision making on their data. For example, the user may enter information (sometimes referred to as "Ad-hoc comments") into the system about how they felt during certain periods of the experiment. In later analyses of other experiments, this data on emotions and feelings will be available to aid in decision making.

Illustrative Implementation

This section sets forth an illustrative preferred method of implementing a system according to some preferred embodiments and capable of carrying out some or all of the previously described use case scenarios.

Client. In some examples, the client is a person or entity who wishes to conduct an experiment using the output of a random event generator, most likely for the purpose of correlating its output with some kind of physical happening and using the generated output for the purpose of making a decision.

Client Device. In some examples, the client device is a personal computer with Internet access and a web browser capable of processing HTML and submitting forms to a server. The client enters a URL, such as http://www.psyleron.com/LifeREG/ into his browser and is given access to the user interface of the server. A secondary client device to be used is a PDA (personal digital assistant) with wireless internet access and the ability to run a Java applet. In the described embodiment, the user uses the personal computer to schedule and analyze their experiment, but the PDA device to transmit data in real time.

Application Server. In some examples, the server is a computer running software capable of hosting a web page that can be accessed by any HTML compatible web browser. Some embodiments of the invention can employ Microsoft Windows 2003 server software and Microsoft Internet Information Services along with a custom software platform designed for the system and built on ASP.NET.

Sub-Components:

Web Interface. A web page written in, e.g., ASP (Active Server Page) allows the user to log in and carry out the steps listed above. When the user schedules his event, it is entered as a record in a database table (referred to as the Scheduling Database) using a database engine (e.g. MySQL, Postgres, MS SQL), which can be stored on any server machine within the system, or on a virtual "Database System" which may be made up of many machines, components, or processes.

For the additional feature of adding real time information during the course of the experiment, in some embodiments, the Web Server machine runs a custom service ("real time data collection service" or RTCS) in the background which listens for TCP/IP traffic on a port that is uncommonly used by other applications. If the client wishes to transmit data with his client device (such as a PDA), he starts his own custom client application (e.g. A program running on the PDA which issues TCP/IP commands to the server; or a web browser on the cell phone or PDA which connects to a specific page on the application server for the purpose of controlling an experiment), which authenticates itself on the RTCS and, if a scheduled experiment is running, is able to accept command from that client device.

Using TCP/IP (in some embodiments), the client sends a control packet denoting which function should be carried out (e.g. "Add Comment," "New Segment," "Mark Data," "Abort Experiment," "Extend Experiment") as well as one or more data packets (e.g. the nature of the comment, the extension time) and the server stores this information in a temporary file ("user and session specific temporary data file") to be access later.

REG Scheduler. In some embodiments, the REG Scheduler, is a custom software application with access to the "Scheduling Database" that is written to by the application server. When the REG Scheduler detects that the current time is approaching the start time of one or more "start times" indicated in the Scheduling Database, it produces a query to the REG Server to ensure that there are devices available for the experiment.

If devices are available, the REG scheduler checks their status by issuing a command to the REG server, and it then selects an appropriate device based on a priority ranking system. Devices which currently have the fewest users connected to them (e.g. no data, or the least amount of data is being drawn from them at the moment) are given the highest priority. In the event that a device is represented in the "failure table," but not disabled it is given a lower priority than all other devices.

When an appropriate device has been selected, the REG Scheduler begins a "calibration period" by issuing a command to the REG Server to collect data from the device. Rather than being active experimental data, this data is considered "calibration data" and is used for the purpose of assessing the validity of the attached device. If the mean and standard deviation of the data produced by the device are within +1-2.5 standard deviations from chance behavior for the sample size collected, the chosen REG device is considered to be legitimate for data collection, is marked as such in the calibration table, and calibration continues until the scheduled start time.

If it fails, the scheduler can try again, and if it fails again, the scheduler makes a note of this failure in a failures table in its own database (which, in some embodiments, can temporarily disable the device via a command to the REG server, or lower its priority for future scheduling) and seeks out an additional device. This process repeats until a suitable device with qualifying data is found, and the scheduler then locks the device into data collection mode determined by the scheduling data related to the user's session. In some embodiments, the "idle" state of an REG may actually be a state in which the generator is actively collecting data to be stored in a separate calibration or "baseline" database for the purpose of research analysis and quality control.

Data Processor Sub-System. When an experimental data collection has been completed, the REG Scheduler invokes a "data processor" module, which parses that data for significant effects ("parsing"), generates an image file snapshot of the data to be displayed to the user ("visual feedback generation"), and creates the appropriate textual messages to correspond to the data ("text generation"). These files and database entries are made for the data storage system, and a command is sent to the Web/Application server telling it that the session has been completed and the data stored so that it may generate an e-mail message to be sent back to the User.

Parsing [REG Scheduler; Data Processor]. The theory of operation underlying the parsing portion of the system is that statistical significance (assumed by inference from prior experiments and published research articles to often correspond to periods of resonance or subjective importance on the part of the user) may occur at many levels or over many time periods within the experiment and that exposing these levels and providing feedback to the user best allows her to determine what was being detected.

In some embodiments, this analysis only involves one level of parsing, and that is to take each segment of data (e.g. the entire session from start to end, as defined by the user when setting up the experiment; or each portion of data beginning at the first bit generated by the random event generator and ending on the trial that occurs at the same time as a comment or segment break entered by the user in real time during the experiment) and generate a mean and standard deviation for each segment.

For example, to determine the mean, if 1,000 different 200 bit samples were collected over the course of the experiment and there were 100,300 one bits generated (and by deduction, 99,700 zero bits); the mean number of one bits produced by the random event generator would be 100.30. To determine if this is statistically significant, we can subtract the theoretical expectation of this average (100) away from it to obtain a numerator of 0.30, multiply by the square root of the number of trials (31.62) and divide by the standard deviation (7.071); yielding ourselves a Z-Score of 1.34; which is not statistically significant against the null hypothesis that the random event generator would produce a biased output relative to its chance expectation. (As such, in this embodiment, the textual response to be provided to the user based on the "text generation" system would contain a message saying "There is little evidence that this entire segment produced an output that exceeded chance.")

A major drawback of the above-described parsing method is that, on average, it requires that the device be producing a consistent deviation from chance throughout the course of the experiment. This can be true in some circumstances and can be a useful first cut approximation to what is occurring during a session, but it neglects movements and changes that are likely to occur throughout the experiment based on the subjective dynamic and intention or mental state of the experimenter.

In other, more sophisticated embodiments of the system, the parser would look not only for a bottom line level of significance across the entire experiment or segments; but would be sensitive to the number and location of comments made, the segment breaks, and any sharp or unexpected "motions" in the data itself.

The next best approximation to achieving this is to calculate a Z-Score of the mean (as described above) for each portion of the experiment, where a "portion of the experiment" is defined as a consecutive series of data that lies between two time stamps that were marked with a message about the environment from the user (e.g. a real-time comment, a pre-scheduled segment break, a segment break, changes in real-time data feeds from devices such as microphones and cameras).

These Z-Scores can then be used in a number of ways; in one embodiment, a value is computed for each portion of the experiment as in the prior description, as is a level of significance. This makes it possible to display a text message for each portion of the experiment (such as, "This data is marginally significant" if its Z-Score is within the range of 1.69 to 2.25; or "This data is incredibly significant, what were you doing?" if its Z-Score is greater than 3.65); it also makes it possible to apply a second level of text processing which applies to the whole experiment and comments on the likelihood of having so man significant Z-Scores. For example, with one $|Z|>1.69$ out of ten segments of data it might say "Even though some significance was detected, this may be due to chance" but with five $|Z|>1.69$ out of six segments, it may say something like "Though each piece of data appears to be marginally significant, it is very improbable that this occurred by chance. Why was the session so active?"

In another embodiment, these Z-Score values are squared an then added to one another for each portion of the experiment available; resulting in a chi squared value with a number of degrees of freedom equal to the number of portions of the experiment. Using an approximation to computer the probability value for this Chi-Square, the program is also able to use its text engine to report on a level of significance for the entire experiment. Unlike the Z-Score measure, if the chi square is seen to be excessively reduced (Z-Scores too small relative to their number of degrees of freedom), the text processor may interpret it as a significant lack of activity and report that back to the user.

Other variants of the system conduct statistical tests under a similar theory of operation, always looking to determine if any portion of the data over a period of time appears to be excessively significant. The general premise of the feedback system is that it should highlight sections of time with levels of detected statistical significance (visually), and present textual feedback to its user reporting on the significance of each section.

Some specific analyses that can be tested and used with the system as it described are recursive searches for significant localized Z-Scores, good-ness of fit tests relative to prior data which assumes that significant events would occur at particular moments (or around particular comments) for a category of experiments, area under the curve estimates, change in the slope of the graph, Fourier analysis of the time series, and entropy calculations at various segments of the data.

Aside from these computations, which rely on comparing the data to some kind of theoretical or empirically determined "null hypothesis," some embodiments of the system may find it useful to not assume the standard null hypothesis and instead assume that there can always be an effect in the data but that it might be specific to individual users or their subjective circumstances and/or not appear as a departure from chance under most conventional statistical methods. Some examples of analyses to account for these phenomena are described below;

Wave Analysis. In this embodiment, the component conducting analysis has available to it a bank of previously generated data (from actual experiments, or synthetically generated) in which there is a known influence due to consciousness. (E.g., One of the data sets may be a 60 second long sample of data during which the user who generated that data went through a period of intense emotional anger for a known 10 second interval. This data, which contains a "wave" can be compared to each 60 second subset of the Experimental data to be analyzed using standard goodness-of-fit tests. The tests indicate a substantial fit between portions of the actual experiment and the "anger wave," then the analysis may present a message to the user explaining the data it was compared to and instructing the user to look for similarities.)

The wave analysis method can be enhanced by having a deeper database of information available from the particular operator and by having that operator participate in "coding" their data for specific emotions, feelings, happenings, or attributes. This can be done by asking the user to enter their own feedback on a session in a controlled way (which is different from simply entering comments on their experience after the fact) that requires the user to answer key questions and mark key segments of data prior to receiving any kind of automated analysis from the system. The purpose of this is to develop a profile of the user's expectations and experiences that is unbiased by knowledge of the actual outcomes from the device.

Other methods involve having the user run simulated sessions where they attempt to experience certain emotions or states of mind during data recording, or allows them to have access to a Random Event Generator data stream for a prolonged period of time ("attunement period") with the intention of tracking their experiences in life. Here, when they encounter moments of particular importance to them in real life (e.g., fear, love, jealousy, anger, meeting an important new person) subject to the characteristics that they hope to capture in their present or future experiments, they go back to the system and mark the times of such events, blind to the data coming out of the device. At the end of this process, an expert system parses the data under various categories to create a profile to which future experiments can be compared to.

In any embodiment of the system, regardless of the analysis method being used, it is a preferred feature of the system that the parsing analysis methods take into account any subjective or real-time data entered by the user and weight the analysis factors and outcomes based on this subjective information. This theory in and of itself is a radical departure from any prior system meant for similar forms of data collection, as such systems have concerned themselves almost exclusively with collecting data for research purposes and have not thought it wise to risk "contaminating" their data or analysis with subjective input from the user.

Text Generation [REG Scheduler; Data Processing]. The purpose of the text generation portion of the system is to make it more user friendly and to overcome the learning curve and hurdles that some users might experience if they were required to grapple with and interpret purely numerical and quantitative statistics regarding their data. Historically, this type of feature has not been incorporated into random event generator systems, as the focus on such systems was to provide information only to researchers, who were would understand the statistics produced by such a system and add value to their projects by providing interpretation.

In some embodiment of the system, the text generation provides textual feedback that correlates deterministically to the nature of the hypothesis being tested and the probability of that result being due to chance. As an example, an experiment run purely for the sake of determining whether or not there was any indication of subjective "resonance" over the segment of entire data would produce text relating to a likelihood estimate based on the probability that the mean of the data came from a population that fit under the hypothesis of no effect.

As a general rule of thumb for this kind of experiment, a result with a probability of occurring due to chance of less than 1 in 20 can be considered "potentially significant", results with a probability of less than in 1 in 500 are considered "likely significant", and results with a probability of less than 1 in 10,000 are considered "very significant", and results with probabilities of less than 1 in 200,000 are considered "extremely significant". In most cases, textual data is seen as applying to the level at which the analysis takes place (e.g. the entire session, an entire segment, everything within a particular category of experiments) and the textual feedback can also provide scientific qualifiers or frames of reference for data obtained.

For example, if a Z-Score of 3.09 (approximate probability of 1 in 1,000) is achieved in the mean over a session tagged as a conversation between two people, the textual feedback might say:
1. "Your results a likely to be significant and represent a subjective connection" based on the gruel of thumb for significance criteria, and/or:
2. "This means that the likelihood of this result occurring by chance is 1 in 1,000" based on the scientific qualifier, and/or:
3. "Obtaining a result like this would be like buying a three digit lottery ticket and winning on your first try."

These are not the only types of messages that can be displayed; but rather illustrative examples meant to describe how a table of pre-packaged textual feedbacks related to elements of the experiment (e.g. stated purpose, level of significance, and a table of relative probabilistic events) might be used to enhance the user experience and reduce the need for detailed analysis.

In other embodiments of the system, the textual feedback may be prompted based on the prior data of the user. For example, if the user often enters keywords such as "sad" when the mean of a segment following a comment in a particular category of experiment [such as a psychiatry session] goes negative; the system might add a string to its text saying "Does the word [sad] relate to your experience?" This is accomplished by looking for a pre-packaged but ever-growing set of trends in the data, and using a simple (internal) statistical analysis to determine if a word occurs more often than chance when that event is detected as occurring.

The intention of this feature in most embodiments is to prompt the user to think more about their experience, remember prior experiences, and look for trends in the data. It also has tremendous novelty value and, with some users, can be capable of making the user more likely to produce a certain type of effect in their experiments. That is to say, the user's psychology and expectations is as much a part of this system as any specific effect in the data. If a user comes to understand (even at an unconscious level) that a particular feedback is more likely to occur given an effect in the data, they can affect the data during an experiment for making that feedback occur to themselves.

Also of noteworthy relevance to this analysis is that the software can preferably parse the data generated by the random generator to look for strong localized Z-scores over segments of data. By strong localized Z-Scores, this includes, e.g., regions of data in time which do not constitute all of the data collected, but none-the-less show a sharp deviation from chance for some number of collected samples. The level of significance attributable to these regions may be multiplied by an adjustment factor that controls for comments and segment breaks entered by the user in that area, as well as the length of the statistically significant string. In the event that such deviations are found, the system will store information about the findings and can include a notice to the user that the system detected that something may have been happening at the time in question. In such an instance, the user is provided with a text message (e.g. "What happened here?") encouraging them to think more about their subjective experience of the event or time.

Visual Feedback Generation [REG Scheduler; Data Processing]:

Preferably, at the conclusion of this analysis process, the program also generates one or more graphics files in a common exchange format (such as, e.g., in this case, .bmp or .jpg) to be viewed by the user, e.g., in his or her e-mail or with his or her web browser at a later date. In some embodiments, these files are stored with a 72 byte filename that is generated based on a hash function incorporating information from the text file.

The most common visual feedback generated by this process is a form of cumulative deviation graph, such as those described in the background art. These graphs can be enhanced, however by adding text from the text generating stage, or highlighting data and times on the graph that correspond to significant events detected in the parsing stages.

Final Steps [REG Scheduler]. When the data collection has been completed, the output of the random event generator is stored in a binary file, processed for its mean and standard deviation, and for certain pre-specified patterns and trends. Regarding the pre-specified patterns, if an entire segment of data shows a statistically significant slope (relative to the null hypothesis that the data will be purely random) in a single direction over the course of the entire experiment, it is considered to be an indication that something special occurred during the entire data collection period. The system makes a mark of this and can include a note to the user that they should reflect on what may have made this event special.

E-Mail Notification. Preferably, when the files and analysis data have been generated, the REG Scheduler communicates with the Web/Application Server and notifies it that the data collection and analysis has been completed so that it may be sent via e-mail to the user who started it based on his or her account information. This e-mail contains information entered by the user in the scheduling program (e.g. the name and description of the experiment, the time that it began and ended), a copy or link to the graph or image generated by the visual feedback generation system, and, in some embodiments, any textual information generated by the analysis and meant to provide the user with questions or insight into their experimental process.

REG Server. The purpose of the REG server is to serve as an interface between the random event generator devices and the REG Scheduler system. Its primary functionality is to provide access and to abstract away the details regarding how the network of Random Event Generator are physically interconnected and how their data is split, processed, and parsed into streams in order to be served out to users. It may be embodied in many ways, the first of which is simply a PC with multiple USB hubs and ports, each of which connects to a USB based random event generator.

The data server can also be an embedded device comprising a microprocessor, memory, a network connection (E.g. Ethernet port), and a USB or a proprietary interface which connects it to one or more REG Devices. This allows many REG devices to be accessible via TCP/IP without the use of a full computer per set of devices, and makes it possible for one physical web server to interact with as many as hundreds or thousands of REG devices as though they were connected to the same machine. (This example assumes 127 devices per embedded data server and as many as 253 IP addresses available to embedded servers.)

One physical REG device can also contain multiple noise source or processing modules, making it possible for a single physical device to function as many (e.g., dozens or hundreds) of multiple REG devices. The advantage here is that physical space is saved as many REGs can be placed on a single circuit board and redundant electronic components can be re-used. To make such an implementation practical and rule out external noise, these devices should be shielded from one another, should use a heavily filtered power supply that attenuates microvolt level fluctuations on the power lines, and should be ideally electrically isolated from other devices on the same circuit board using an opto-isolator or similar connection.

In some embodiments, software components in the REG server may process the data coming out of individual hardware random event generators, such as by applying an XOR mask to the data output, by selecting and combining consecutive bits, or by conducting autocorrelation and entropy calculations for the sake of creating new bits.

Use of Generators. One special feature that can be used in preferred embodiments of this system is driven by our finding that the output from a single random event generator device can be split into multiple streams, each of which is capable of showing effects as though it were an independent and free-standing random event generator.

This is a break from most traditional concepts of how these effects work, which suggest an effect on a particular device and/or physical noise source. These other concepts may also suggest theories that it is necessary to have devices running at higher bit-rates or using special processing methods; but our findings and a premise behind this invention is that each user need only be presented with his/her own independent set of data which represents an indeterminate quantum state. As such:

1. The output of a single device can be parsed into multiple streams, with each stream being treated as though it comes from an independent device.
2. There may not be overlap in the streams or the integrity of the data can be corrupted.
3. Correlations between data are likely to occur due to the overlapping perspectives or associations of the observers rather than the physical characteristic of the devices themselves.

The benefit of understanding this concept and using it in the system is tremendous, but the key pragmatic issue here is that a lower cost system can be developed because each single user need not have his/her own single noise source.

In our current preferred implementation, each single random event generator device (which, in one embodiment, is capable of producing at least 2,000 bits per second) has its output parsed into ten separate streams by taking each consecutive bit and assigning it to the next data stream, incrementing the data stream counter until it reaches 10 and then resetting it back to zero. (This creates ten "virtual" devices, each of which his capable of producing at least 200 bits per second.) A visual example using 36 bits and 4 different data streams can be seen in FIG. 29.

Functions. The basic software functions (e.g. commands which may be issued to the server to carry out a process and return a value) available from the REG Server can be some combination of the following listed functions:

Commands Relevant to all Devices:

In some preferred embodiments, the following commands are relevant to all devices:

1. GetDeviceList—Returns a list of all of the devices (e.g. random event generators, modules containing multiple random event generators, or virtual data streams) available to the REG server and their status (e.g. in use, calibrating, busy, disabled, available, etc.)
2. DevicesAvailable—Returns the number of devices currently available for data collection (e.g. not in use, calibrating, busy, or disabled.)

Device Specific Commands:

In some preferred embodiments, the following device specific commands are employed:

1. Open (Device #)—Opens a device and sets its status to in use; can refer to a specific device or will open and return the next available device.
2. GetData (Device #)—Takes bits or bytes of data from an opened device that has been specified in the device list.
3. Close (Device #)—Makes a device available for other uses.
4. GetStatus (Device #)—Returns information about a particular device (e.g. availability, device serial number, amount of data generated.)

Processes: Connecting to the REG Server in Some Embodiments:

In some embodiments, the process related to connecting to the REG Server can include, e.g.:

1. The client (e.g. REG Scheduler) sends a request to connect using TCP/IP Remote Procedure Call.
2. The server responds to the client, requests authentication.
3. The client supplies a user name and password.
4. The client requests a list of available devices.
5. The client opens a specific device (or devices.)
6. The client requests data from that device.

In the above and other examples, a device may be either a physical REG hardware device, or a virtual device (such as a stream of data selected from a selected device, such as, e.g., in FIG. 29)

Expansions:

In some embodiments, some or all of the following expansions (e.g., other features) can be employed.

1. In some embodiments, the system can be configured so that a user can interact with their experiment by using a SMS enabled cell-phone, or a PDA device in the following ways:
   a. Experiments can be scheduled by phone.
   b. Comments can be entered into a running experiment by sending a text message or editing the web page. These comments are time-stamped and stored with the existing sessions. If comments are stored, they are displayed on the graph which is generated and e-mailed to the users.
   c. A user can view the progress of an experiment in real-time via the PDA, phone, or other portable device.
   d. The REG scheduler and server devices can provide special control functionality whereby any device utilizing a TCP/IP protocol on the same network can send commands to mark a particular session. This is especially relevant for PDA and cell phone devices, which can run a proprietary piece of software designed by Psyleron to allow a user to edit and add comments to their scheduled session while it is in progress.
2. In some embodiments, a user or group can purchase their own server, hardware, and software system to conduct these experiments for a specific purpose such as to use it as a tool for measuring employee efficiency. These embodiments of the system can be connected to other information technology systems and computer infrastructure for the purpose of data mining for correlations with subjective factors, determined by the intention of the user.
3. In some embodiments, groups that are scheduled together can be pooled or queued such that they are using a particular REG device. For example, a team of twelve "meditators" attending one meditation session might prefer that all of their data be drawn from a single random event generator device. The scheduler system can accommodate this by marking an entire physical REG device as scheduled or unavailable.
4. In some embodiments, the random event generator network can be distributed, and premium users can choose to collect data from random event generator devices in specific locations.
5. In some embodiments, the user may send a real-time stream of voice, video, or other data to the server to be stored in conjunction with the accumulated random event generator data. (e.g. A smart phone may use a proprietary piece of software and a TCP/IP or other networking protocol to upload data from its built in camera to the application server system, which would timestamp and store that data alongside the REG session when the user attempts to analyze it later.)
6. In some embodiments, the user interface to the system may have access to an entire online community built around the concept that users will want to share their experiences with one another, post them on the web (e.g., on the Public Internet or a company intranet accessible via a web browser), and have the opportunity to build their own web sites (e.g. blogs) which track their results in particular venues (e.g. lunches, dates, peace protests, sales meetings, etc.) for the sake of sharing the information with others.
7. In some embodiments, a PowerPoint presentation may be modified using a scripting language (e.g. visual basic for applications) so that the application server is informed when each slide in the presentation is reached. This can be implemented in at least two ways;
    a. The power point presentation writes the slide title as well as a time stamp to a temporary file on the user's PC or portable device, which is monitored by a sentinel program (e.g. one that runs in the background); when the file is updated, the sentinel program sends a message to the remote server telling it to mark a new segment noting that the presentation has been advanced.
    b. The presentation itself may utilize its scripting language to communicate directly with the servers TCP/IP interface.
8. The expansion in #7 may also be applied to local (e.g. non-remote) REG recording applications.
9. Users may be provided with their own server so that they can access and control their REG device remotely as in #7 or #8, but with all of the features of the previously described system.

Terminology Employed

In this portion of this document, the following terminology is employed.

"Random Event Generator" which refers to, in preferred embodiments, any device which generates stochastic and/or probabilistic (in the sense that they can not be predicted beyond a probability density function and are preferably driven by quantum mechanical measurements) outputs with the purpose of, by way of example, measuring the influences of consciousness (e.g., without wires or a direct physical connection to the brain), and whose output can be digitized and stored on a computer.

"Database" which refers to any system for storing data in an electronic format.

Except when referring to prior research studies, "Experiment" is used loosely to refer to any situation in which a person correlates the output of one system with that of another system for the purpose of testing a hypothesis, making a decision, or asking a question.

Further Discussion Related to Drawings

The following figures provide, among other things, some illustrative examples of what a user might encounter in the online system.

As indicated above, with reference to FIG. 20, the user enters a name and password associated with their account, which is used to give them access to their previously generated data.

With reference to FIG. 24, the main page, as shown, serves as the portal to the user's experimental database and community interactions. Among other things, it preferably contains messages and alerts from other users, the status of recently completed experiments, access to the users data archive, and an ability to access or change information related to the users account.

Although not depicted, an illustrative setup section can also be provided that allows the user to control options relating to their account, including billing information, groups that they are a part of, and how they would like their e-mail notifications to be configured.

With reference to FIG. 21, as shown in this figure, the user preferably uses this display interface to enter their activities into a list or into a calendar like format.

In instances where a fee is being paid for use of the system, a user might be presented with a confirmation screen, such as, e.g., shown in FIG. 22. After the confirm button is pressed, the web server communicates with the Scheduling Server to schedule the event. In this case, by way of example, a session lasting for 2 hrs and 45 mins will be run on May 12th of 2007 and the data stored in a database with a reference to this particular user.

Implementation Note: The scheduling system will store its own local copy of information provided from the web server, including but not limited to: the users account name, the date of the experimental sessions, and the length of the session. The scheduling server uses information about the number of available REGs, the current scheduled usage, historical server loads, and then factors in an additional "cushion" to estimate which REG devices the scheduled session should connect to. At the specified date and time (e.g. when the session is scheduled to run), the scheduling server chooses which device on the network should actually be used by searching its network of connected devices (which can include many devices connected to one machine, or a number of single devices connected to machines around the world) and collects the needed data from it.

With reference to FIG. 23, this figure depicts an illustrative example of an E-Mail received from the Auto-Mailer in some illustrative embodiments. After the completion of a scheduled event, the user receives an e-mail from the system stating that their data is now available. Preferably, clicking the links in the e-mail will bring the user to their login page where they can assess the data. Preferably, attached to the e-mail is a graph of the data generated during that time period, and possibly textual summary created by an expert system on the Psyleron server. Preferably, the user can have an option in their account settings to enable or disable the sending of the graph with the e-mail.

FIG. 23(A) shows an illustrative e-mail attachment according to an illustrative example. In this exemplary document attached to the E-Mail, A Cumulative Deviation Graph is shown where the black line represents data generated by the "active" random event generator during the event. Here, the pink line is representative of "calibration" data taken from another device during the same time period. In this illustrative example, a user could interpret this graph as showing that the lunch was particularly meaningful.

FIG. 23(B) shows another illustrative e-mail attachment according to an illustrative example. This example is similar to the above attachment in FIG. 23(A), but this one contains automated text generated by the Psyleron Data processor. Because the result is significant in this illustrative example, the illustrative message asks the user to reflect on its meaning. In some embodiments, a more elaborate version of the program could recognize keywords related to this graph, such as "lunch" and produce automated information related thereto. For example, the system could indicate, e.g., "This is your 5th lunch out of 7 that shows significant results, which is highly improbable by chance. What is it about your lunches that produces these results?" or other such messages.

With reference to FIG. 25, after the user clicks a link to access their data, they are brought into the LifeREG portal to view the data and they also have the option of editing or otherwise adding information to their experiment. By clicking buttons on the toolbar below the graph, the user can associate keywords with the experiment, type a journal entry or ad-hoc comments related to the session, share the session with friends, or receive a link to the experiment that they can post elsewhere on the Internet.

With reference to FIG. 28, a special feature of the system is that it is meant to be interactive and data can be shared with others. If the data is shared with someone who is already a member of the community, the user has the option of making their experiment available to the friend in the friend's archive. If the data is shared with a non-member of the community, a user account is created based on the e-mail address, and an e-mail is sent to the friend, allowing them to also have access to the community and the data. In all cases, an alert shows up on the main page of the person who the data was shared with.

Although not shown in the figures, another feature of the system can include that users can analyze prior experiments in parallel to one another. For example, all of the data with the keyword "Lunch" can be called to the screen. For an additional fee, the "raw" data associated with an experiment can be downloaded. Analysis allows for other possibilities such as, e.g., Monte Carlo simulations of the data, or a comparison of the data to other experiments.

With reference to FIG. 27, keywords are a method of categorization that allows the user to easily combine and link experiments together. For example, the above session has keywords of "Lunch," "Lawyers," "Steve," and "Fun." Data with any of these keywords can be combined together for the sake of specific analysis, such as to determine whether or not events with "Steve" involved share similarities in their data; or to determine which type of activity in one's life tends to produce the best results.

FIG. 27 is also representative of one illustrative example of what Mike can receive via e-mail and view on his screen regarding his first date with Sally. The program realizes that the marked segment is statistically significant because the huge deviation (approximately 384 bits over 400 trials) that occurs during this time is very improbable in the standard output of a random event generator. When Mike realizes that the event occurs between the beginning of his philosophy conversation with Sally (marked by the first blue marker) and the time that she goes for a bathroom break (marked by the second); he is convinced that it can not be due to pure chance! What he does with the information is up to him, but it is a cause for reflection.

The following figures provide block diagrams and illustrative examples of how some embodiments of various components of the system may function and operate.

As discussed above, FIG. 19 shows a high level overview of the sub-systems involved in running the system in question according to some illustrative embodiments. Each block in this diagram can represent a software component on a physical machine, a separate physical machine designed for the particular purpose in question, or a cluster of machines. Circles are representative of data storage systems, and arrows help to explain what type of information is transferred between the components.

Figure 19A:
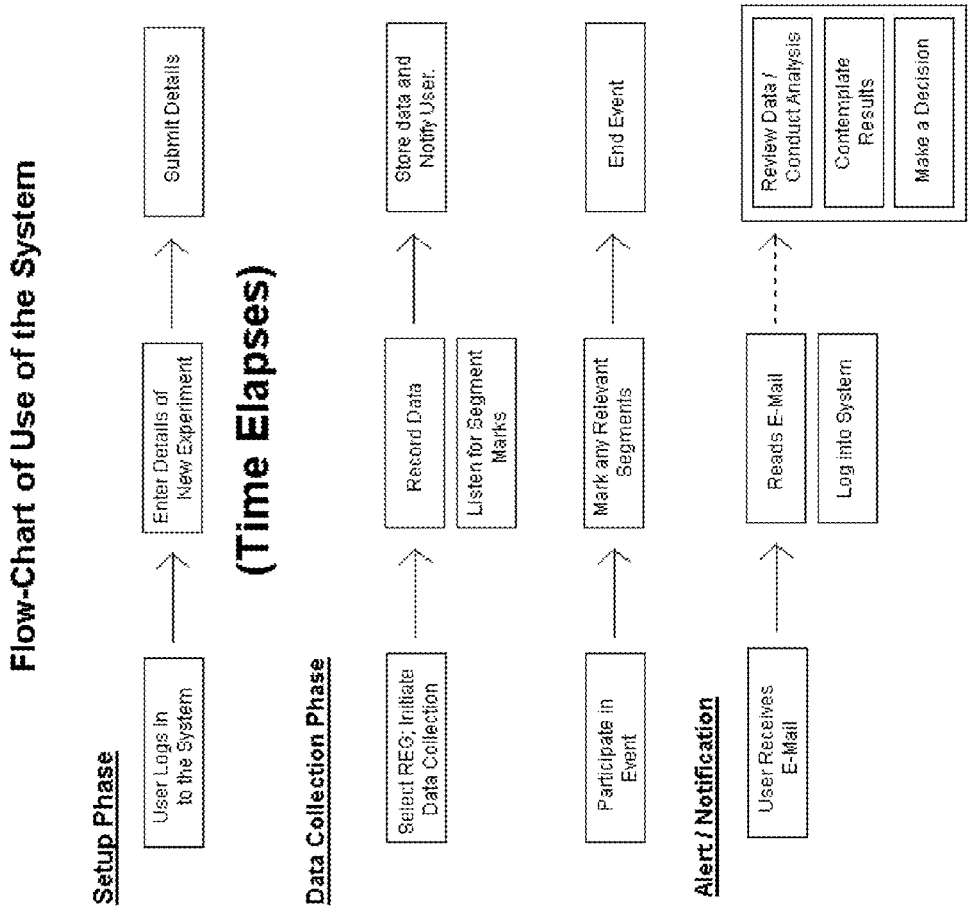
FIG. 19(A) is an illustrative flow chart of a use of the system.

FIG. 19(A) shows a high-level flow chart, relative to physical time, as to how a user might control the system.

FIG. 30 shows the process by which the Scheduler Server receives a request from the Application Server. The information in the request is checked against a table of currently scheduled events and internal status messages, if the experiment is OK, stores a new record in the table and sends a success message to the application server.

FIG. 31 outlines the process for monitoring the scheduling table.

FIG. 32 shows the process by which the Scheduler Server "boots-up," and attempt to connect to an REG server.

FIG. 33 shows the sequence by which the Scheduler Server initializes devices for the purpose of collecting data.

FIG. 34 shows the process by which calibration data is collected from the device before formal data is collected.

FIG. 35 details the data collection sequence for an active experiment.

FIG. 36 shows how calibration tests are conducted.

FIG. 37 provides pseudo-code used to demonstrate the calibration tests.

FIG. 38 shows the process by which data is sent to the data processor.

With reference to FIG. 39, this diagram shows how multiple random event generator devices might be connected to an REG server; which is then accessible by many clients via TCP/IP.

With reference to FIG. 29, as shown in this diagram, a bit stream from a single random event generator device is treated as four virtual devices, capable of providing data to four different users. It is important to note that in this preferred embodiment, no user is server the same two bits.

Illustrative Use Case Scenarios:

The intention of the following is to provide a plain English description of hypothetical situations involving fictitious customers who might choose to use some embodiment of the described system for a preferred purpose. These examples are provided to give an additional level of insight into how and why a person might choose to use the invention as well as to shed light into the advantages over existing methods.

Dating.

Joe is interested in using the system because he believes that an important part of finding a suitable romantic partner is being able to "connect" with potential mates. After reading about the Princeton lab research and the idea that well connected couples are able to create deviations on the output of random event generators; he signs up to use our pre-described embodiment of the system with hopes that it will enhance his personal life and help to provide him with new insight into this relationships.

After asking Sally out to dinner for next Wednesday, Joe logs into the described system on the Psyleron web page and enters the date, time, location, and other details that he thinks are relevant into the system. When Wednesday comes along, he goes on his date with Sally and intensely enjoys their conversations, believing in a subjective sense that they have really hit it off. At one point, they have an engaging conversation about philosophy and Sally excuses herself to use the restroom. When she returns, they discuss her interesting in soccer and touch on past life experiences. Joe really enjoys himself, and wonders if the feeling was mutual.

When he returns home from the date at night, he opens up his e-mail and is pleasantly surprised to remember that he had scheduled an event with the Psyleron system last night. In an automated e-mail, he receives a note providing basic guidelines for interpreting the attached visual graph and an indication that some elements of the night seemed to show an improbable effect. To his logical surprise but his emotional delight, when Joe opens the graph he realizes that the program has a highlighted a shift in the graph that corresponds almost exactly to their philosophy discussions—a time when he had been sure that something was going on between the two of them. (See, e.g., FIG. 27 for an illustrative graphical example.)

"My God" he says to himself, "That connection that I felt with Sally really seems to be measured by this thing" and he begins to replay the night in more detail, in his mind, and wonder about what it all means. He feels validated regarding his feelings about their conversations; she really did delight in his interest and value their conversations. Logging into the analysis web page, he creates notes to himself regarding the night so that he might remember what the data corresponds to, and in the process of doing so reflects more deeply on the nature of his interactions and what he thought about Sally.

He learns about himself and validates his feelings through a combination of his own subjective experience, and this process, which provides him with quantitative and graphical feedback. It gives him the confidence to call her again for another date. When he isn't sure about what to do—the philosophy conversation was great, but she said she loved soccer; he remembers the deviation in the graph and invites her to a philosophy lecture. She is thrilled; and his choice of the next date location leads to more deep conversations and connecting. He uses the system for all other dates from then on!

The Salesman.

Mike isn't your average business man. Sure, he got his MBA from Harvard, has his Masters degree in analytical finance and worked his way up through the corporate ladder—but he has also always had an interest in philosophy, quantum physics, and the nature of time. While he and most of the people around him attribute his success to hard work, focus, and good interpersonal skills; he sometimes wonders if there isn't more to it. Why was it that there were certain things, specifically with regards to interacting with customers and clients that were always so obvious to him and weren't to anyone else?

There were times where he had done deals that others considered to be impossible. They viewed him as a great salesman who could bring two sides together, he felt that it was due to his sense of intuition and being able to "resonate with" and understand the needs of his customers. By understanding them and communicating in a way that worked, Mike was able to do deals and make big money for his company. If only there were a way to refine that art, and communicate it to the rest of his team.

When Mike heard about the Psyleron system, he had to give it a try. If it could really do what it claimed to do—provide some kind of feedback that related to the interpersonal interactions between people; he would have a new way of not only experimenting with something that interested him, but could potentially give his career an even faster boost and improve the abilities of his entire staff. The possibilities were endless!

Mike bought Psyleron's basic FieldREG package with a personal use license, and, much to his surprise, found that some of the changes in the graph (along with the textual generated feedback that purported to help point out important sections in the data) did indeed correspond with those "special moments" at which he could feel the conversations turning around and imagined that he was giving a great pitch.

After upgrading to a business license, he continued to use the package during his meetings and session; finding that it helped him to hone his skills even further and sometimes even to gain information about the customers. If peaks tended to occur when talking about a particular aspect of his product in a presentation, he would subtly query the other side later to find out if that was the best product for them. It was providing benefits for him by making him even more responsive to and understanding of his customers.

As great as the system was, Mike found that it was sometimes tedious and difficult to record sessions. He would have to remember to carry his random event generator and laptop (or his Psyleron embedded device) with him to meetings, which might be too much to setup and remember. The new embodiment of the technology, which was an online system, simplified this task by making it so that his secretary could enter his entire calendar into the web based scheduling interface, and receive reports at his leisure.

Rather than reading the e-mails, when he felt that he had time and wanted to review the data to prepare for his next presentation to a particular client or to see where he went wrong; he would log into the online analysis system, call up all of the events that were scheduled and relevant to that client, and carry out his usual process.

Furthermore, to supplement the functionality of adding comments and marking segments that he used to have when his computer was with him; Mike added the Psyleron portable phone application to his PDA and configured it to allow him to mark segments and create comments from afar. When the scheduler system was running one of his sessions from a remote server, might could click a button (or a few) to send data to the server via TCP/IP. The server would note the time that his data came in and append it to actual data from the REG. When mike received his graphs via e-mail or looked at his data archive, he would be reminded of where each incoming message occurred during the presentation.

Customer Relations Training.

After having seen the success of her friend Mike, Jill, the director of H.R. at a large company decided that she wanted her entire staff to benefit from using the technology that mike did. But rather than setting up each employee with their own system, she wanted to streamline the technology and have her own full featured system with proprietary analysis and features built and supported by her IT department.

In this case, Jill decides to purchase an REG server and both a business user and developer's license which will allow her to support up to one hundred staff members. This embodiment allows the IT staff to write their own analysis methods, customize their scheduling system, and tie data from the generators to company wide events and other pieces of data that are mined from the rest of the infrastructure. The system is accessible on the company's private network, and becomes a focal point for staff to enter other data and information relevant to meetings, presentations, and conferences.

It becomes an integrated solution for sharing knowledge about customers, reviewing employee performance and feelings, and training employees and managers to become more aware of themselves and think more deeply about their teams and customers.

5. Embodiment Set "V"—A Method and Apparatus for Producing Visually Appealing Outputs to a User for the Purpose of Games, Meditation, and Entertainment Based on the Controlled Processing of Statistical Deviations in a Random Physical Process Overview:

In some embodiments, a system and/or method is provided for using random processes to determine the color of a visual stimulus and changing said color when deviations from expected behavior are detected in the random process.

In some preferred embodiments, a novel and unique lamp is provided that employs and REG device in such a manner as to appear to change colors or the like based on, e.g., the intention of a person, what is happening in a group environment or setting and/or other extra-physical phenomena.

The preferred embodiment of the present invention utilizes a tri-colored LED to illuminate a customized lamp based on statistical deviations in the output of an electronic random signal generator circuit. The signal generator circuit is designed to produce outputs which have a theoretical statistical expectation, and is sampled by a microcontroller, which isolates and captures statistical deviations in the signal. The microcontroller uses these samples to determine how to alter the color of the overall apparatus, creating a novel and visually appealing device with applications to meditation, gaming, art, and research.

Other embodiments of the invention include a wireless transceiver module and a remote control, which works in conjunction with the lamp and the user to allow for various games or other group activities involving selecting and altering the color of the lamp.

In recent years, there has been burgeoning interest in the idea that the human mind can have a direct influence on the physical world. Laboratories such as the Princeton Engineering Anomalies Research lab at Princeton University have conducted experiments to show that Random physical devices with roots in quantum uncertainty (e.g. devices sometimes referred to as "Random Event Generators") may produce non-random (e.g. those which deviate from their expected chance behavior under classical assumptions about physics) outputs that correlate with the intention of a human user ("Operator") or correspond to states of heightened emotional engagement and involvement in the user or a group.

While this research has been interesting to many followers and has gained a steady amount of media coverage and pop-culture follow-ons in recent years, a simple and physical embodiment of the work has largely been inaccessible to lay people. Some time ago, the present inventor created a system (known as the Psyleron REG-1 Package), which, for the purposes of providing entertainment, increasing the efficiency of data collection processes, reducing the cost of experiments, and creating opportunities to allow a user (or many users) to experiment with this consciousness driven random event generator phenomena in their own life without having to purchase expensive equipment or install and manage a detailed software and analysis system as has been historically required in other contexts.

The new invention, as described in this document, is a consumer oriented device which takes advantage of technological developments that came about using the computer oriented systems, and which is meant to provide an aesthetically appealing and subjectively meaningful experience to the user without necessarily involving the rigorous analysis and interpretation required in more quantitative experiments related to consciousness correlated phenomena. Its roots in research about the mind and the nature of the physical universe appeals particularly to users with an interest in the mind or human intention.

Experiments in Anomalous Human Machine Interaction—Publications by researchers show that the output of a physical random event generator may be influenced by the intention of a user who is focusing on them. A sample of such publications are listed below, and are incorporated herein by reference in their entireties, as though recited in full:

1. Engineering Anomalies Research (1987). *J. Scientific Exploration,* 1, No. 1, pp. 21-50.
2. Consciousneoss and Anomalous Physical Phenomena (1995). PEAR Technical Note 95004, May 1995.

Psyleron Internal REG Studies—Psyleron has conducted a number of controlled and anecdotal experiments utilizing a random event generator and human intention. These experiments replicate and build upon the publications cited at the PEAR lab, showing that human intention is able to affect the output of these random physical processes.

Psyleron Internal Lamp Studies—Testing and development with the invention has shown that it can respond to the intention of a user in ways that exceed chance behavior and are similar to those effects found in prior experiments. For example, in one study, the invention was embodied in the form of a color changing lamp and operators were able to pre-state an intended color ("I wish to make the lamp turn red") and it was noted that the lamp achieved this stated color at a rate much faster than would be expected when the lamp was left to run under control conditions.

FieldREG Publications—Work done by the Princeton Engineering Anomalies Research lab suggests that the emotional content and subjective nature of group interactions might influence the output of REGs. The relevant publications are incorporated herein by reference in their entireties, as though recited in full, and are listed below:

1. Nelson, R. D., Bradish, G. J., Dobyns, Y. D., Dunne, B. J., Jahn, R. G., FieldREG Anomalies in Group Situations (1996). *J. Scientific Exploration,* 10, No. 1, pp. 111-141;
2. Nelson, R. D., Jahn, R. G., Dunne, B. J., Dobyns, Y. D., Bradish, G. J, FieldREG II: Consciousness Field Effects: Replications and Explorations (1998). *J. Scientific Exploration,* 12, No. 3, pp. 425-454.

The notable finding of these studies is that the random event generator devices, brought into particular venues involving human experiences such as enthusiasm, shared purpose, or group intention, seem to show departures from their chance behavior. In this context, novelty is added to the lamp.

Patents. The disclosure of U.S. Pat. No. 5,830,064, Bradish, et al., 1998, for an "Apparatus and method for distinguishing events which collectively exceed chance expectations and thereby controlling an output" is incorporated herein by reference in its entirety, as though recited in full.

Patent Application. The entire disclosure of the present inventors provisional application Ser. Nos. 60/986,954; 61/012,434; 61/014,941 filed on Nov. 9, 2007, Dec. 9, 2007, and Dec. 19, 2007 of the present inventor, J. Valentino, is incorporated herein by reference as though recited in full. Some of this application emphasizes the concept and use of packaging a random event generating circuit into a real world device with the purchase of spurring additional thoughts and introspection on the part of the user; this present application adds to and strengthens that finding.

Discussion Related to Embodiment Set "V"

The preferred embodiment of the system has the following six main components:
1. A Custom Housing ("Lamp Housing")—In some preferred embodiments, the invention involves a housing, made of a form of glass (or in some embodiments plastic or another translucent material) that has been colored so as to allow light to pass from the inside to the outside, so that it might change colors based on light emitted from a light emitting diode (LED) on the inside of the housing.
2. PC Board Housing—A housing which is built for the purpose of holding an electronic circuit board as well as the LED, LEDs, or Light Sources which will drive the color of the lamp.
3. Light Diffuser Mechanism—A piece of plastic, glass, and/or metal which goes inside of the Lamp Housing and PC Board Housing for the purpose of providing better diffusion and reflection of the LED light, with the goal of saturating the custom housing.
4. Circuit Attachment Mechanism—A plastic or metal device, or a form of glue, caulk, or other adhesive, which is used for the purpose of attaching the PC Board Housing, Light Diffuser, Circuit Board, and any lights to the Lamp Housing.
5. Circuit Board—One or more electronic printed circuit board(s) which preferably has the following sub-systems and components.
    a. Analog Random Noise Source—In the preferred embodiments, the Analog Random Noise Source (sometimes referred to as "Random Signal Generator") uses an electronic signal to create a non-deterministic (e.g. unpredictable) output which has known statistical properties when sampled by some kind of digital circuit. In the preferred embodiment, this analog random noise source is comprised of a resistor and Field Effect Transistor (FET) combination circuit which generates Johnson noise on the input of the FET. This analog signal is sampled with a comparator in such a configuration that nominally allows it to produce 50% "high" outputs and 50% "low outputs" and is then fed to a Micro-Controller (4) for processing.
    b. Power Supply and Management Circuit—The power supply circuit converts AC voltage or battery power into a DC current that is sufficient for running the analog random source and powering the microcontroller. Special care is taken when designing this power supply to create two semi-isolated power outputs from one input. This is important so that the sensitive Random Analog Noise Source is not disturbed by fluctuations on the power line which are driven by the digital logic and/or LED driver circuits.
    c. High Power LED and Driver Circuit—A high power (e.g. >500 mW) LED is used in conjunction with a transistor and resistor circuit, and in some embodiments, a digital to analog converter. The purpose of this portion of the circuit is to allow the Microcontroller to produce a wide variety/full spectrum of hues and colors by varying the intensity and duty cycle of a limited number of discrete Light Emitting Diodes.
    d. Micro Controller with Custom Software—The microcontroller serves as the "brains" of the circuit, and in the preferred embodiment has at least four functions;
        i. Process the Random Analog Signal—The microcontroller uses a built in (or external) comparator or analog to digital converter to sample the random generator circuit and, in some embodiments, to process it using a software algorithm for the purpose of generating outputs with the statistical properties necessary to drive the LED device. The combination of the analog circuit output and this processing method may sometimes be referred to a "Random Event Generator" or "REG."
        ii. Selectively power the LEDs—The microcontroller performs calculations necessary to power the LED, lights, and/or LED driver circuit for the purpose of generating a particular color. In some cases, the color selected is driven by calculations performed on the output of the REG.
        iii. Process Input from the User—In some embodiments, the microcontroller is connected to one or more switches, buttons, potentiometers, or sensors, for the purpose of configuring the state and output of the device or any of its subsystems.
        iv. Process Input from Sub-Systems—The microcontroller can be connected to one or more subsystems, with which it transfers data to provide additional functionality to the device.
    e. Sub-Systems—Different embodiments of the invention may employ one or more "sub-systems" used for the purpose of providing additional features and functionality to the "Base Circuit." Examples of such sub-systems are a wireless transceiver sub-system, which receives a wirelessly transmitted signal from or a variety of remote devices; a TCP/IP sub-system, which makes the state of the device accessible over a network via an Ethernet cable; a Sound and Voice sub-system, which gives the device the capability of producing sounds or emitting words when particular states are triggers; a USB sub-system, which makes the device controllable from a PC; or a battery management sub-system meant to charge and discharge rechargeable batteries in such a way as to maximize the battery life and operating time of the overall system.

Illustrative Usage Process (e.g., Employing User Interface):

In one illustrative simplistic embodiment of the system, the user plugs the invention with its Base Circuit (e.g. a PC Board containing the analog noise source, microcontroller, LED driver, and power management circuits; house inside of a custom made transparent glass case) into the wall. Within moments, the device turns on, emitting a color that has been determined by the output of the random generator circuit.

The user and possibly his or her friends then watch the lamp, enjoying its novelty and hoping to create a deviation in the output based on their mental intention. After some time, the lamp changes to another color, determined by the random generator circuit, and the users take this as either positive or negative feedback with regards to their stated intentional goal.

In other embodiments of the system, the same process takes on a more sophisticated meaning. By pressing a button on a remote control, the first player in a multi-player game will select a color (such as blue) that is his stated color. The lamp starts up in a random state and begins to shift based on the output of the random generator circuit as a count-down timer (displayed on an LCD in the remote) begins counting down for some period of time (e.g. two minutes.) The users sit there with their intentions attempting to either make the lamp turn blue or not blue based on which team they are on.

At the end of the two minutes, if the lamp has achieved a blue color, it emits a sound (e.g. a happy bell to indicate victory) and the user or team who was aiming for the blue color is given points according to a scoring system (e.g. ten points for reaching blue within 2 minutes), and the remote is passed to the next user, who repeats the process, beginning with a new color.

In another embodiment, highlighted for its slightly different purpose, a meditator or alternative energy healing practitioner (e.g. someone performing the practices or techniques known as "Reiki," "Qi Gong," "Therapeutic Touch," or some equivalent") brings the lamp to class with them and goes through a series of guided meditations, motions, or breathing actions with the intent of shifting the color of the lamp. Alternatively, they may assign a meaning to each of the colors and reflect on it during their meditation process, altering their mental states, actions, or exercises based on the color displayed.

In some embodiments, a lamp of an embodiment described herein can be used for data collection similar to other embodiments described herein. By way of example, in some embodiments, the lamp can include a communication interface via which messages can be transmitted to an external computer (such as, e.g., a personal computer or external server). In some embodiments, the lamp can be adapted to transmit points of statistically notable events (such as, e.g., timing for switching between colors or the like) for data storage, data analysis and data display (e.g. via a monitor connected to the computer). In some embodiments, the lamp also includes a mechanism for a user to store an audio recording (e.g., along with a time stamp of the audio recording) for creating an audio file that is also transmitted to the computer or server or the like. By way of example, in some embodiments, the lamp can include a wireless connection to a computer or server (e.g., WLAN connection), or an Ethernet connection, or can be connected using a USB cable or a Bluetooth wireless connection or some other mechanism to transmit data to a computer or server. In some embodiments, the lamp will only transmit data related to REG events, such as, e.g., statistical data, times of variations of colors, or the like, while the computer can include software that collects the data received from the lamp and allows for a user to input an audio recording and/or to otherwise identify particular matters of interest, such as, e.g., to make an audio recording of the user's subjective comments which is linked with and displayed with data from the lamp via the computer and monitor. Among other things, the software could be adapted to enable a user to track progress and make user evaluations of correlations between lamp data and their subjective data. Alternatively or additionally, the software could also be adapted to perform analysis and comparisons between such data streams, such as, e.g., correlating lamp data with user data and presenting results of such correlations to the user.

Implementation of the Preferred Embodiments

This section sets forth a preferred method of implementing a system according to some preferred embodiments and capable of carrying out some or all of the previously described use case scenarios. The following description is intended to represent only one embodiment of the system, and other combinations of features or implementations to achieve the same novel goals are possible.

1. Housing—The housing consists of a 12" tall cylindrical lamp made of a white frosted glass and commonly available at stores such as IKEA. The lamp is produced using a traditional molding process, and has three additional features features;
    1. Opening in the Bottom ("Diffuser Hole")—The lamp has an approximately 1.5" in diameter hole for the purpose of accepting a lamp.
    2. Indented Bottom Shape—The bottom of the lamp has an approximately 3.0" in diameter and 0.75" deep cylindrical opening.
    3. Power Opening—The edge of the lamp contains a hole, which is suitable for allowing a power adapter out.
    4. Opacity—The lamp is made of materials and colored so as to allow a colored light on the insight (e.g. a blue light) to diffuse through the body of the lamp and make the body appear to also be another color (e.g. blue.)
2. PC Board Housing—In this embodiment, the PC Board housing is a sheet of plastic attached to the PC Board using two screws. It serves the purpose of isolating the PC Board from the glass of the lamp and from the LED housed in the light Diffuser Cap.
3. Light Diffuser Cap—The embodiment employs a 1.5" in diameter and 0.25" deep plastic cap, similar to those found on the tops of many plastic drink bottles, such as those on the bottles of Coca-Cola's "Vitamin Water." The cap is made of a translucent white plastic, and is connected via an epoxy material to the Diffuser Hole and the PC Board Housing.
4. PCB Attachment Mechanism—The Light Diffuser Cap is connected to the opening in the bottom (1.1A) of the housing using a silicone based epoxy adhesive capable of withstanding high temperatures. The LED is placed inside of this cap, and then which is then connected via an adhesive to the PC Board. The PC Board may also be connected via an adhesive to the bottom of the Lamp Housing (1.1B). This seals all of the parts in place and creates a single object of a solid construction.
5. Circuit Board—The printed circuit board is mechanically fitted to be a six sided polygon that will fit snugly within the indented housing (1.1B) of the housing. It contains a variety of electronic systems, mostly being comprised of commonly available surface mount components.

Random Noise Generator Circuit—The preferred implementation of the analog generator circuit uses a Field Effect Transistor (e.g. 2N5484) coupled to a high resistance (e.g. 680 k ohms) precision resistor and an amplification circuit (e.g. a pair of 2N3906 PNP general purpose amplification transistors) for the purpose of generating a random signal. When minor fluctuations in current (e.g. those due to the random nature of molecular collisions within the resistive material) occur, they modify the gate-emitter voltage of the Field Effect transistor, thickening and dampening the potential energy at the main junction through which electrons can flow.

These electrons are, themselves, subject to the random process of quantum tunneling (e.g. each electron has a probability of tunneling through a potential barrier which it would not otherwise have the energy to pass), and this process leads to a very small fluctuating current flowing from the source to the drain of the Field Effect Transistor. This small current is amplified through a general purpose amplification circuit using a two transistor amplifier circuit, and each transistor includes a filter (high or low pass) for filtering out frequencies below some range (e.g. 500 Hz) and above some other frequency (e.g. 100 KHz.)

This filtering attenuates spurious noise signals not driven by the desired quantum processes, such as that which is commonly referred to as "1/f noise" and leaves a signal with a virtually flat frequency spectrum, driven largely by underlying quantum events (e.g. tunneling of electrons through a potential barrier and/or thermal agitation of the resistive lattice in a resistor), and which is suitable for sampling at a later stage in the circuit. [Example Schematic in 1.5A]

This portion of the circuit must also be fed from a purified power supply, and is, in preferred embodiments, shielded from external noise by placing a grounded piece of copper over the FET and resistor combination. An additional layer of copper or mu-metal shielding may be included.

Power Supply—The preferred embodiment of the circuit has a power supply which can, for the sake of clarity and convenience, be defined in terms of two parts. The first part is the "external power supply," which serves as a bridge between some commonly available power source (e.g. the 110 Volt AC output of a common household electrical outlet) and the internal circuit. The second part of the power supply can be referred to as the "internal power supply," which is a sub-system mounted on the Printed Circuit board and used as a bridge between the External Power Supply and other portions of the circuit.

a. External Power Supply—In the preferred embodiment of the circuit, the external power supply is a standard DC wall transformer which is rated for 5.5 VDC at 2.0 amps and included a slim profile plug so that it may be plugged into the wall without interfering with other circuits. The external power supply may use a transformer, rectifier diode, capacitor, and a voltage regulator to create a stable DC output voltage.

b. Internal Power Supply—The internal power supply accepts the input from the external power supply via a female power jack. It puts the current through a ferrite bead which is specifically designed to attenuate high frequency jitter but allow DC signals. This is then fed into storage and filtering capacitors, and put through two parallel voltage regulators (e.g. LP2985-AIM5.0 and LP2985-AIM3.3) which produce outputs of 3.3V and 5.0V. The 3.3V signal is used to power the digital logic, whereas the regulated 5.0V output, which in some embodiments may be further isolated with a diode or full wave bridge rectifier, is used to power the analog portion of the circuit.

The combined power supply mechanism helps to reduce artifacts from the wall or fluctuations in the line current. The dual voltage output serves the purpose of reducing spikes on the power line that are driven by relatively high frequency and high current draw from the digital logic, microcontroller, and other sub-systems of the circuit.

Micro-Controller—The described embodiment of the invention utilizes a PIC 18F2550 microcontroller circuit running at 20 MHz. The Microcontroller is programmed to have a timer driven interrupt occur at least 10,000 times per second, with the interrupt providing a pulse to each of the LEDs in the LED driver circuit, based on the color that the program hopes to display.

This interrupt routine runs alongside a main loop which gets a processed bit from the REG (e.g. the analog noise source output sampled with a comparator and put through a processing algorithm described in the appendix) and, based on the value of the bit makes a slight modification of the color that is currently being displayed by the device vis-à-vis the interrupt routine. In addition to this, the algorithm compares the current bit to prior bits, and when many subsequent bits are equal to one another (e.g. when eight consecutive '1' bits have been produced), the color to be displayed by the interrupt routine is shifted even further.

Sample pseudo-code is as follows. Actual code from a single working embodiment of the device is provided in appendix 2.

Functions:
1. getBit( )—Samples a bit from the analog source and processes them according to an algorithm. In one embodiment, the algorithm takes multiple samples from the comparator with the scheme; (if bit1==bit2 then sample again. If bit1=1 and bit2=0 then output=1. If bit1=0 and bit2=1 then output=0.) Output is then XORed with a bit generated using a pseudo-random algorithm, to help ensure high statistical quality.
2. HSVtoRGB—Converts numerical representations of Hue, Saturation, and Value to 1 byte (e.g. 8 bit, 256 position variables) variables meant to represent the relative intensities of Red, Green, and Blue used to drive separate Red, Green, and Blue LEDs.

Timer Driven Interrupt:

In addition to the main program loop, which executes sequentially, a timer driven interrupt is called approximately 10,000 times per second for the purpose of setting the LEDs into either an on or off state depending on the color to be produced by the lamp.

Main Program Loop:
do{
Bit[n]=getBit;
if (Bit[n]==1)
    ColorWheel++;
If (Bit[n]==0)
    ColorWheel--;
N++;
State=getState (Bit[N]));
ShiftColor (State);
SetLEDs (R,G,B);
Delay_ms(12);
} while(1);

A full Source code for one embodiment of the device was incorporated in the said above-corresponding U.S. Provisional Application, the entire disclosure of which has been incorporated in this application.

Conclusion:

The totality of this embodiment creates an aesthetically appealing and intellectually interesting device with the potential to be influenced by the states of mind, emotions, and intentions of its viewer. It has applications in gaming, meditation, and many areas which are of interest to consumers.

Alternative Embodiments

Some examples of embodiments of the invention, other than those explicitly described above, are summarized below;
1. Different shape of the case—Other embodiments of the invention can be housed in a translucent dome, pyramid, or sphere. The size can also be modified, with the above described embodiment occupying something as small as a "snow globe" (e.g. a sphere of less than 3 inches in diameter) or as large as multiple LEDs will allow.
2. Different type of case—Rather than being an ornamental object such as a lamp to be placed on a desk, the circuit described above can be miniaturized using common circuit miniaturization techniques and then placed in jewelry, such as a pendant, watch, bracelet, or anklet.
3. LED Array—In addition to using a single high powered RGB LED module, other embodiments of the invention can use multiple high powered LEDs, stand-alone LEDs, an array of low powered LEDs, or even a single low powered LED in some applications.
4. Algorithms and LED Control—In addition to having the algorithm of the preferred embodiment control the color of the emitted light, it can also control the brightness of the emitted light, cause the light to alternate in different patterns (e.g. flashing on and off), or even use the LED driver circuit to drive something such as an audible feedback by connecting it to a piezoelectric buzzer or speaker element.

In various other embodiments, any other form of lamination can be employed, and LED lights are just some preferred examples. Moreover, while some preferred embodiments have the LED colors change, it is contemplated that rather than and/or in addition to changing colors, another variation in lamination can be imparted, such as, e.g., to increase the intensity, create a flash or an intermittent pulse or flickering of a light, to dim a light and/or otherwise moderate light settings. Moreover, while this example pertains to light emissions, other embodiments can involve, e.g., sound emission and/or emission of any other media, whether olfactory (e.g., smells), sounds and/or the like.

Enhancements:

The described embodiment of the device presents only one subset of the multitude of possible uses and applications for the technology and concepts surrounding the device. In addition to the preferred embodiment and others listed, devices making use of the invention may employ some or many of the following additional features:
1. Battery Operation—The invention as described in the preferred embodiment can be powered by a battery or collection of batteries providing at least 3.0V of output. Other embodiments utilizing lower power LEDs can function at lower voltages. To employ this enhancement, the external power supply need only be replaced with a connection to the battery or batteries. These batteries provide power that is free of many artifacts that can be found on the AC power line, and so the additional level of power filtering is often not necessary.
2. Mode Switches—A switch or plurality of switches may be added to the circuit and connected to the microcontroller for the purpose of enabling or disabling features. For example, the constants in the source code which change the speed at which the lamp changes colors, or the nature of the lighting effect (e.g. color shifting vs. intensity shifting) may be set by a switch or potentiometer.
3. Wireless Control—A wireless controller may be used to enable or disable modes or configuration settings, such as in #2, by taking advantage of commonly employed engineering techniques.
4. Data Collection—An embodiment of the device may sample data from its random event generator by storing the digitized output from the analog noise source (e.g. That which is used to control the lamp) in the memory of the Microcontroller and/or writing it to an EEPROM or flash memory device and/or transferring it to a computer via a USB port.
5. Color—Documentation provided with the device may associate the colored output of the device with a subjective state (e.g. blue for calmness, red for anger), and advanced algorithms may be used to determine which colors to display.

Terminology

Throughout this portion of this document, the following terminology is employed.

"Random Event Generator" which refers to, in preferred embodiments, any device which generates stochastic and/or probabilistic (in the sense that they can not be predicted beyond a probability density function and are preferably driven by quantum mechanical measurements) outputs with the purpose of measuring the influences of consciousness (e.g., without wires or a direct physical connection to the brain), and whose output can be digitized and processed by a computer or onboard Microcontroller.

"Meditator" is used to refer to any person who practices a state of mental introspection, disciplined thinking, or active focus with the intent of altering his or her mental state, creating an internal subjective experience, or creating some kind of influence on the physical world. An example of a meditator could be a person who meditates according to some traditional meditation practice (such as, e.g., Zen Buddhism, Yoga, Transcendental Meditation) or also a person who engages in introspection, prayer, or such activities.

"Energy Healer" or "Alternative Medicine Practitioner" is used to refer to any person who engages in the practice of such terms as are understood by those in the art.

Except when referring to prior research studies, "Experiment" is used loosely to refer to any situation in which a person correlates the output of one system with that of another system for the purpose of testing a hypothesis, making a decision, or asking a question.

DESCRIPTION OF THE FIGURES

FIG. 40 provides an example of a housing in which the invention can exist, as used in the preferred embodiment. The power cord coming off.

FIG. 41 demonstrates how the "PC Board", "PC Board Top Plate", "PC Board Bottom Plate," "Light Diffuser Cap" and "LED with PCB" come together to form a solid module which exists within the housing.

Figure 42:
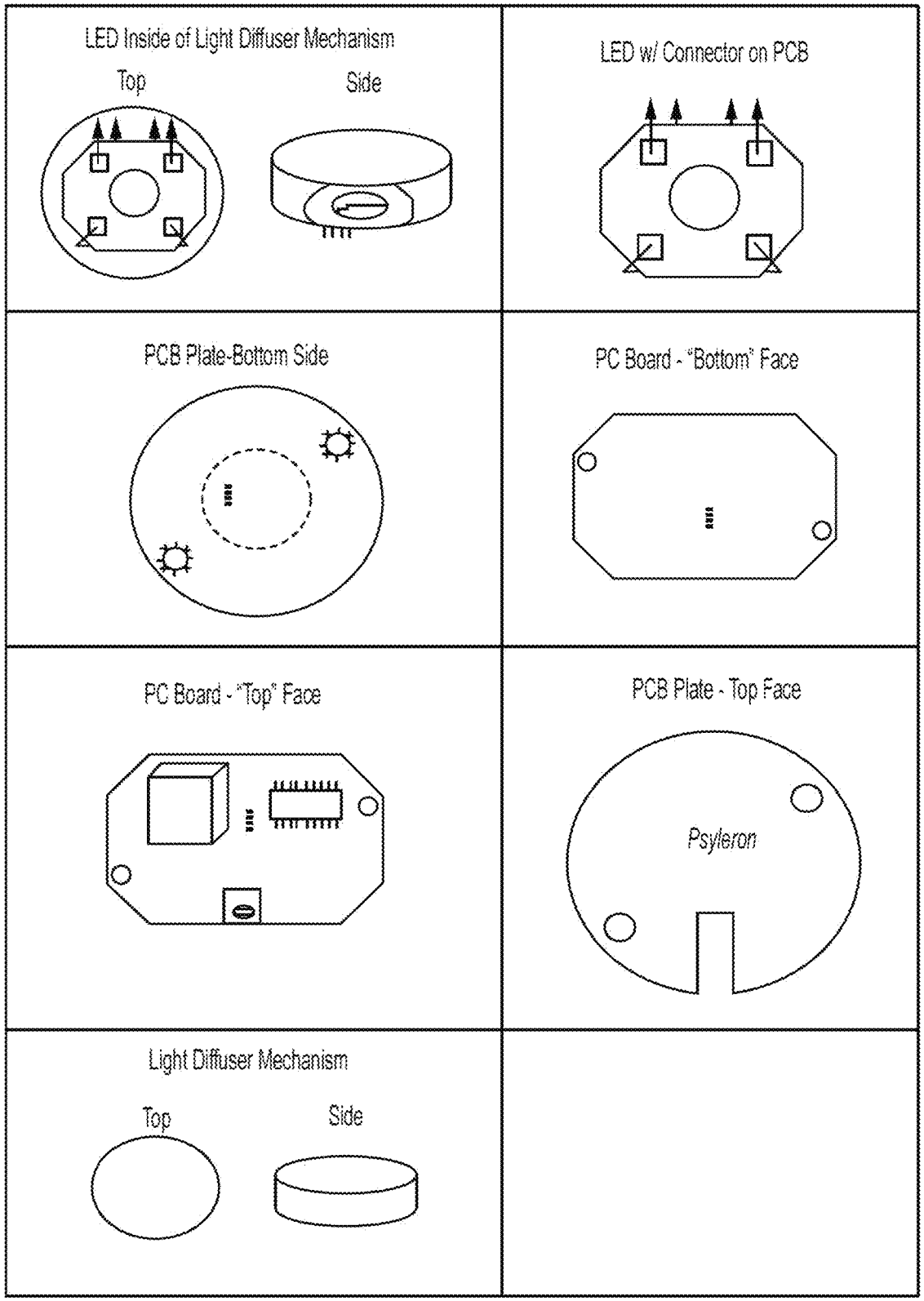
FIG. 42 is an illustrative chart of some components of the device according to some embodiments.
Figure 43:
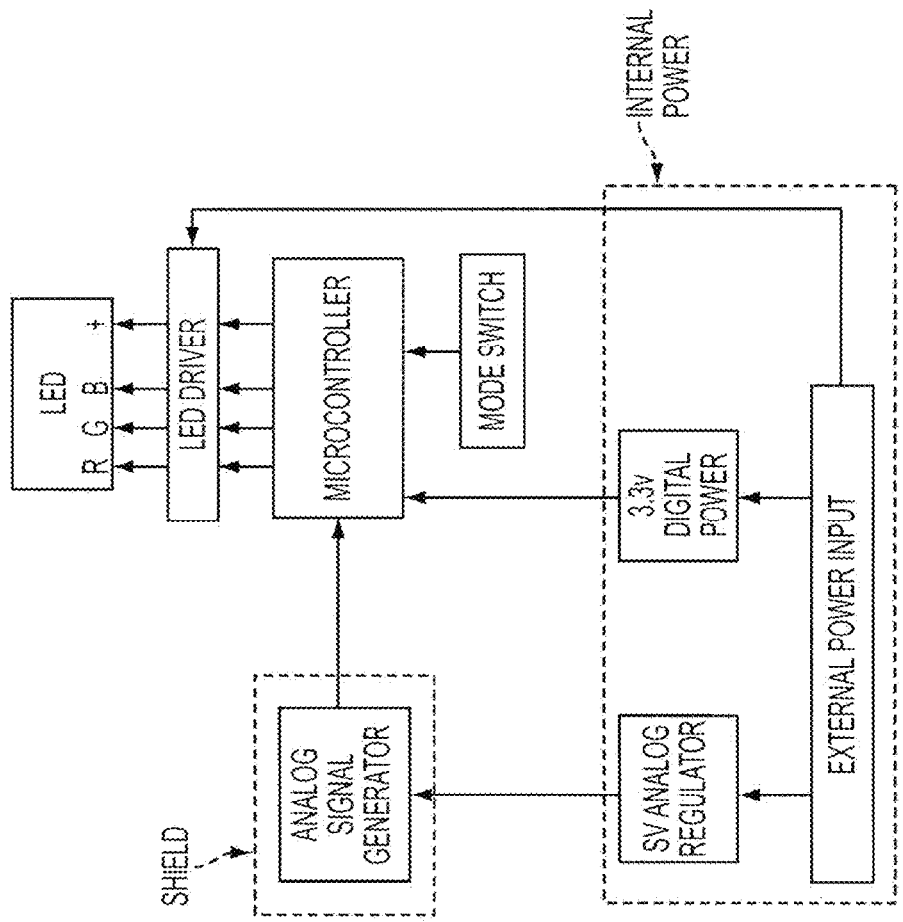

FIG. 42 provides illustrations of separate components, with some additional details provided below:
  A. Light Diffuser—The light diffuser is made of a translucent plastic and has a fully open bottom with a slightly rounded top.
  B. "PCB Plate Top Face"—The top face is a solid disk with two screw holes and an opening cut to allow access to a DC power jack. It may have a company or product name etched into it. This piece goes on the bottom-most part of the lamp and is visible to the end-user.

C. "PC Board Top Face"—This is the component side of the PC Board, which is shown to include a metal shielding cap [in the upper left] to protect the sensitive analog circuit, a DC power jack [in the bottom center] and a micro controller [in the upper right.] It also includes holes which can accept PCB standoffs.

D. "PC Board Bottom Face"—This illustrates the back side of the PC Board, which may have no components, and has a total of six holes. Four of the holes are for interfacing with an LED, and the other two are for screws or PCB standoffs.

E. "PCB Plate Bottom Side"—This illustrate a connect which rests on the bottom face of the PC Board. It has two holes with PEM nuts (to accept screws from the PC Board or Standoffs), and four holes to accept pins from an LED circuit board. The dotted line circle suggests where the Light Diffuser mechanism with LED inside can be placed.

F. "LED with Connector on PCB"—This illustrates a single LED housing containing 3 LEDs (Red, Green, Blue) and with four wires; which can be one common anode and the cathode for each of the Red, Green, and Blue sub-LEDs. These wires terminate in pins, which can be plugged into the PC Board.

G. "LED Inside of Light Diffuser Mechanism"—This figure illustrates how the LED can be placed inside of the light diffuser mechanism with its interface pins sticking out so that it may be put to rest on the "PCB Plate Bottom Side" and otherwise connect to the PC Board itself.

Figure 26:
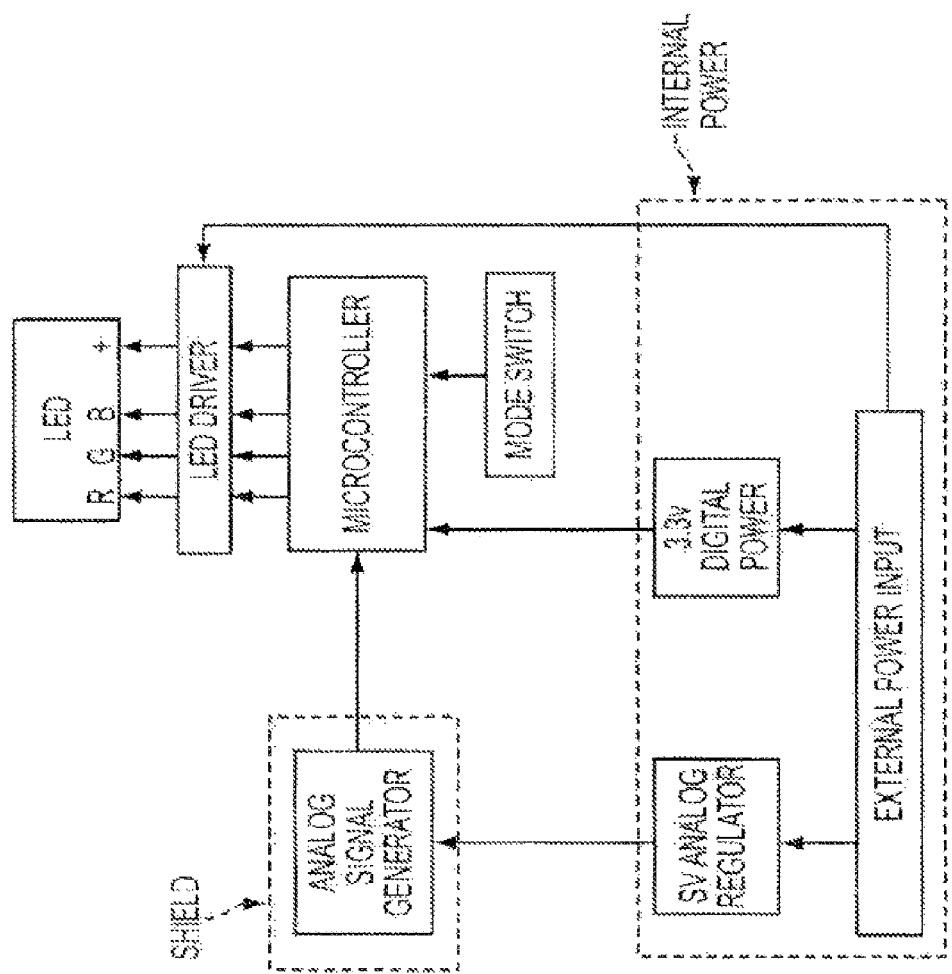
FIG. 26 is an illustrative architectural diagram according to some embodiments of the invention.

FIG. 26 provides a block diagram of the connections between various components of a preferred embodiment of the invention.

As indicated above, source code written in C for a PIC 18F2450/18F2550 Micro controller is incorporated herein by reference via the above-noted provisional application, to demonstrate and illustrative preferred embodiment of the invention along with many of the behaviors and characteristics listed in this document.

6. Embodiment Set "VI"—A System and Process for Improving Decision Making by Drawing on the Implicit Knowledge of Human Agents with the Aid of A Random Event Generator Overview:

A process and system for surveying users is presented in which users are exposed to a pre-defined but potentially evolving set of questions that are presented in a random order. The same set of questions is presented to multiple users for the sake of aggregating the results to come up with a collective consensus of otherwise unpredictable probabilistic or subjective outcomes, or those same questions are presented to the same user in different orders over the course of various sessions when he or she is in a different state of mind or has been exposed to additional information.

The prediction power, accuracy, and novelty of this system is further enhanced by the use of a random event generator that controls various aspects of the information presentation and provides added data to be analyzed in the decision making process. The system may use the random generator output to shape the nature of the experiment and/or to weight the significance or meaningfulness of responses based on statistical deviations in the random generator that occur before, during, or after the questioning process has taken place. When this feature is employed, the claimed enhancement relies not only on the fact that the random generator adds elements of randomness to the process to eliminate selection bias and known statistical artifacts, but also that internal and external research has shown that properly processed and interpreted random event generator outcomes may provide information about the subconscious and subjective states of participants.

In analyzing the final results of the data collection process, special attention is paid to the output of the random event generator, the recorded or recalled subjective states of the participants before and during the times of the survey, and the co-incidence of similar results and feelings across the pool of participants. In most cases, this information is used by an agent to aid in complex decision making processes. In some situations, the help of an expert data interpreter may be used to further increase the capabilities of the system.

Some notable aspects or concepts of this embodiment include the incorporation of random event generators into kinds of data collection processes to reveal hidden information about something. Moreover, some embodiments herein also touch on some concepts like asking a person a question multiple times in different ways to capture implicit information. By, for example, focusing a person on these things while the REG is operating, this can potentially be better "honed" on a particular question or set of questions and, therefore, provide extra information that would not otherwise be known if no REG was present. For example, a strong emotional reaction to a particular question or set of questions might manifest in the REG data, and an analyzer could recognize the pattern and appreciate that a particular idea or concept was "triggering" the survey taker.

Illustrative Steps:

1. A data file is prepared that provides a pool of questions and various parameters relating to the possible forms of answers to the question (multiple choice, fill in the blank, etc.) from which a program will present questions to a user. The data file may include information and parameters for the "experiment" such as whether a question is required or optional, the maximum number of times that it can be presented, the range of allowable values, whether any elements of the question (such as numbers) may be randomly varied by the "electronic data collection program," and other such considerations.

2. A user is presented with the "electronic data collection program" which will interpret the data file and [in some cases] randomly order the questions and fill in variable values based on the output of a true or pseudo-random number generator.

3. The user answers the questions in the order presented by the program, usually in a one at a time way. The computer stores additional information such as reaction times to the question (in milliseconds), output from the random event generator (see section III) and, in some instances, data from external sources such as physiological measuring devices. In many cases, the user is encouraged to answer based on their gut reaction or instinct rather than based on logic, analysis, or processed concepts.

4. Optionally, the user may keep a journal, logbook, or use some kind of method of tracking information about their feelings, mood, emotions, thoughts, and subjective feelings or responses to the questions.

5. The answers are saved to a file for future tabulation; or sent over a network to a central database containing the user's responses to said questions and any additional data from external devices.

6. After enough data is accumulated from many users or from a single user on varied instances over a period of time; the results are processed (by taking an average, median, mode, or looking at some statistical distribution characteristics) to arrive at a probability distribution of outcomes or results based on the consensus data. For example, if the questions related to the offering price of some stock, the average across many days and various hypothetical deals may be presented as a final outcome. The program makes recommendations regarding outcomes based on what is provided.

7. The data from this process is incorporated into some decision making process to increase the accuracy and effectiveness of the decision making process relative to what it would have been without the system.

Consciousness Correlated Information Enhancement Using a Random Process:

Using the same basic process as described above, we are able to deeply enhance the information acquisition potential of the system by utilizing the output of a true random event generator at the time of the data acquisition. This generator feeds its data to an electronic system such as a computer for the purpose of temporarily correlating it with the output. The REG output may also be used to shape the presentations of questions or provide a number of control functions over the course of the experiment.

For example:
1) Output from the random event generator can be processed by the computer to change the order of the questions in real-time;
2) Output from the random event generator can determine whether or not a particular question should be asked;
3) Output from the random event generator can determine whether or not a question should be repeated later in the survey; or, in some advanced embodiments, leads to an intelligent modification of the question, which is then repeated at a later time.

In some embodiments, the output of the random event generator can also play an important role in shaping the analysis of the data or the questions being asked. For example:
1) Output from the random event generator is recorded as the user makes a response to the prompts and is stored. At the time of analysis, structural trends in this data are compared against time-stamped elements of the user responses for the sake of gaining insight into the questioning process. For example:
   i. If multiple users show statistically significant deviations when responding to the same question or writing about the same topic, the surveyor knows to follow up on that question.
   ii. If significant or similar deviations occur when the user is presented with questions relating to a topic or similar category within a session (such as the price of bonds; the person's childhood; the weather on Tuesday).
2) The surveyor takes real-time random event generator output as they parse through the results of the survey and is alerted to any significant deviations. If alerts occur in a pattern related to the above, they are considered relevant.

Variants and Notes:
This process may involve one individual person answering the same set of questions over a protracted period of time, ideally when they are in a number of different mental states.

Analysis of complementary data from the random event generator should pay special attention to deviations from the expected chance output of the random event generator during times the user is presented with or reflecting on a question.

In an advanced embodiment, the question data file may include fields relating to the emotional content of the file and the random event generator output may be used to re-present questions with stronger or weaker emotional content based on perceptions of those emotions.

Analysis of the random event generator data in conjunction with the survey questions and output may be strictly quantitative as in applying specific algorithms to assess the output; or it may be qualitative in terms of having an expert or professional assess and interpret the data based on context and prior experience.

Sample Uses:
This system has potential uses in just about any situation where a person or multiple people are seeking to make a prediction or a guess in light of uncertain information. For example:
1) The general forecasting of any type of business trend of which different people have disparate knowledge; for example, to come up with marketing the demand for a product in future business quarters or years.
2) To measure the aggregate opinion of a group on various topics.
3) To come up with an estimate of stock prices for the purpose of prediction or to assess the value of some other asset.
4) To measure the emotional reaction of a person or a group of people to a particular topic or line of questioning.
5) To obtain knowledge about subconscious or implicit feelings on a particular topic—for example, a psychotherapist may present customized surveys to a participant for the purpose of learning about the deeper emotional status of the user.
6) To help an individual decision maker, such as a business executive to set a course of strategy for their organization or to better understand their feelings on a particular topic.
7) To add an additional piece of information to any kind of survey process, such as: a standard opinion survey, a survey regarding tastes and preferences for products, a survey measuring customer or client satisfaction relating to a product or service.
8) To determine which variables should be further researched in a decision making process. For example; in a case of limited resources to conduct an investigation, significance along a particular line of questioning might spur investigators to pursue those topics further.
9) To determine which variables should be included into, e.g., a Monte Carlo simulation or a business/financial model based on those which exhibit the highest degree of correspondence across participants or significant random generator correlations.
10) As a self-improvement tool for making more well informed long-term decisions about ones own life, dreams, ambitions, and desires.

Analysis Methods:

Though the simplest application of concepts put forward in this application can provide a tangible benefit to users in most domains with little formal analysis, a more detailed understanding of the principles and analysis methods can shed more insight into the nature of the invention and its potential uses.

It is most convenient to talk about analysis in two separate processes, even though a preferred embodiment of the system would almost always seek to incorporate both methods into the interpretation of data.

General Theory:

According to some embodiments, of notable importance is the notion that the subconscious mind of an individual or the implicit knowledge of a group may have access to much more information than is consciously available to any given person at any given moment in time. The theory of operation for this process and its analysis seeks to elicit this information from the subconscious mind in both a mundane and anomalous way.

In some embodiments, the first part of our process relies on the fact that the conscious mind of an individual contains different pieces of information at different moments. Ask a person how many units of product they think a company will sell when they are in a bad mood and they may likely underestimate it. Ask the same person after a motivating sales meeting or a conversation with a customer, and the same person's estimate may be higher even if no information is presented. In all cases, there is an underlying thread of "rationality" that shapes the person's decisions and judgments. By capturing data from this single user at various times, as the person is in various states, even a simple averaging combination of the data will refine the estimate.

In the case of groups, the operating principle is that each member of the group is similar to the individual when they are in a different mood or state of mind. The In either case, the analysis method can be aided by requiring that participants make subjective notes regarding their states and opinions before and/or after the data collection takes place. Upon a final analysis or averaging of the data, the person can parse through their notes to determine the respective weight of various emotional states. For example, if a participant (or, more likely, a skilled analyzer) realizes that she had 9 unduly pessimistic days, 5 neutral days, and only 3 optimistic days; a calculation of the split and contributions of each days can lead to a refinement of the estimate.

A second way of enhancing the standard method for creating these results is by doing what we internally refer to as "isolating units of meaning," which is a concept that basically means that the participant should be capable of clearing their mind and removing "overlap" from prior guesses or judgments at the time that data entry is made.

Simply waiting for a period of time between data collection sessions from a particular participant is one way of implicitly accomplishing this; but we encourage that users work to "forget" prior assumptions and ideas between sessions or to take a unique perspective.

In the case of experiments involving groups, the minimizing chatter and consensus between participants is extremely important; so the participants might be encouraged to partake in activities which promote individuality and implicitly separate them from the group. An example of such an activity would be asking them to write down ten things that make them different from others who will be participates, their likes and dislikes with regards to other people, and about their background. It is noted that at many other places in this document, embodiments pertaining to groups tend to focus on individuals in the group having a more collectively cooperative behavior and, essentially, being on the same page in order to create an effect. However, this particular example in this paragraphs is referring to a different situation.

Consciousness Enhanced Method:

Whereas the above-noted analysis methods general theory deals primarily with the theory that underlies the way that participants process information and can convey it to their conscious mind, a method of enhancement that is particularly novel to this invention lies in the large bodies of empirical data which suggest that some elements of the subconscious and unconscious mind is capable of influencing the output of random event generator devices using a mechanism that can not easily be explained by contemporary science.

As described above, the present inventor(s) and researchers at certain labs such as, e.g., the Princeton Engineering Anomalies Research lab at Princeton University, have found that the deeper intentions and emotional states of users can cause a random event generator to produce an output which deviates from its chance behavior. For example when participants partake in an experiment partake in a group situation that makes them feel "resonant" or connected to other people, the device shows indications of extra-chance behavior. Strong emotional reactions can also cause such deviations, and in a number proprietary situations we have shown that individuals are able to use the output of the device to cue them into pieces of information that they should pay additional attention to.

In light of this, the process and method described in VI.A can be significantly enhanced under the appropriate psychological and subjective conditions by using an analysis method that correlates "significance" in the output of the random event generator with the data taken in the prior experiment. Specifically, the analyst looks at the responses to particular questions or happenings in the experiment and checks to see if the quantitative output of the random event generator shows indications of non-randomness. If such a deviation is found, an appropriate weighting statistic is used, in a method similar to that of an expert analyzer who is taking mood into account. For example, if there are a total of five guesses or estimates made by a person, each guess might have a weight of $\frac{1}{5}$th in naïve weighting. Using the REG output, however, we might find significant deviations during two of the guesses, and assign each of these a weight of $\frac{2}{7}$ and weight the other 3 guesses at $\frac{1}{7}$ each.

In such an analysis, the particular quantitative method of detecting such deviations does not appear to be extremely important except in that it should look for some reduction of entropy or randomness in the physical process. In a preferred embodiment, we look at segments of random event generator data as the user is entering his or her comments and see if there is any indication that the elemental binary probability of the random event generator has shifted away from its expectation output of P=0.500 using a standard Z-test.

This test is often automated by the computer, and the analyst is able to view a graphical display which provides a "replay" of the survey data entered by the user, which is then shown in sync with a cumulative deviation graph of the REG-output. Segments with exceptional Z-Scores are highlighted in a marker color, and the analyst has the ability to click on the segment for more details and, in some cases, to search the experimental data base of other participants to see if any other significant data correlates with similar keywords. (For example; we may find significant outputs corresponding to one participant's entries involving the words "interest rates" and "debentures" in which case other data would be mined.)

Countless other forms of such analysis can be performed across the data in a standard data-mining sense, but the critical point is that when statistically significant results are realized, they are flagged as potentially extraordinary and followed up on in a way that is appropriate to the particular experiment. (As an example; a psychologist administering this survey may find recurring significant patterns when a person answers questions about their family; this would be a strong indication that the psychologist should delve further into issues relating to the participant's family.)

Based on these findings, the analyst might decide to interview others who were surveyed who made similar comments, create a new set of questions to look into, and/or modify the original estimates that came out of the non-enhanced experiment. This can be particularly useful in identifying which questions should be targeted when there are limited resource available.

Analysis Algorithms:

To date, we find that the specific nature of algorithms or methods used to employ the random generator data is less important than the fact that the analyst be looking for deviations from chance behavior that correlate with meaningful pieces of information in the real-time data process.

When this document refers to "significance" regarding the output of the random event generator enhanced elements of this process, it can mean any combination of statistical significance based on a test of the random event generator data in question relative to its chance expectations, or significance in the sense that the analyzer attributes a particular meaning to those outcomes.

Extended Applications:

A very similar process to the above may be used to one's benefit by substituting the electronic survey process with a personal interview or in a group meeting. In such a situation, the experimenter or analyst could make notes about the questions and issues which arise during the meeting and utilize their random event generator with a program such as the Psyleron FieldREG and then conduct an analysis such as those described above wherein recorded subjective events are correlated with the random event generator output.

Additional Inputs:

The system need not be limited only to the input of a random event generator device. A benefit of the random event generator device is that it works in an unobtrusive way and seems to be particularly capable of detecting useful information when the experiments and analysis are conducted by skilled observers. In situations where it is possible to have greater access to participants, biofeedback systems incorporated EEG, Galvanic Skin Resistance, and Heart Rate Variability may add additional useful information to be correlated with the REG output.

7. Embodiment Set "VII"—A Method for Measuring Interpersonal Interactions and Interpreting their Qualities for the Purpose of Enhancing Business and Personal Activities with the Aid of a Random Event Generator Overview:

A portable device, which contains an internal true random bit generator, physical sensors such as a microphone or pushbutton to trigger the beginning and end of a data collection segment, and a mechanism for storing data and transmitting it to a PC or server, is used for the purpose of gauging individual interactions. Prior filings of the inventor as well as publications cited by the inventor as prior art describe the broader theory of operation and design behind the device. This document describes additional uses and benefits of the invention in business and personal applications, applies it in a context appropriate for businesses and large organizations, introduces further means for determining the meaning of output data, and describes an optimal device and user configuration for collecting data with these purposes in mind.

For reference, some notable aspects of the preferred embodiments in this section involve that data could be processed to produce outputs which provide feedbacks on some subjective scale with terms (e.g. "Resonant") for the purpose of, e.g., helping someone to do something, such as, e.g., in business. In some preferred embodiments, a plurality or multitude of people could carry these devices around, an their data can be sent to a server, combined with other data, and processed in a number of ways—both real time and not real time.

Technical Advantage:

Voice Recognized Segmenting. This version of the device, which is meant or passive data collection in real-life situations, incorporates a microphone and readily known speech recognition software and techniques to distinguish between communication coming from its users and the outside environment. When the device hears that a conversation or interaction has been initiated by its carrier or another person, it begins to sample data from the random event generator device and to put it into a new data segment. Using an algorithm to count periods of silence, it determines when the conversation is over and A) Stores the recorded data on an internal memory chip, and/or B) Sends it back to a local server using wireless networking technology.

Central Server Repository and Data Integration. Whereas other uses of the device have generally involved sending their data back to a single PC for storage and analysis on the hard drive; this version of the device incorporates wireless networking technology and software infrastructure to facilitate the use of integrating data from the devices into a larger system for the purpose of data-mining. In the simplest embodiment, separate devices being carried by separate individuals all transmit their data, in real-time, to a single wireless receiver/server appliance specifically designed to capture, store, differentiate, and time-stamp the data so that it may be accessed by computer systems on a network.

Interpreted Output. A major disadvantage that confronts users who attempt to correlate the output of a random event generator with personal happenings is an inability to know how to interpret the data that comes from their devices. While this is a rich area of exploration that should not be limited to the methods described in this document, the use of our invention involves assigning pre-defined meaning to the data generated by the device. Our present use involves three variations of output; Resonant, Chance/Neutral, and Mundane/Depressed. Each of these distinctions carries with it connotations about the nature of the empirical data generated, its graphical representation, and how it should be interpreted by users of our method.

Basic Output Interpretations:

"Resonant."

"Resonant" data is output produced by the device when it appears that something is happening in the environment and is represented by the some feedback mechanism as a large, growing, ordered, or harmonious deviation from the standard output. In the context of classic FieldREG experiments, this would be an almost monotonically increasing or decreasing cumulative deviation from chance behavior (in either mean or variance) as data is collected with time. Regardless of which statistical calculations and representations are used, be they the original method and feedback or another, in this use "resonance" will be represented in a consistent way in the output data and taken to mean that there is a heightened state of emotional interaction and/or "connection" apparent in the interpersonal interaction of the user. Depending on the environment in which the device is being used, it can be an indication of excitement, enthusiasm, interest, empathetic feelings, or emotional closeness.

"Chance/Neutral."

"Chance" data output is produced by the device when there appears to be no influence due to the emotional environment or forces. In the classic experimental methodology where data is collected in multiple bit trials and summed together, this data would show no indication of significant deviations in mean or variance from what a balanced bit generator should produce according to theory. Regardless of the exact calculations and representations used, in this case "chance" will be represented in a neutral way; such as given the number 0 on a scale from −10 to 10, or shown as a flat line. It should be interpreted as meaning that a connection was not measured; but not taken to mean that one did not exist. It provides the least information of each of the three categories.

"Depressed/Mundane."

"Depressed" data output is produced by the device when it would appear that there is an influence on the data but that influence is actually creating less variability in the output of the device, and it is represented graphically as some form of suppression relative to the other outputs. In the classic experimental methodology, this data would be completely non-significant from the standpoint of showing a robust deviation from chance in the mean, but would have implications that the data is behaving in a nonchance vis-à-vis a suppressed variance or chi-squared on the data. For our use, regardless of the exact calculations and methods used, "depressed" will be represented in a negative way, such as given a score of −5 on a scale of −10 to 10, or shown as a line that exists below the origin. Evidence of this type of data seems to emerge in situations where people are bored, drained, or removed from one another. Unless other mined data shows a correlation between this measure and success for some individuals in the relevant context, this outcome would likely be considered unfavorable in situations that are meant to involve excitement, enthusiasm, or closeness.

Uses:

The information which is generated by the device, be it uploaded from a single device via a direct connection to a PC, which transmits that data to a data integration server in some automatic or manual way, or wirelessly sent to a repository in real-time, is used as an additional set of empirical and quantitative data points for the purpose of making judgments about the interpersonal interactions of the person carrying the device.

As an example, a chain of retail stores might provide the devices to their sales people as an additional measure of the quality of interaction between the sales people and their customers. As described in a prior provisional filing (#60986954), an excess of order in the random bits, as measured by localized deviations from their expectation outcome, is taken as an indication of "resonance" in the inter-personal interaction, which studies indicate may be indicative of a deeper form of communication and interaction. An excess of order which results in too close a fit to chance may be viewed as indication of formal, rigid, logical, and "disconnected" interaction in the social dynamic.

This information can be used to reward employees, to determine the best practices for customer interaction (by exploring and encouraging other employees to model the behaviors of those who most often have significant results and the best sales), and for the purpose of providing additional feedback and training to staff members so that they learn to create more directed social interactions. In some instances where it would be desirable, such as in an early childhood learning environment, in the practice of medicine or counseling, or in an entertainment venue, employees could be trained to enhance their level of emotional resonance with other participants. In other venues, such as when a passive observer enters a classroom or another situation which involves detachment, employees or users could be trained to do the opposite (e.g be detached, removed, and unaffected and unlikely to affect others in the environment). The device and its feedback both drives and supplements this training, as it provides objective and quantitative feedback which has thus far not been provided in similar situations.

This document specifically highlights the value of the devices when used in a corporate context, (and/or) integrated with other data, (and/or) interpreted and analyzed across many users to develop best practices, but this should not be construed as a way of precluding the productive use of the invention by individuals who are not operating as part of a broader context.

As an example, an individual person may wish to use the device and system to gauge the quality and nature of their interaction with others by tracking the types of results (resonant, neutral, or removed) that are obtained when interacting with different individuals in different contexts in their lives. They might learn that their interaction with a particular co-worker is resonant when certain topics are broached, or that their interactions with another always seem to provide depressed results. Reflection and exploration into these topics can be of great pragmatic value to the user.

In a professional context, the device can also be used by the person for the purpose of learning more about their performance at a future date, and extracting information that is relevant to their goal. For example, during a sales pitch of three particular advertising models to a client at a P.R. firm, the presenter might reinforce his "hunch" that the clients prefer product B over the rest by finding strong indications of resonance in her data during that portion of the pitch. This has many benefits, but can be particularly useful on honing in on what is preferred by a client and quickly closing a deal.

Other Notes and Distinctions:

User Configuration is Relevant:

Whereas other FieldREG applications have often been concerned with, e.g., measuring a "group dynamic," it should be noted that this particular use according to the preferred embodiments herein emphasizes an individual user carrying the device to measure his or her interactions in a way that is particularly relevant to his/herself or his/her goals. In the preferred embodiments, when the portion of the document talks about aggregate data collection in a data mining context, it is the aggregation of the data of multiple individual agents with their own individual devices and contexts, which is different from the general observation of a group dynamic that is often involved in, e.g., some other embodiments.

This distinction is particularly relevant in light of findings that multiple devices "owned" (e.g. carried by, related to, or observed by) by multiple individual operators may behave much differently than multiple devices being affected by multiple individuals (with no "ownership"), or multiple individuals interacting with a single device. Each of these configurations has their own particular rules and benefits; but, it is noted in this portion of this document that the configuration of one or more devices to one individual is particularly relevant and best suited for the purpose of gauging interpersonal interactions as stated.

Interpreted Outcomes:

Elsewhere in the physical sciences, it is often assumed that when a measurement of a physical process is made, the specific nature of the physical process determines the quantitative nature of that measurement. For example, the theory of operation of thermometers implies that a column of mercury will always obtain a certain height when the molecules in the room are moving at a certain speed. Fifty-five degrees Celsius is always equal to fifty-five degrees Celsius regardless of who makes the measurement, what their understanding of the apparatus is, and what kind of feedback they are provided with.

Many of our novel empirical findings, and indeed one of the most noteworthy premises of some of the embodiments of the inventions herein and their uses, is that the data generated by a random physical device due to the influence of an interpersonal dynamic and/or other paranormal phenomenon does not appear to follow the same rules as the temperature measuring apparatus. When we talk about a change in variance (or any other statistical parameter) as being indicative of a particular type of result or meaning, the fact that the users have an expectation about the data and how it should be interpreted appears to play at least as important of a role in how the data comes out as does any other variable in the physical and interpersonal environment itself.

As such, our creation of categories such as resonant, neutral, and depressed (as well as any other categories that can be selected by those in the art based on this disclosure) are meant to serve as an example of how such categories can be constructed using exclusive statistical tests and consistent feedbacks, and it should not be construed as an incidental or irrelevant part of the invention. In fact, providing the users with any such consistent paradigm for interpreting the data has thus far been shown to be, by far, one of the best practices for ensuring the quality of such results; and, almost all prior researchers, experimenters, and inventors that we know of in this field have neglected this finding and instead chosen to focus on physical variables such as noise source type, bit-rate, known physical characteristics of the environment (e.g. temperature, electromagnetic field strength, color of walls, number of objects, internal décor, etc.), and advanced or irregular statistical analysis methods.

8. Embodiment Set "VIII"—Other Embodiments, Variations and Modifications

Although a variety of embodiments have been described herein above, with some variations between embodiments, it is contemplated that features described in relation to particular embodiments can readily be employed into or along with any other of the embodiments described herein, whenever theoretically feasible. By way of example, some of the functionality of the device described in relation to illustrative on-line embodiments described herein can be readily employed within a device that is used in a stand-alone fashion or that does not communicate remotely or online. For example, in relation to the online embodiments, examples were given as to embodiments wherein messages can be transmitted to users with such a system. In some other embodiments, a standalone device can be readily programmed to provide similar messages, whether via email, text message (e.g., when integrated in a device that also provides such services, such as, e.g., a PDA, cell phone or the like) to a user.

Further to this latter described device, the present invention can, thus, be used to create a highly intriguing 8-ball type of device or game by which messages can be presented to users. These messages could be transmitted at random times in some embodiments. However, in other embodiments, these messages could be caused to be transmitted upon request (e.g., pressing a button or the like), with the randomness relating to a selection of a particular statement or the like from a list of statements. In some embodiments, the device can even have pre-recorded statements such that it will a) answer questions inputted orally in a manner similar to an 8-ball is used and/or b) offer comments on its own a random times. In this manner, the device can create a highly involved 8-ball, that, e.g., not only answers questions, but that actually offers statements from time to time on its own. In some embodiments, statements that are offered can be of a slightly different format, such as, e.g., to provide comments regarding the whether or the environment or one's state of mind (e.g., observational statements, reminders or the like), while statements made upon an initiated request could be of another format (e.g., providing yes or no answers, reasons why one should or should not consider asking a question, affirmation regarding a question, or the like).

While the present invention provides various highly research-focused and scientific embodiments, some of the most advantageous embodiments of the invention pertain to the manner in which novel and unique devices can be created that users will come to believe or wonder about whether or not the device has some tie to a paranormal or supernatural force by which it functions. As such, it can not only provide greatly improved 8-ball type embodiments as described above, but also other types of similar embodiments, such as, e.g.:

a) As a fortune teller (e.g., a small device could perhaps even be mass produced and passed out at Chinese restaurants to provide fortunes to patrons—similar to the fortune in a cookie method.
b) As an Ouija-board type of game in which the device is used to seek to act as a conduit to communicate with the deceased, e.g., providing random statements in response to inquiries of this nature.
c) As a kind of modern mood ring or mood device, in which the device presents comments, colors, hues, songs, sounds, voices and/or other outputs that are correlated to the user as relating to mood or the like.

In addition, a device can also readily have a plurality of user-selectable settings, such as, e.g., a) Ouija-board (presenting statements that are believed by users to perhaps originate from a paranormal entity or state), b) 8-Ball (choosing the right yes or no action), c) Match Maker (choosing the right woman), d) Reminder or Alert mode (e.g., which can be similar to embodiments described above).

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language of the present invention or inventions should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example".

What is claimed is:

1. A method of monitoring a series of true random numbers, said method comprising:
    using a hardware device to produce an analog noise signal,
    using the hardware device to convert said analog noise signal to a true random sequence of signals,
    using the hardware device to carry out monitoring of said true random sequence of signals for anomalies along with evaluation of said anomalies in relation to one or more time-based events or occurrences, including monitoring said sequence of signals for deviations from true random sequences and, for the time period of said deviations, the hardware device comparing said time period of said deviations with events during said time periods, and
    using the hardware device to correlate said deviations with interpersonal happenings based on said comparing performed by said hardware device.

2. The method of claim 1, further comprising the step of correlating said deviations with interpersonal happenings in real time.

3. The method of claim 1, where the output of the device is used to make business decisions.

4. The method of claim 1, where the output of the device is used to help gauge the performance of individuals.

5. The method of claim 1, where the output of the device is used to measure whether individuals in a group are in agreement with one another.

6. The method of claim 1, further including having users enter textual, audio, or visual input into the device to describe the subjective nature of the event being recorded.

7. A method of producing a series of true random numbers, said method comprising:
    using a hardware device to produce an analog noise signal;
    using said hardware device to convert said analog noise signal to a binary true random sequence of signals;
    using said hardware device to measure information from the outside world and to correlate the measured information with extra-chance deviations in the random signal for the purpose of providing additional information to the user; and
    using said hardware device to output results of said correlation performed by said hardware device.

8. The method of claim 7, wherein said information from the outside world includes electrical or other signals derived from a user's physiology.

* * * * *